Jan. 14, 1964   C. W. ELLIS III, ET AL   3,117,745
VTOL/STOL AIRCRAFT

Filed April 27, 1961   12 Sheets-Sheet 1

INVENTORS
CHARLES W. ELLIS, III
DONALD W. ROBINSON, JR.
HARRY S. EGERTON
By Teller, McCormick, Paulding & Huber
ATTORNEYS

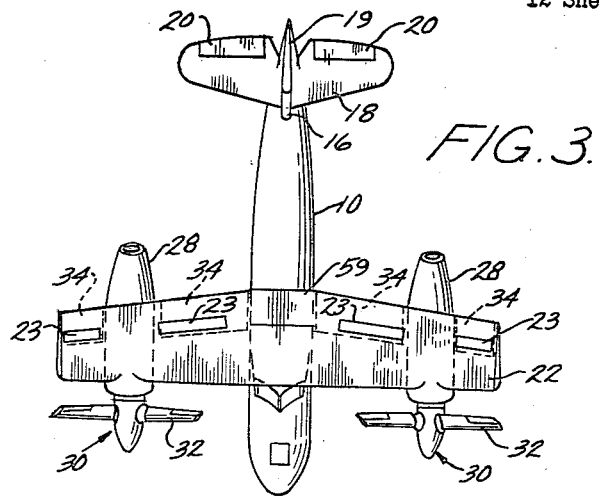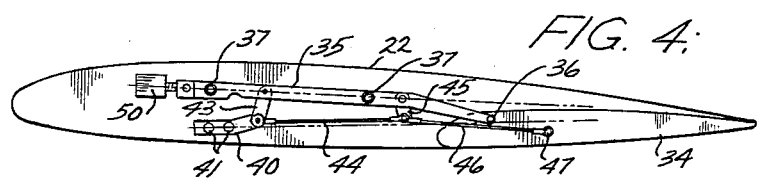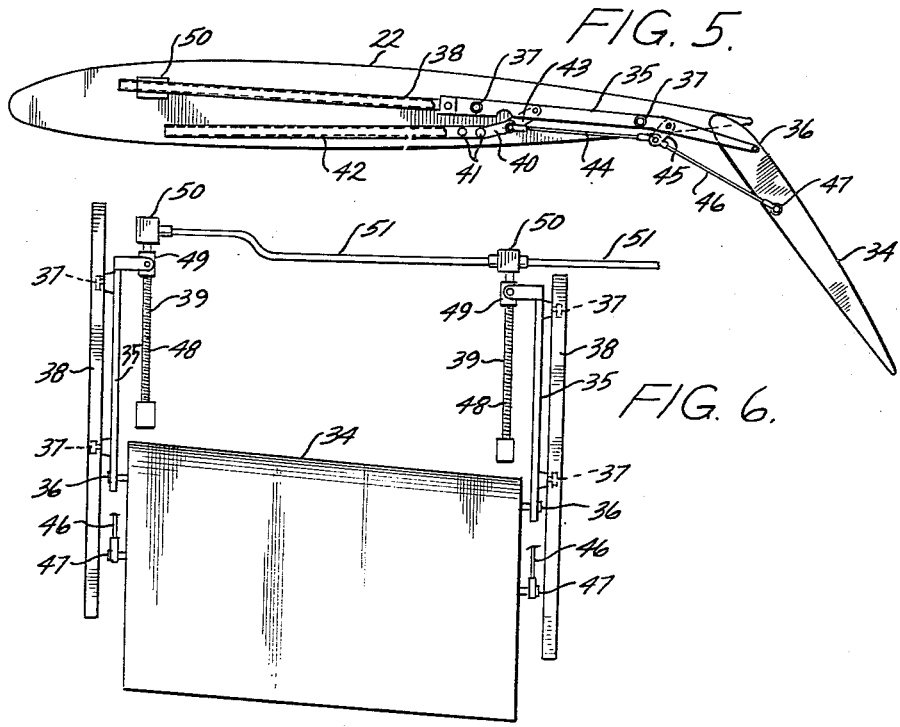

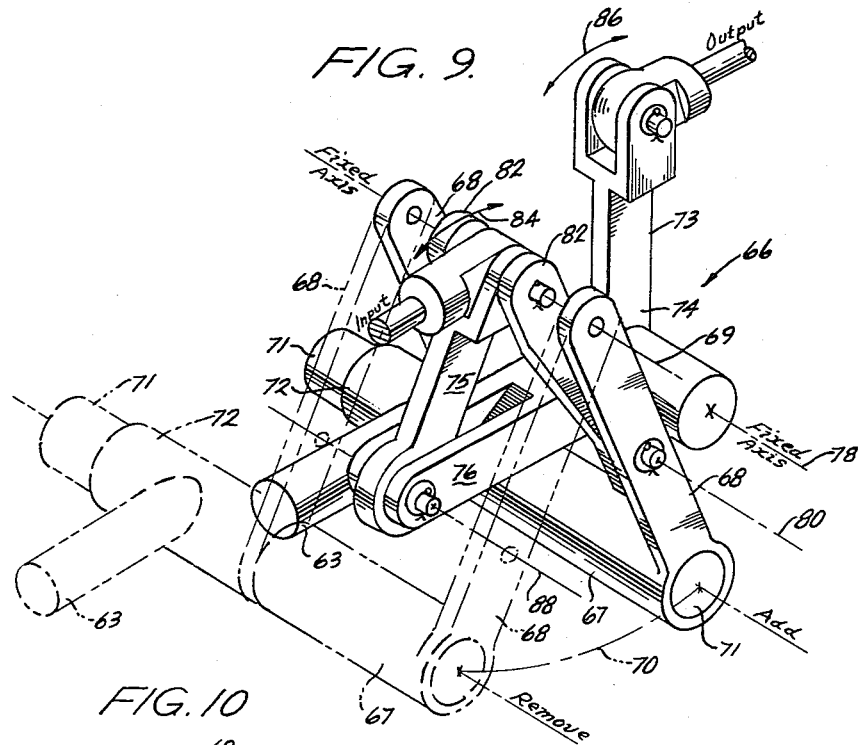
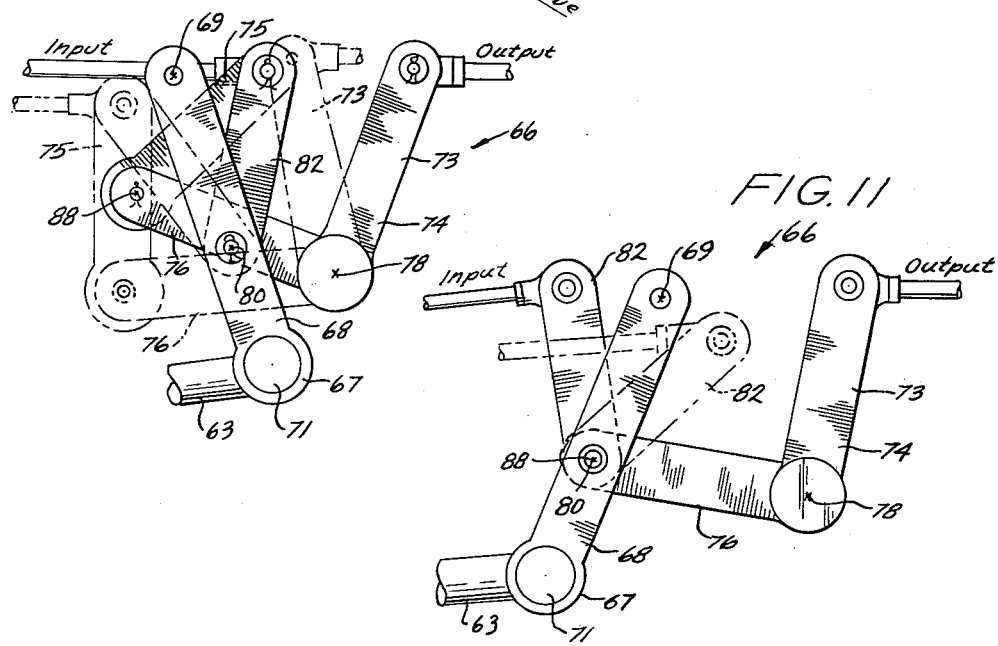

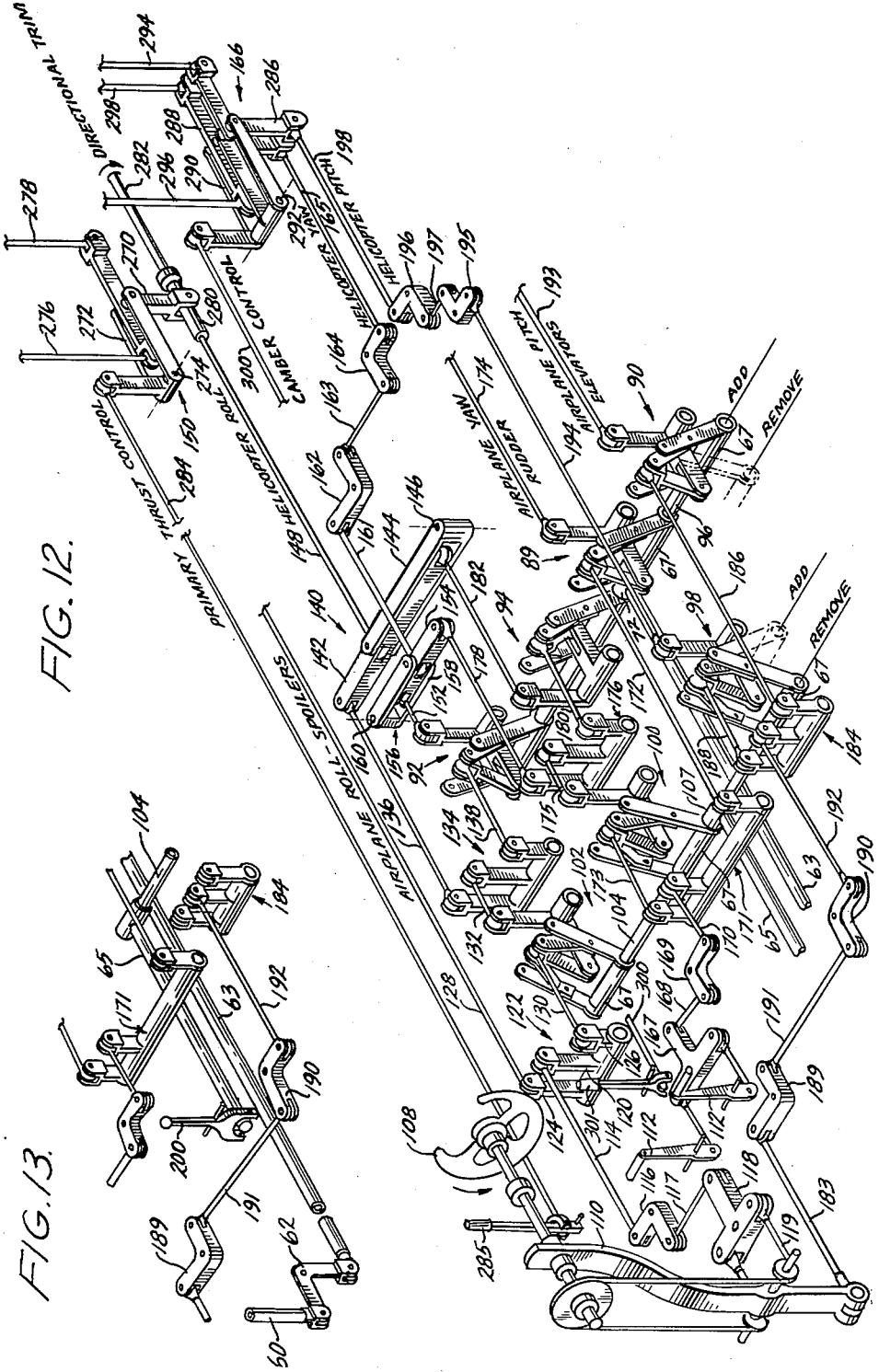

Jan. 14, 1964

C. W. ELLIS III, ET AL 3,117,745

VTOL/STOL AIRCRAFT

Filed April 27, 1961

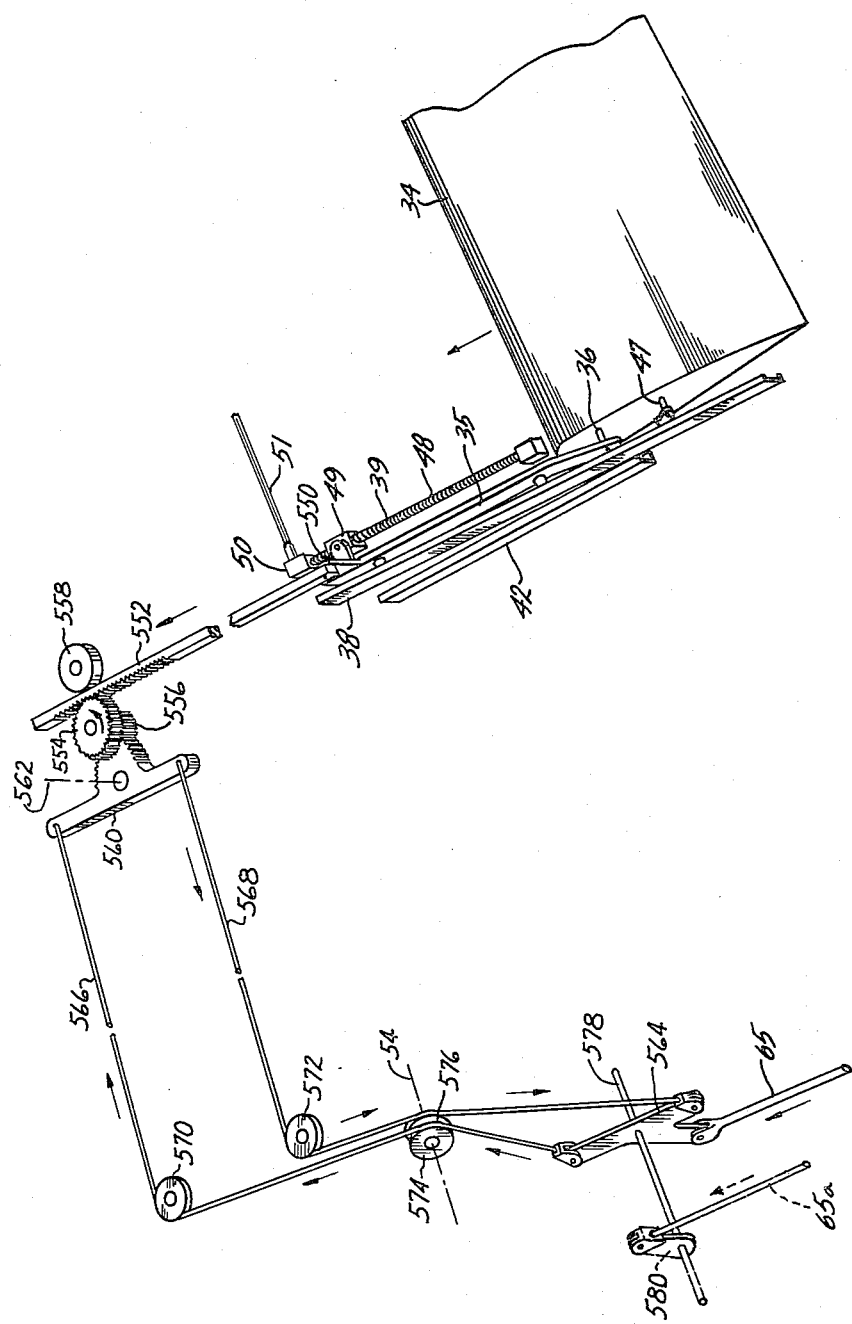

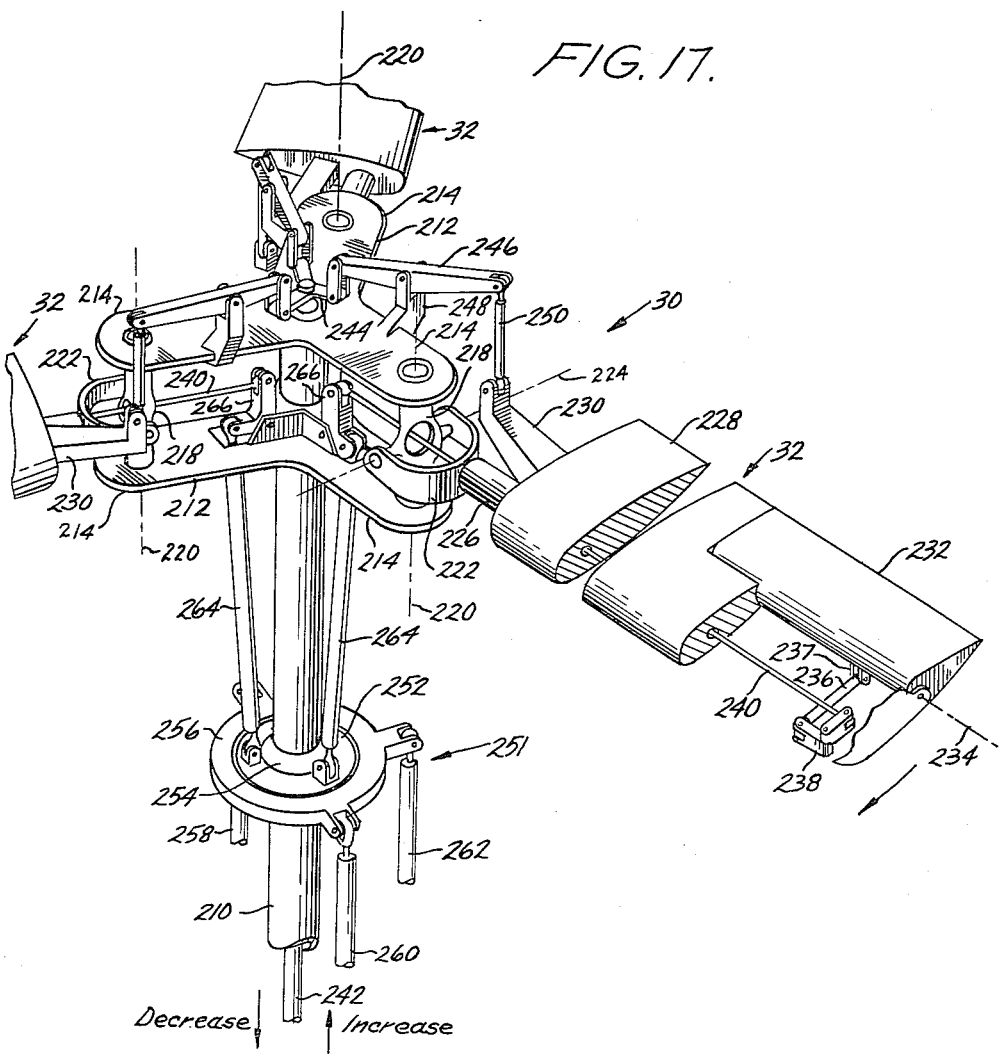
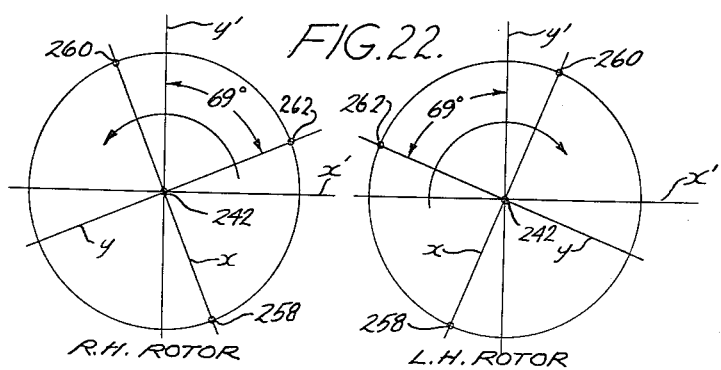

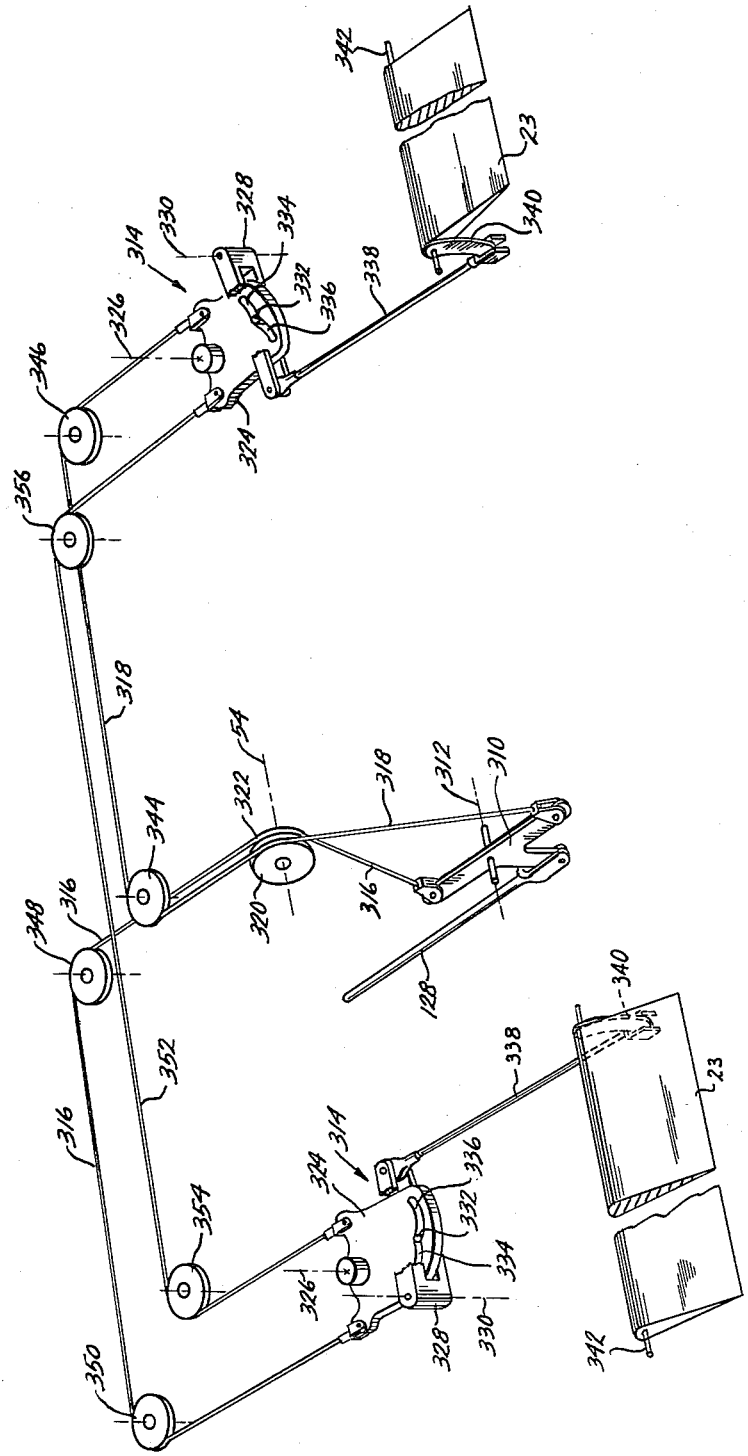

Jan. 14, 1964  C. W. ELLIS III, ET AL  3,117,745
VTOL/STOL AIRCRAFT
Filed April 27, 1961  12 Sheets-Sheet 10

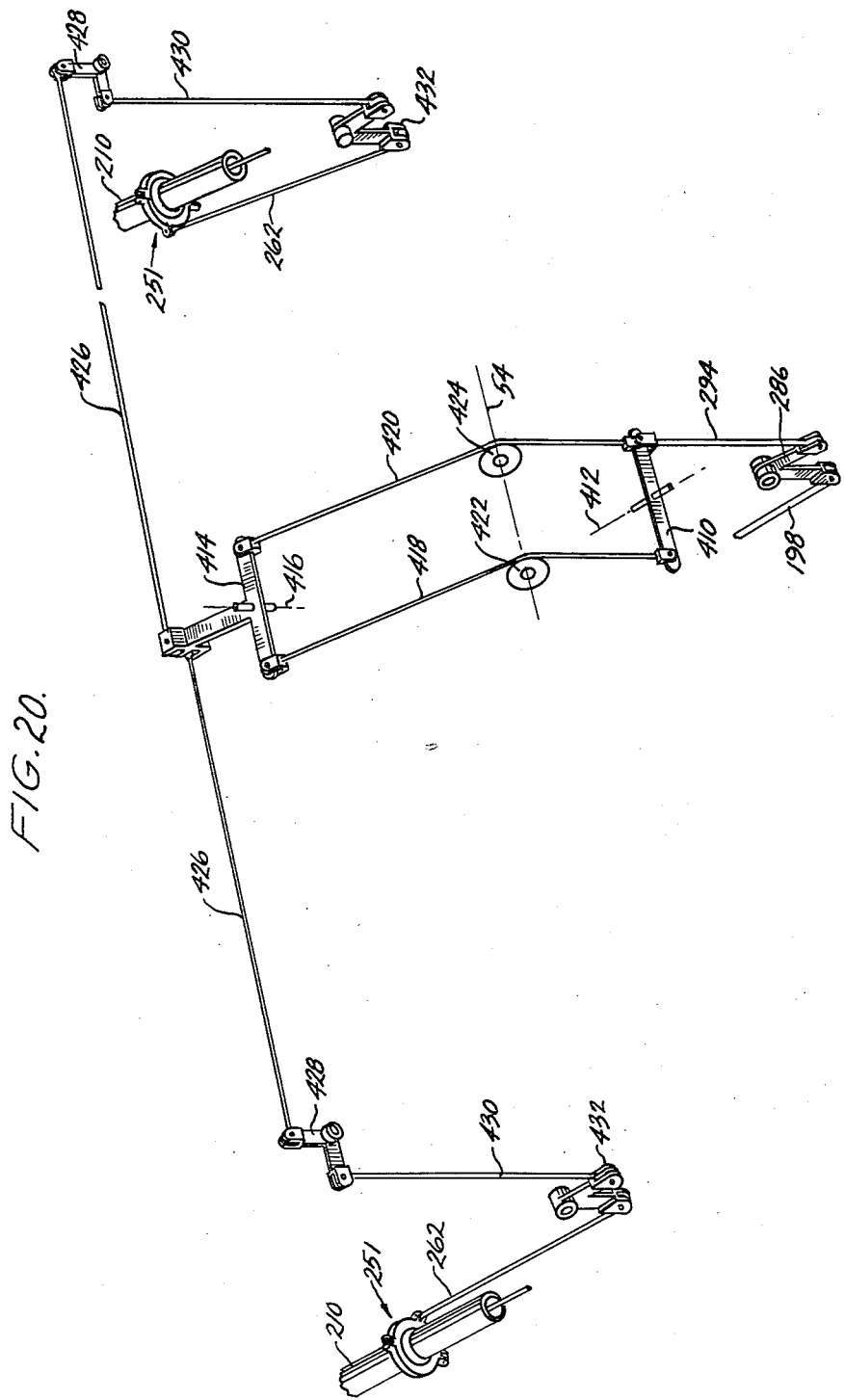

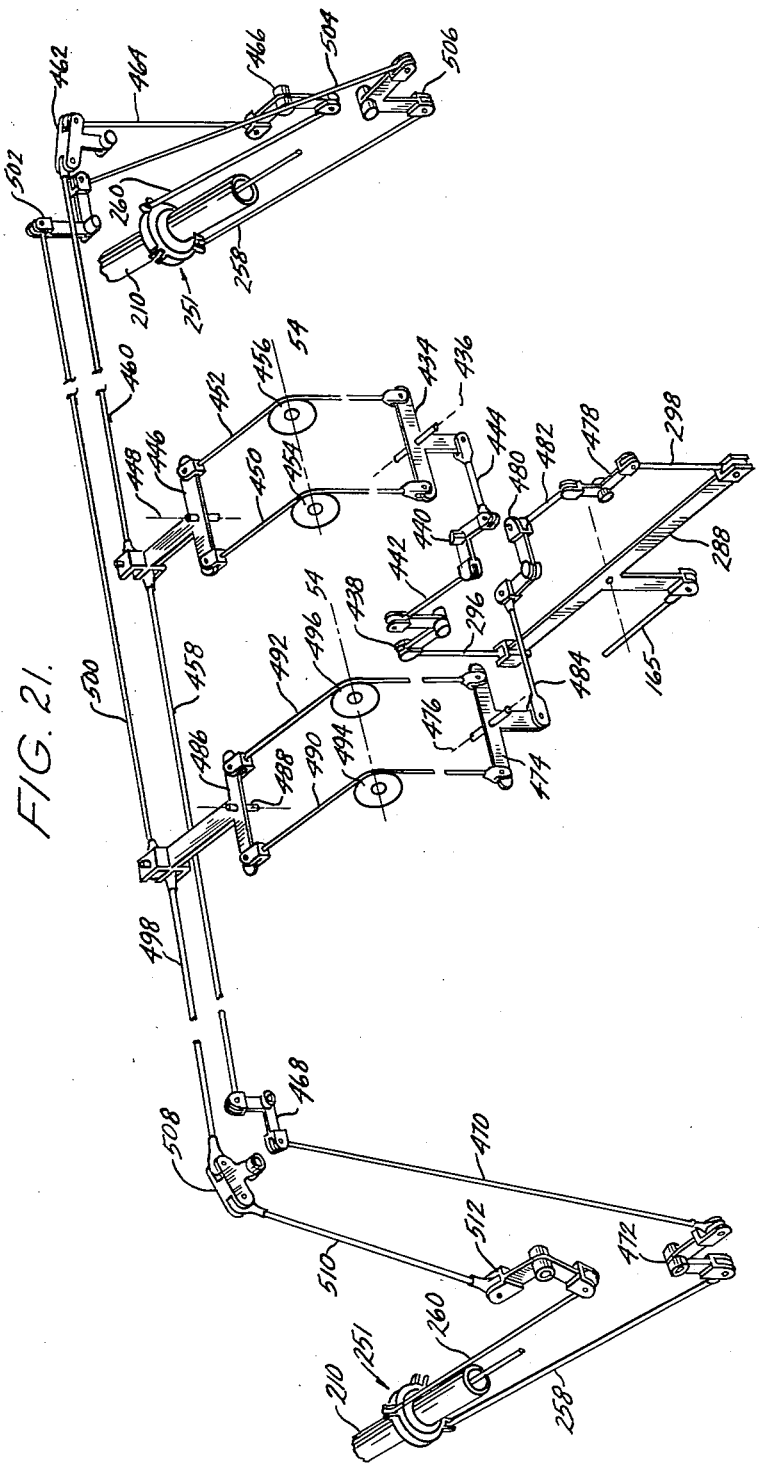

United States Patent Office 3,117,745
Patented Jan. 14, 1964

3,117,745
VTOL/STOL AIRCRAFT
Charles W. Ellis III, Bloomfield, and Donald W. Robinson, Jr., Hazardville, Conn., and Harry S. Egerton, Granville, Mass., assignors to Kaman Aircraft Corporation, a corporation of Connecticut
Filed Apr. 27, 1961, Ser. No. 113,050
70 Claims. (Cl. 244—7)

This invention relates to improvements in aircraft capable of vertical take-off and landing and/or short take-off and landing (VTOL/STOL) operation, and deals more particularly with an aircraft which is operable and controllable as either an airplane or a helicopter, or mixtures of both, and in which the transition between airplane and helicopter operation may be made while the aircraft is in flight.

While there are other types of aircraft within this general class, the VTOL/STOL aircraft of this invention is characterized by a wing which can be tilted about a substantially transverse axis from a generally horizontal position or attitude (as in a fixed wing airplane in horizontal flight) toward a generally vertical position. In the presently preferred form, the aircraft has two engines which are mounted on the wing on opposite sides of the fuselage and which tilt with the wing between a lowered position associated with high speed propulsive flight and a raised position associated with hovering and with vertical or short take-off and landing operations. The engines are preferably turbine engines, and a "rotor-propeller" assembly is provided for each engine.

In high speed flight operation, with the wing lowered, the aircraft is maneuvered and controlled as an airplane, i.e., it is maneuvered by conventional airplane control surfaces such as an elevator, ailerons or spoilers, and a rudder. Further, during "airplane" control, the rotor-propeller assemblies function or act in the manner of normal aircraft propellers. For hovering and for vertical and/or short take-off and landing operations with the wing of the aircraft and the engines tilted upwardly, the rotor-propeller assemblies act in the manner of helicopter rotors, and the pitches of the rotor blades are controlled to maneuver the aircraft as in conventional helicopter operation. For convenience, the said rotor-propeller assemblies will be referred to hereinafter as rotors.

From the foregoing, it will be seen that the aircraft of this invention might be referred to as a "convertiplane." That is, for vertical flight and for low speed and hovering operations with the wing and engines tilted upwardly, the aircraft might be considered as a helicopter, while in high speed flight and with the wing and engines in a more normal position, it might be considered as an airplane. Generally, with the wing tilted fully upwardly, the aircraft is maneuvered by complete helicopter control, and with the wing fully down, the aircraft is maneuvered by complete airplane control. Also, provision is made for adjusting the degree of helicopter control present so that the helicopter control may be gradually added as the aircraft slows down and the wing is tilted upwardly and may be gradually removed as the aircraft gains speed and the wing is returned to its normal or lowered position. Although not necessary in all cases, the aircraft may also include provision for adjusting the degree of airplane control present so that the airplane control may be gradually removed as the aircraft slows down and be added as the aircraft gains speed. Thus in intermediate positions of the wing and the engines, the aircraft can be and is preferably controlled or maneuvered by a mixture of helicopter control and airplane control, and the transition between full helicopter control and full airplane control can be made by gradually varying the proportions of the mixture in such a manner as to retain full pilot control and stability of the aircraft throughout all phases of the transition and while the aircraft is in flight.

The desirability of phasing or mixing in helicopter control with airplane control as the wing is tilted upwardly will be understood by considering the difficulty of continuing airplane control and operation as the speed is decreased. During airplane operation steady level flight is brought about by a combination of rotor thrust and wing lift which balances the aircraft weight and drag. As the speed decreases, however, the wing lift also decreases, and the wing and rotors are therefore tilted upwardly to produce a vertical rotor thrust component to compensate for the loss in wing lift. Additionally, the airplane control surfaces lose their effectiveness, due to the loss of lift and drag, as the aircraft speed is further reduced and the wing further tilted to produce more rotor lifting thrust. The helicopter control is therefore gradually phased in, initially as an aid to, and finally as a substitute for, the airplane control which is rendered gradually ineffective as the aircraft slows down.

It is the general object of the present invention to provide in an aircraft of the type mentioned means for phasing in and out helicopter control and airplane control of the aircraft whereby it can be maneuvered selectively by helicopter or airplane control or mixtures thereof. In keeping with this general object of the invention, it is a specific object to provide the control means in such form that it can be operated in all phases of flight control by a "stick, wheel and rudder pedal" assembly such as is employed in fixed wing aircraft or airplanes.

Another object of this invention is to provide an aircraft of the type mentioned wherein the wing and the rotor assemblies mounted thereon are positioned at an attack angle of less than 90° when the wing is tilted to its fully raised position with respect to a horizontal fuselage, and wherein the rotor assemblies are effective and so controllable as to provide pure helicopter operation when the wing is fully tilted despite the fact that their axes of rotation are at a substantial angle to the vertical.

A further object of this invention is to provide in an aircraft of the type mentioned separate means for varying the degree of helicopter control and for varying the degree of airplane control introduced to the control surfaces of the aircraft by the pilot's operation of the stick, wheel and rudder pedal, or other pilot operable control devices. In keeping with this object of the invention, it is a more specific object to provide the control means in such a form that at least one of the means for separately varying the degree of introduction of the two different types of control may be operated in accordance with a suitable monitor of the flight condition, such as the degree of wing tilt, the wing flap position, or the air speed, so that at least one of the two different types of control will be automatically phased from a fully in condition to a fully out condition, or vice versa, during the transition between helicopter and airplane flight.

A still further object of this invention is to provide an aircraft of the type mentioned having at least two rotor assemblies which serve to provide forward propulsive thrust during operation as an airplane and to provide lift and various pitching, yawing and rolling movements for the purpose of maneuvering the aircraft when the latter is operated as a helicopter, the rotor assemblies having associated therewith means for controlling the blade pitches in both a collective and a cyclical manner to achieve these ends.

Another object of this invention is to provide, in an aircraft of the type having a wing tiltable upwardly to an attack angle of less than 90° and at least one wing-mounted rotor on either side of the fuselage, means for controlling the pitches of the rotor blades when the wing is tilted upwardly to maneuver the aircraft in a manner similar to a helicopter and which blade pitch control means are operable to produce pure rolling, pitching and yawing movements of the aircraft about the fuselage roll, pitch and yaw axes in response to movements of the pilot operable direction control devices in predetermined directions corresponding to desired changes in the roll, pitch and yaw respectively of the aircraft.

Another object of this invention is to provide a VTOL/STOL aircraft which is operable as an airplane during normal high speed forward flight and which for low speed flight, hovering and short take off and landing operations includes a tilting wing, wing flaps for changing the lift characteristic of the wing and two rotors on the wing which are operable in a manner similar to helicopter rotors for imposing control moments on the aircraft for maneuvering the same. In keeping with this object it is a further object to provide means for imparting helicopter control to the rotors and other means for gradually rendering said helicopter control means effective or ineffective, said latter means being operable either manually or automatically in response to an indicator of the flight condition, such as the degree of wing tilt, the position of the wing flaps or the air speed.

The drawings show the preferred embodiments of the invention and such embodiments will be described, but it will be understood that various changes may be made from the constructions disclosed, and that the drawings and description are not to be construed as defining or limiting the scope of the invention, the claims forming a part of this specification being relied on for that purpose.

Of the drawings:

FIG. 3 is a reduced plan view of the same aircraft as shown in FIGS. 1 and 2 and wherein the wing and engines are shown in position for high speed flight.

FIG. 4 is an enlarged sectional view taken through the wing and showing the actuating mechanism associated with one side of one of the wing flaps, the wing flap being shown in its retracted position.

FIG. 5 is a view generally similar to FIG. 4, but with the wing flap being shown in its extended position.

FIG. 6 is a plan view of the wing flap shown in FIGS. 4 and 5 and of the actuating mechanism associated therewith, the wing flap being shown in its retracted position.

FIG. 9 is a perspective view of a variable output motion transmitting unit of the type used in the control system to phase airplane and helicopter control in and out.

FIG. 10 is a side elevational view of the variable output motion transmitting unit shown in FIG. 9 and wherein the parts thereof are shown adjusted to provide a maximum output motion for a given input motion, the solid lines showing the positions of the parts for one position of the input rod and the broken lines showing the positions of the parts for a different position of the input rod.

FIG. 11 is a view similar to FIG. 10, but with the parts of the unit shown adjusted to provide a zero output motion, the solid lines showing the positions of the parts for one position of the input rod and the broken lines showing the positions of the parts for a different position of the input rod.

Figure 8:
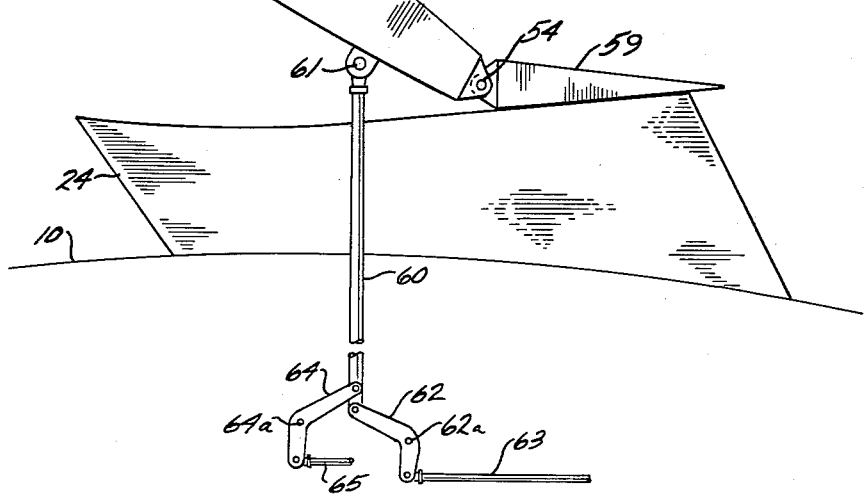
FIG. 8 is a schematic view of a linkage system operated by the wing and which may be used to condition parts of the control system of this invention for operation in accordance with the angle of wing tilt.

FIG. 12 is a schematic illustration of the mechanical elements and linkages of the aircraft control system which functions to select helicopter or airplane control of the aircraft and mixtures thereof and wherein the control system is adapted for cooperation with the linkage system of FIG. 8 so that the amounts of helicopter and airplane control afforded by the control system are varied in accordance with the degree of wing tilt.

FIG. 13 is a schematic illustration of a portion of the control system shown in FIG. 12 and which portion represents a modification of the latter control system wherein the degree of helicopter control may be varied manually and the degree of airplane control varied automatically in response to the degree of wing tilt.

Figure 14:
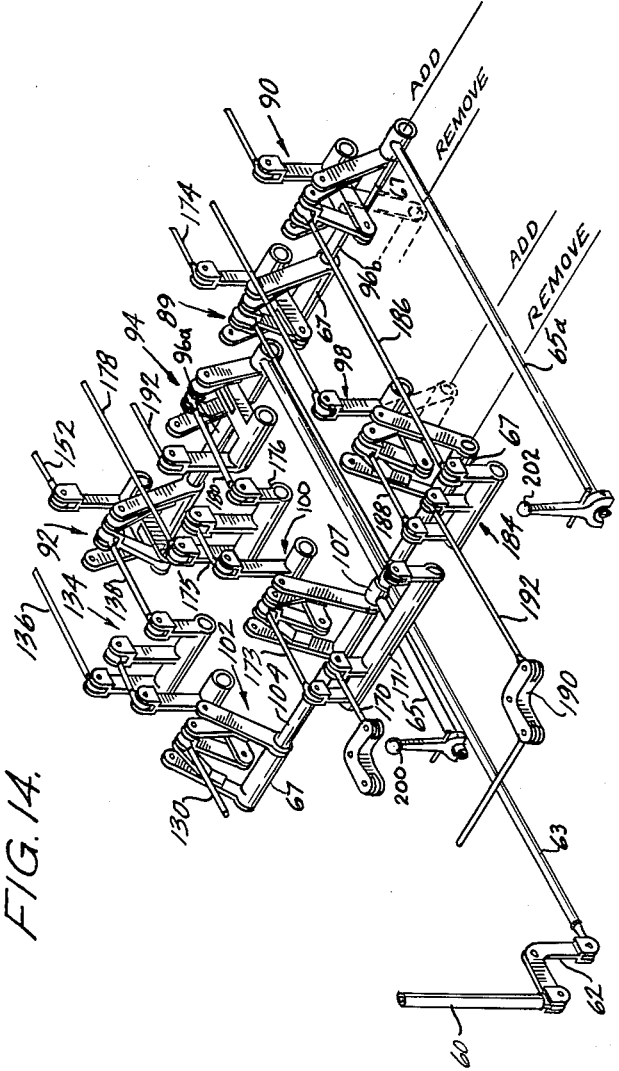

FIG. 14 is a schematic illustration of a portion of the control system of FIG. 12 and which portion represents a modification of the latter control system wherein both the degree of airplane control and the degree of helicopter control may be varied manually, but wherein the degree of compensating control used in conjunction with the helicopter control is varied in accordance with the wing tilt.

Figure 15:
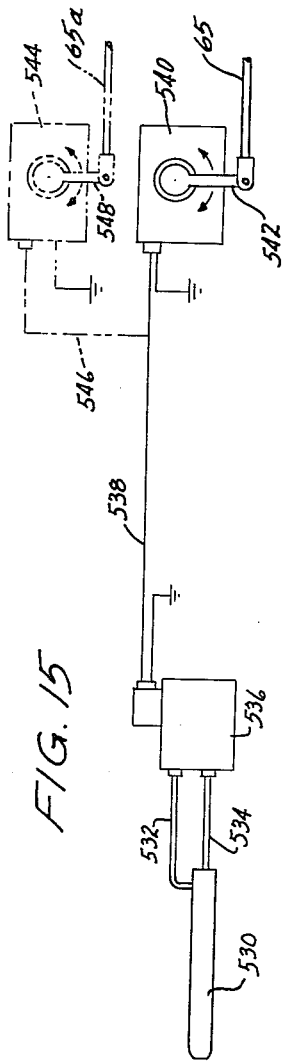

FIG. 15 is a schematic illustration of mechanism which may be used in conjunction with the modified control system of FIG. 14 for adjusting the degree of helicopter control and/or airplane control afforded by the system in accordance with the airspeed of the aircraft.

FIG. 16 is a schematic illustration of mechanism which may be used in conjunction with the modified control system of FIG. 14 for adjusting the degree of helicopter control and/or airplane control afforded by the system in accordance with the position of the wing flaps.

Figure 1:
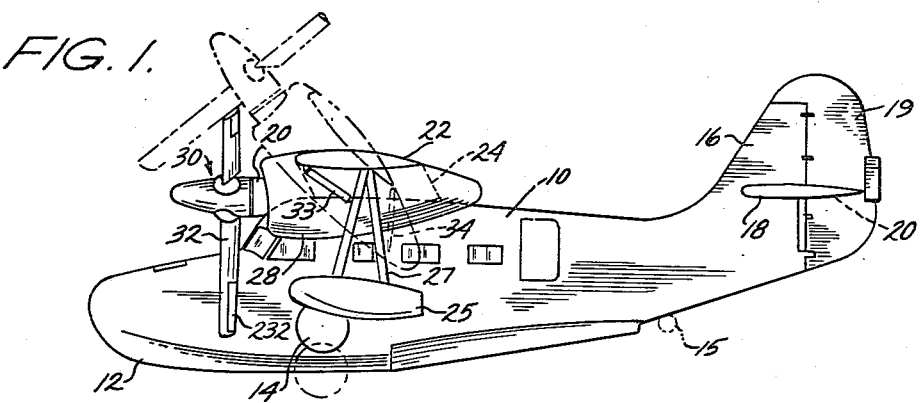
FIG. 1 is a side view of an aircraft incorporating the improvements of the present invention and wherein the wing and engines are shown in position for high speed flight.

FIG. 17 is a somewhat schematic illustration of a rotor assembly used in the aircraft of FIG. 1 and which optionally functions as either an airplane propeller, a helicopter rotor or mixtures of both.

FIG. 18 is a somewhat schematic illustration of the mechanism used to transmit output movements of the control system of FIG. 12 to the spoilers.

Figure 19:
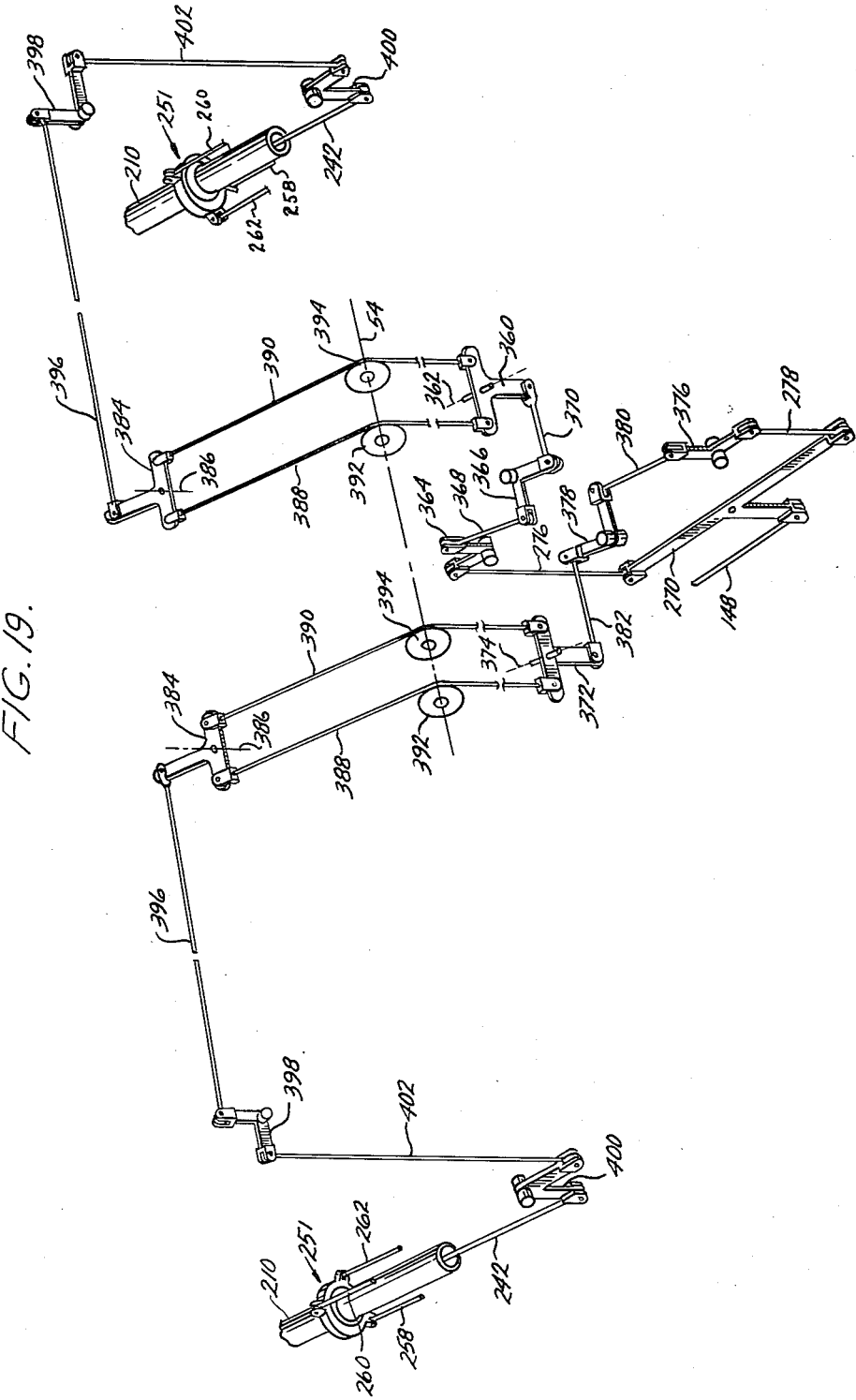

FIG. 19 is a somewhat schematic illustration of the mechanism used to transmit output movements of the control system of FIG. 12 to the collective pitch control rods of the two rotors.

FIG. 20 is a somewhat schematic illustration of the mechanism used to transmit output movements of the control system of FIG. 12 to the longitudinal cyclic control rods of the two azimuth mechanisms associated with the two rotors.

FIG. 21 is a somewhat schematic illustration of the mechanism used to transmit output movements of the control system of FIG. 12 to the lateral cyclic control rods of the two azimuth mechanisms associated with the two rotors.

FIG. 22 is a diagrammatic representation looking aft toward the two rotors showing the angular displacement between the input movements to the azimuth mechanisms and the related response of the rotor blades.

Figure 2:
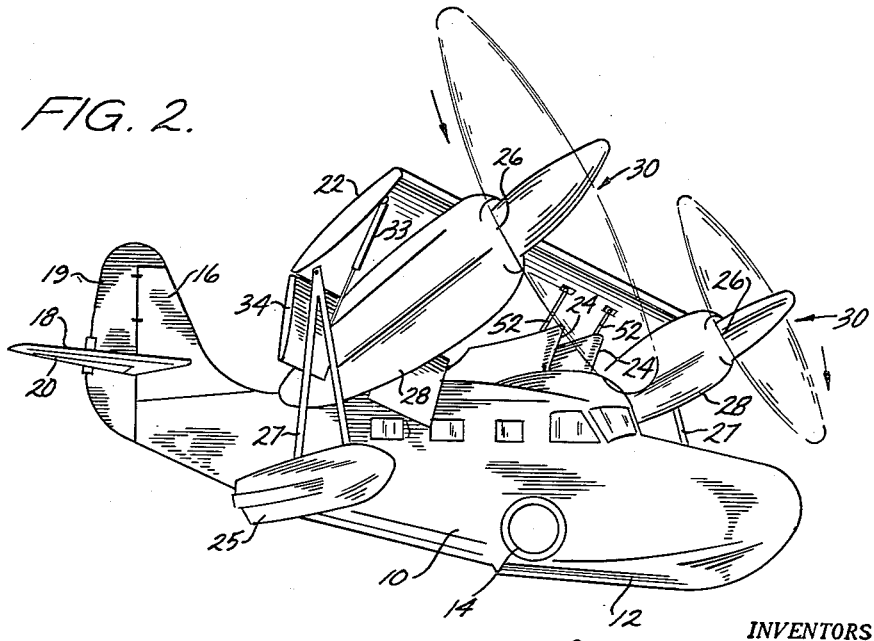
FIG. 2 is a perspective view of the same aircraft but showing the wing and engines tilted to a position for hovering and for vertical take-off and landing operations.

*General Structure of Aircraft—FIGS. 1, 2 and 3*

For purposes of illustrating the invention, it has been shown in the accompanying drawings as embodied in an amphibian type aircraft which is adapted by the invention for VTOL/STOL operation and for low speed and hovering operation as well as for high speed flight. It will be observed from FIGS. 1, 2 and 3 that the aircraft comprises a conventional fuselage 10 and a hull 12 and that it has a landing gear 14 shown in the retracted position for flight and for landing and take-off on and from water. However, the landing gear can be lowered to the broken line position of FIG. 1 whereby the aircraft can land on and take off from land. To aid in landing and take off from land, a tail wheel 15 is also provided which is normally retracted within the fuselage but which can be lowered to the broken line position shown in FIG. 1. It will also be observed that the aircraft has a vertical stabilizer 16, two horizontal stabilizers 18, 18 and a rudder 19. It also includes two elevators 20, 20 connected respectively with the two stabilizers 18, 18. The rudder 19 and the elevators are angularly adjustable relative to the stabilizers 16 and 18, 18, respectively, in a conventional manner and provide control surfaces for effecting yawing and pitching movements of the aircraft when the latter is operated and controlled as an airplane in high speed flight. The aircraft also includes wing means in the form of a single wing 22 which is provided with spoilers, indicated at 23, 23 in FIG. 3, which are of conventional construction and which provide adjustable control surfaces for effecting roll of the aircraft under airplane operation. The means providing control surfaces for maneuvering the aircraft as an airplane, however, by themselves form no part of the invention, and may be of various different types or constructions, or may be differently located on the aircraft without departing from the invention. Also, the wing means may take various forms different from that shown, and could, for example, comprise two separate wings extending outwardly respectively from the opposite sides of the fuselage.

The illustrated single wing 22 extends laterally outwardly from both sides of the fuselage 10 and is mounted above the fuselage on a pair of pylons 24, 24 which are spaced apart in parallel relationship at the top of the fuselage and on opposite sides of the longitudinal center line thereof. Attached to each end of the wing 22 is a pontoon 25 for supporting the wing tip during take-off and landing from and on water, each pontoon being connected with the wing by a suitable strut construction, indicated at 27. Two engines 26, 26 are suspended from the wing 22 in nacelles 28, 28 spaced outwardly from the fuselage on opposite sides thereof and, while the engines may be of any type desired, they are preferably turbine engines adapted to respectively drive two rotor-propeller assemblies, or rotors, indicated generally by the reference numerals 30, 30. The rotors rotate about axes which extend substantially chordwise of the wing and are tiltable in unison with the wing. As shown by the arrows in FIG. 2, the rotors 30, 30 rotate in opposite directions with the tip of each rotor blade traveling upwardly as it passes adjacent the fuselage. It is an important feature of the present invention, as will be described, that the blades 32, 32 of each rotor 30 are independently adjustable to change the pitches thereof and are subjected to both cyclic and collective pitch control when the engines are tilted upwardly for low speed and hovering operation of the aircraft as shown in FIG. 2, and that the blades function as normal propeller blades without any cyclic pitch control when the engines are disposed for high speed flight, as shown by the solid lines of FIG. 1. The blades also preferably include provision for simultaneously changing their camber and, as a result, their lift characteristics. Therefore, the blade camber may be set at different values at different speeds of flight to provide the most efficient blade operation at each speed.

In FIG. 2, the aircraft has been shown as it appears for low speed flight, for hovering and for vertical or short take-off and landing operations. That is, in FIG. 2, the wing 22 is shown tilted upwardly as far as it will go and the same is true of the engines 26, 26 which are tiltable with the wing. The pontoons 25, 25 at the tips of the wing, however, do not tilt with the wing, but maintain substantially the same relationship with the hull 12 for all positions of the wing to permit the aircraft to land on and take off from water with the wings in any position. To permit this, each pontoon strut construction 27 is pivotally connected at its upper end with the wing and provided with an associated jackscrew mechanism 33 which serves to move the strut construction and pontoon relatively to the wing. By suitable means the operation of the jackscrew mechanism is programmed with the tilt of the wing so that as the wing is raised or lowered the jackscrew is extended or retracted respectively to maintain the pontoon in the proper position with relation to the hull.

It might be expected that for vertical take-off and landing operation the wing 22 would have to be tilted 90° from the position shown in FIG. 1 into a substantially vertical plane, but such is not the case. Actually, the wing is tilted only approximately 60° upwardly from its normal lowered position. Full 90° tilt of the wing and engines is avoided by providing wing flaps, such as the flaps 34, 34, which are movable between a normal position, at which they are substantially housed within the wing, and a dropped position, as shown in FIG. 2, at which they extend generally downwardly from the trailing edge of the wing and form a substantial angle therewith. When the wing is fully tilted and the flaps 34, 34 are fully dropped, the relationship of the wing, the flaps and the rotors is such that a substantially vertical lifting force is imposed on the aircraft by the operation of the rotors, despite the forward inclination of the latter. In essence, the flaps so modify the drag of the wing as to produce a rearwardly acting drag force which cancels the forwardly acting rotor thrust component, leaving only a vertically acting resultant force. Thus, by dropping the flaps 34, 34 from the wing 22 when it is tilted fully upwardly at an angle of approximately 60° the effect, at least as far as the lift is concerned, is substantially the same as having tilted the wing 22 into a vertical plane without the use of the flaps.

*Wing Flap Actuating Mechanism—FIGS. 4, 5 and 6*

The flaps 34, 34 by themselves form no part of the invention and they, and the means for actuating them, may be of various conventional constructions. It should be noted, however, that the flaps do cooperate in a novel manner with the tilting wing and rotors to provide for helicopter operation by means of the rotors without the necessity of raising the rotors to a fully vertical position. The flaps also, of course, as the aircraft slows down from high speed flight, may be used in the usual manner to provide increased lift at the slower speeds to aid in landing as an airplane or to aid in the transition to helicopter flight.

For the purpose of illustration a preferred form of actuating mechanism is shown in FIGS. 4, 5 and 6 in conjunction with one of the flaps 34, 34. The actuating mechanism for each flap comprises two substantially similar linkage arrangements associated respectively with the two sides of the flap. FIGS. 4 and 5 show the linkage arrangement associated with one side of a flap 34. Referring to these figures, an upper bar 35 has one end thereof pivotally connected, as at 36, to the associated side of the flap near the leading portion thereof and is guided for movement chordwise of the wing 22 by means of two roller assemblies, indicated generally at 37, 37, which travel in and are guided by an upper track 38. For purposes of clarity, the upper track 38 is not shown in detail in FIG. 4 and is indicated by the broken line passing through the two roller assemblies 37, 37, the broken line representing the center line of the track. The other end of the bar 35 is connected with a jackscrew mechanism 39, as shown in FIG. 6, which functions to move the bar along the upper track. Below the bar 35 is another shorter bar 40 which travels by means of roller assemblies 41, 41 in a lower track 42, the center line of this track being indicated by the broken line in FIG. 4 passing through the roller assemblies 41, 41. The end of the bar 40 nearest the flap 34 is connected with the upper bar 35 by a link 43 which is pivotally movable with respect to both of the bars. Also connected to the same end of the bar 40 is a rod 44 which extends rearwardly toward the flap 34 and is pivotally connected at its rearward end with another link 45, which link is also pivotally connected with the upper bar 35 as shown. Also pivotally connected to the link 45, about the same axis as the associated end of the rod 44, is another rod 46 which extends rearwardly and is pivotally connected, as at 47, to the associated side of the flap 34 at a point spaced rearwardly from the connection 36 between the upper bar and the flap.

As will be understood from FIGS. 4 and 5, the relationship between the upper and lower tracks 38 and 42 is such that when the upper bar is in its forwardmost position, as shown in FIG. 4, the linkage arrangement will hold the flap 34 in a retracted position wherein the flap is housed substantially within the wing. However, as the upper bar 35 is moved rearwardly the resulting movement of the lower bar 40, and of the rods 44 and 46, is such as to cause the flap 34 to be pivoted about the connection 36 to move the trailing edge of the flap downwardly as the flap is moved rearwardly. This motion is due to the convergence of the tracks 38 and 42 which causes the lower bar 40 to be moved forwardly relatively to the upper bar 35 as the upper bar is moved rearwardly. Thus the rods 44 and 46 are also moved forwardly relatively to the upper bar as the latter moves rearwardly, causing the rod 46 to move the flap pivotally about the connection 36. When the upper bar 35 is moved to its rearwardmost position, the flap 34 assumes the position shown in FIG. 5 wherein substantially all of the flap is extended from the trailing edge of the wing and is disposed at a substantial angle thereto.

FIG. 6 is a plan view of the flap 34 shown in FIGS. 4 and 5 and shows the two linkage arrangements associated respectively with the two sides of the flap 34. From this figure, it will be noted that the two upper bars 35, 35 are driven by the two jack-screw mechanisms 39, 39. Each of these latter mechanisms includes an elongated screw shaft 48 and a nut 49 which is connected with the associated upper bar 35 and is moved axially in one direction or another along the screw 48, depending on the direction of rotation thereof. The screws 48, 48 of the two jackscrew mechanisms are driven by gear units 50, 50, and the two gears units 50, 50 are preferably interconnected and driven by a flexible shaft device 51, as illustrated, so that the screws 48, 48 are driven in unison and at the same speed. Preferably each of the four wing flaps indicated in FIG. 3 are actuated by mechanism similar to that shown in FIG. 6, and preferably the gear units 50, 50 of all the mechanisms are interconnected and driven from a common power source, as by a flexible shaft device so that the four flaps are extended and retracted simultaneously.

Figure 7:
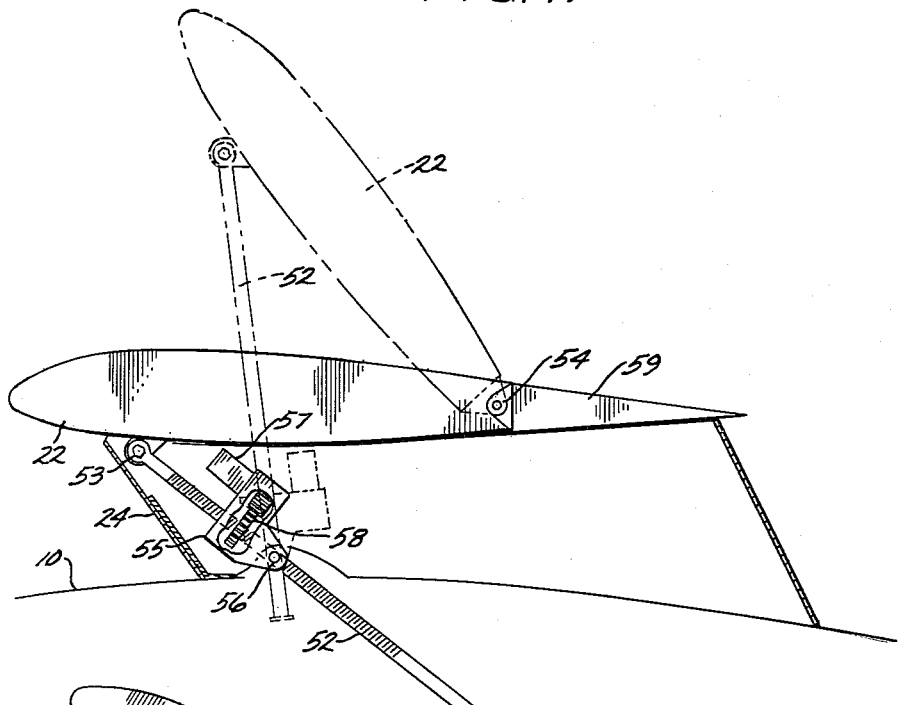
FIG. 7 is an enlarged vertical sectional view taken through one of the pylons showing the actuator used to tilt the wing.

*Wing Tilting Mechanism—FIG. 7*

Reference is now made to FIG. 7 for a description of the wing tilting mechanism. Preferably this mechanism is located within the pylons 24, 24 and each pylon is streamlined and provided with a rounded leading edge to avoid unnecessary drag.

The actuating means for tilting the wing and engines upwardly and downwardly as desired may, of course, be provided in a variety of workable forms. The presently preferred actuating means is shown for purposes of illustration in FIG. 7 to comprise a motor-driven pivotally mounted jackscrew located in one of the pylons 24. More specifically, the jackscrew shown in FIG. 7 comprises a screw shaft 52 pivotally connected, as at 53, with the wing 22 forwardly of the axis of tilt of the said wing, which axis is indicated by the reference number 54. A motor housing 55 forms a part of the jackscrew and is pivotally connected to the fuselage 10, as at 56. The housing 55 supports an electric motor 57 which is connected by suitable gearing to rotate a nut 58 within the housing 55, the nut being arranged to surround and threadably engage the screw shaft 52. The motor 57 is a reversible motor and when driven in one direction will rotate the nut 58 to advance the screw shaft 52 upwardly, thus tilting the wing 22 upwardly about its tilt axis 54. When the motor 57 is operated in the opposite direction, the nut 58 is rotated in the opposite direction to retract the jackshaft 52 and to retract or lower the wing 22. As shown in FIG. 7, the structure of the wing is such that between the two pylons 24, 24 and rearwardly of the pivot axis 54 it includes a section 59 which is fixed relative to the pylons and which does not tilt with the rest of the wing. The section 59, however, preferably extends only a short distance, if at all, outboard of the pylons so that outwardly from the pylons the full section of the wing is tilted.

Preferably, there is a jackscrew mechanism of the type described above located in each pylon 24 and, preferably, they are interconnected by a shaft or other means whereby they will operate in unison to share the load of tilting the wing and engines.

At this point, it should be mentioned that one important advantage obtained by eliminating the need for tilting of the wing and rotors a full 90° is that it allows the use of a wide number of different engines which tilt with the wing and rotor. Many engines, and especially turbine engines, are incapable of operating continuously throughout a 90° range of tilt, but are capable of so operating throughout the 60° range of tilt provided by the present invention.

*Wing Actuated Mechanism for Adjusting the Control System—FIG. 8*

As will be more fully described hereinafter, the control means which selectively provides airplane and helicopter control of the aircraft and which mixes airplane and helicopter control as desired includes a plurality of mechanisms which are adjustable to provide differing amounts of output motion for a given amount of input motion. These mechanisms will hereinafter be referred to as "variable output motion transmitting devices," or more briefly as "mixers." These mixers are so arranged and interconnected by other linkages that upon proper adjustment thereof they will function to provide airplane or helicopter control or mixtures thereof. This adjustment can be made to be a manual operation on the part of the pilot, or all or some of the said mixers can be adjusted automatically in response to an indicator or monitor of the flight condition or regime, such as the degree of wing tilt, the wing flap position, or the air speed.

For example, in the control system of FIG. 12 all of the mixers are adapted to be automatically adjusted in response to the wing tilt so that both helicopter and airplane control are programmed in accordance therewith. FIGS. 13, 14, 15 and 16 show other ways of adjusting the mixers and will be described hereinafter. It should be understood, however, that the control system of the invention, at least in its broader aspects, is not necessarily limited to any of the illustrated modes of operation and that other means for adjusting the mixers, either separately or in combination, could be provided.

FIG. 8 shows a mechanism which may be used with the control system of FIG. 12 to adjust the mixers of the control system responsive to the wing tilt. This mechanism includes a rigid link 60 which extends upwardly through the aircraft fuselage 10 and is pivotally connected at its upper end, as at 61, to that portion of the wing 22 which pivots relative to the fuselage about the axis 54. The lower end of the link or rod 60 is pivotally connected to one end of a bell crank 62 so as to rotate the bell crank about its axis 62$^a$ responsive to tilting movement of the wing 22. The other end of the crank 62 is pivotally connected to one end of a push-pull rod 63. Also connected to the lower end of the rod 60 is one end of another bell crank 64 which has its axis 64$^a$ located on the opposite side of the rod 60 from the axis 62$^a$ so that as the wing is moved the bell crank 64 rotates in the opposite sense to the bell crank 62. The other end of the bell crank 64 is connected to one end of another push-pull rod 65. Thus, as the wing 22 is raised the push-pull rod 63 will be moved to the left, as viewed in FIG. 8, and the rod 65 will be moved to the right.

At their other ends, the rods 63 and 65 are connected, as hereinafter described, with the mixers employed for phasing in and out helicopter and airplane control so as to adjust the said mixers in keeping with the angular disposition of the aircraft wing 22.

*Exemplary Mixer Construction—FIGS. 9, 10 and 11*

An exemplary variable output motion transmitting device or mixer adapted for use in the control system of the present invention is shown in FIGS. 9, 10 and 11 and is indicated generally at 66. The said mixer includes a transverse tube 67 supported at the bottom ends of two similar parallel arms 68, 68 which are suitably supported to pivot at their top ends about a common fixed axis indicated by the line 69, the said arms being spaced apart along the tube. Thus, the tube 67 is supported to swing in an arc indicated by the line 70. Movement of the tube 67 along the arc 70 is effected by a rod 71 inserted through the bore of the tube and pivotally connected with a push-pull rod, such as the push-pull rod 63 of the wing actuated mechanism shown in FIG. 8, the latter rod having a sleeve or tube 72 on its one end for receiving the rod 71.

When the tube 67 and the arms 68, 68 of the mixer 66 are in the full line position of FIG. 9, the said mixer is conditioned to provide full output movements of an output rod connected with the legs 73 of a bell crank 74 for input movements introduced by an input rod to one end of a link 75 which latter link is connected at its other end to the free end of the other leg 76 of the said bell crank 74. When the tube 67 and the arms 68, 68 are moved to the broken line position of FIG. 9, the mixer is conditioned so that no output movements of the bell crank 74 will result from input movements introduced to the mixer at the end of the link 75. At any intermediate position of the said tube and arms, the output movement derived from a given input movement will have an intermediate magnitude.

To effect this, the bell crank 74, comprising the legs 73 and 76, is supported for rotation about a fixed axis indicated by the line 78 and the input end of the link 75 is limited to movement in an arc about an axis 80 which axis swings with the arms 68, 68. That is, the upper or input end of the link 75 is pivotally connected to the upper ends of a pair of links 82, 82 which are equal in effective length to the length of the link 75. The links 82, 82 are in turn pivotally connected at their lower ends with the arms 68, 68 for pivotal movement about the common axis 80 which axis is located intermediate the ends of the arms 68, 68. Thus, with the tube 67 and the arms 68, 68 in the full line position of FIG. 9, any movement of the upper end of the link 75 will take place about the axis 80 in the direction of the arcuate arrow 84 and will effect a pivoting movement of the bell crank 74. This in turn results in an output movement of the bell crank leg 73 in the direction of the arcuate arrow 86 about the crank axis 78. However, when the tube 67 and the arms 68, 68 are placed in the broken line position of FIG. 9 the axis 80 will coincide with the axis 88 about which the lower end of the link 75 pivots relative to the bell crank leg 76. As a result input movement to the link 75 will cause no movement of the bell crank 74. At intermediate positions of the tube 67 and arms 68, 68, the magnitude of the bell crank movement will vary between the extremes mentioned for the same amount of input movement. It is therefore seen that the mixer serves as a means for varying in an infinitely variable manner the degree of output movement of the crank 74 produced by a given amount of input movement to the link 75. As used herein the term "infinitely variable" refers to the fact that the mixer or equivalent means is adjustable to provide any one of an infinite number of degrees of output movement, within the range between the maximum and minimum outputs, for a given input movement.

The operation of the mixer 66 may perhaps be better understood from the side views of FIGS. 10 and 11. In FIG. 10 the tube 67 and arms 68, 68 are shown positioned to provide a maximum output motion for a given input motion. The solid lines show the positions of the other parts of the mixer for one position of the input rod and the broken lines the corresponding positions of the parts for another position of the input rod. Thus, as the input rod is moved to the left from the solid line position to the broken line position the links 82, 82 are moved counterclockwise about the axis 80. This movement causes the link 75 to be moved in a generally downward direction, driving the arm 76 of the bell crank 74 in a counterclockwise direction to move the output rod connected to the arm 73 to the left, or in the same direction as the input rod. Movement of the input rod to the right, of course, causes movement of the output rod to the right.

In FIG. 11 the tube 67 and the arms 68, 68 are shown positioned to provide a zero output for any given input motion. As so conditioned, the axis 80, about which the links 82, 82 move relative to the arms 68, 68, is coincident with the axis 88 joining the link 75 and the arm 76 of the bell crank 74. Thus, as the input rod is moved from the solid line position to the broken line position the link connectors 82, 82 and the link 75 move in unison about the same axis, the axis 80, and cause no movement of the bell crank 74 or the output rod.

*General Discussion of the Control System*

From the foregoing description, it will be understood that the mixer 66 is a form of motion transmitting device providing a selectively variable magnitude of output motion for the input motion it receives. By proper adjustment of some of its parts, namely the tube 67 and the arms 68, 68, its motion transmitting effectiveness can be varied so as to produce an output motion varying from zero to a maximum value for any input motion received. There are a plurality of such mixers employed in the control apparatus of this invention. These mixers are connected between the pilot operable flight control devices, such as the stick, wheel and rudder pedal, and the airplane control surfaces and the rotor blade pitch changing means and serve upon adjustment to vary the effect of the pilot operable devices on said airplane control surfaces and said rotor blade pitch changing means. That is, the mixers control the amount of input to the rotor blade pitch changing means and the airplane control surfaces produced by given movements of the flight control devices.

Also, as hereinafter described, the control system includes mixers which serve during full or partial helicopter operation to introduce varying amounts of roll and yaw compensation to the rotor blade pitch changing means when the pilot operable devices are operated to provide yaw and roll movements respectively. When the wing is tilted from its lowered position, the wing roll and yaw axes are angularly displaced from the fuselage roll and yaw axes and therefore the introduction of rotor pitch control to produce pure rolling or pitching moments about the wing roll or yaw axes, respectively, does not result in pure or uncoupled roll or yaw about the fuselage roll or yaw axes. The helicopter roll and yaw compensation is therefore provided to overcome this effect so that substantially pure or uncoupled yaw and roll movements of the aircraft about the fuselage axes are obtained when the pilot operable devices are moved in the same predetermined directions as correspond to pure yaw and roll movements of the aircraft when operated as an airplane. That is, the roll and yaw compensation means serves to provide such an input to the rotor blade pitch changing means that the movements of the pilot operable devices will have substantially the same effect on the direction of movement of the aircraft when flown as a helicopter, or partially as a helicopter, as they do when the aircraft is flown as an airplane. The amount of roll and yaw compensation required for given movements of the pilot operable yaw and roll devices depends on the tilt position of the wing, and mixers are employed to vary the amount of compensation effected for such given movements. Preferably, these mixers are adjusted in response to the tilt of the wing so as to automatically provide the correct degree of compensation required for a given wing angle.

As has been suggested above, and as will be seen in the detailed description of the control system, the mixers are employed to select airplane control or helicopter control or a mixture of both for the aircraft. In the control system illustrated in FIG. 12, the mixers are arranged in two banks with one bank of mixers being effective to introduce helicopter control of the aircraft to the degree desired and the other bank being effective to introduce airplane control to the degree desired. By means of the mechanism shown in FIG. 8, both of these banks may be adjusted by the movement of the wing and in such a manner that one type of control is gradually phased in and the other type gradually phased out as the wing is tilted in one direction or the other. That is, when the wing is moved to its fully raised or tilted position the mixers of the bank providing helicopter control are adjusted for full output whereupon they provide maximum output movements for the input movements they receive from the stick, wheel, and rudder pedals. This is "adding full helicopter control." On the other hand, when the wing is fully lowered the said mixers are adjusted so that they will provide no output movement, this being characterized as "removing helicopter control." Likewise, when the wing is fully tilted the bank of mixers providing airplane control is adjusted for zero output to "remove airplane control," while when the wing is fully lowered this bank is adjusted to provide full output to "add airplane control." At intermediate positions of the wing both banks are adjusted to provide intermediate amounts of output movements in response to the input movements received, thereby mixing helicopter control with airplane control.

The control system, however, may also be modified from that shown in FIGS. 8 and 12 so that some or all of the mixers are selectively controllable by the pilot independently of the wing tilt or are controlled automatically in response to other indicators of the flight condition, such as the air speed or wing flap position. For example, FIGS. 13 to 16 show other means for controlling the mixers and these means will be described in detail following the description of FIG. 12. Also, the mixers need not necessarily be grouped in banks for collective adjustment, and some or all of the mixers could be adapted for individual manual adjustment by the pilot. In addition, it may not be necessary in all cases to provide for adding and removing airplane control. The airplane control surfaces, as mentioned, lose their effectiveness as the aircraft reaches a slow speed, and generally to retain their operability during helicopter operation will not have any great effect on the control moments imposed on the aircraft. However, if the pilot operable flight controls, such as the wheel, stick and rudder pedals, are connected by direct mechanical connections to the control surfaces, forces on these control surfaces caused by cross winds, tail winds and the like may be fed back to the flight controls so as to make their operation difficult and to destroy the pilot's "feel" of the control during helicopter operation. Therefore, it is preferred in such cases to provide mixers to allow the removal of airplane control, and which when adjusted to remove the airplane control effectively isolate the forces on the control surfaces from the flight controls. In many cases, however, the flight controls are connected indirectly to the control surfaces through power boosters or servomechanisms which by themselves serve to prevent force feedback by isolating the forces on the control surfaces from the flight controls, and thus the mixers for removing airplane control may be omitted.

The helicopter control bank of the FIG. 12 control system, as hereinafter described in detail, contains three mixers associated respectively with the roll, pitch and yaw flight control devices operated by the pilot. The output movement of the pitch mixer is transmitted directly to the rotor blade pitch changing means and serves to change the rotor blade pitches in a longitudinal cyclic manner to impose a pitching movement on the aircraft. Since the pitch axis of the wing 22 is coincident with or parallel to the pitch axis of the fuselage for all tilt positions of the wing, no compensation need be provided in this part of the control system. The output movement of the roll mixer is imposed both on a first differential motion transmitting device and on a compensating yaw mixer, while the output movement of the yaw mixer is imposed both on a second differential motion transmitting device and on a compensating roll mixer. The output movement of the compensating yaw mixer is in turn imposed on the first differential motion transmitting device and the output movement of the compensating roll mixer imposed on the second differential motion transmitting device. The first differential motion transmitting device thus receives input movements from the roll mixer and from the compensating roll mixer, and it functions to combine these two input movements into a single output movement. This output is then transmitted to the rotor blade pitch changing means to change the blade pitches in a differential collective manner to produce a rolling moment about the wing roll axis. Similarly, the second differential motion transmitting device receives input movements from the yaw mixer and from the compensating yaw mixer, and it functions to combine these two input movements into a single output movement. This output movement is then transmitted to the rotor blade pitch changing means to change the blade pitches in a lateral cyclic manner to produce a yaw moment about the wing yaw axis.

From the last paragraph it should be noted that, for a proper adjustment of the mixers, input movement to the roll mixer not only results in a roll moment about the wing roll axis, but also results in a yaw moment about the wing yaw axis. The latter moment is produced in response to the input to the compensating yaw mixer and is such that the resultant of the moments acting on the aircraft will be a substantially pure moment about the fuselage roll axis. That is, the yaw moment in effect compensates for the angular displacement of the wing axes relative to the fuselage axes so that an input to the roll mixer results in a roll moment about the fuselage roll axis despite the tilt of the wing. Likewise, input movement to the yaw mixer not only results in a yaw moment about the wing yaw axis, but also results in a roll moment about the wing roll axis to compensate for the tilt of the wing and produces a substantially pure yaw moment about the fuselage yaw axis.

The aforesaid addition or removal of helicopter control does not remove or add airplane control of the aircraft. Airplane control in the illustrated control system is added or removed by mixers in a second bank. Even then airplane control of aircraft roll by the spoilers 23, 23 is unaffected. That is, no attempt is made to change the amount of movement of the spoilers caused by operation of the wheel. Due to the fact that the spoilers are located in the slipstream of the rotors 30, 30, they are effective to impart some control moment on the aircraft even when the aircraft is operated at hover and low speeds with the wing tilted upwardly. The control moment in this case, however, will not be a pure roll moment with respect to the fuselage, but will include a yaw component because of the tilt of the wing axis relative to the fuselage axis. Nevertheless, the existence of the moment is found to be of some benefit and therefore is not eliminated by rendering the spoilers inoperable.

The mixers in the second bank include two which are respectively associated with the pilot operable pitch and yaw controls, or stick and rudder pedals. The output movements of these mixers are transmitted to the elevators and rudder respectively. The mixers are so arranged that full output movements, and consequently maximum movements of the elevator and rudder, will result from movements of the stick and rudder pedals when the bank is adjusted to provide airplane control. Similarly, no output movements and thus no elevator and rudder movements will result from movements of the stick and rudder pedals when the bank is adjusted to remove airplane control. At intermediate positions of adjustment, movements of the stick and rudder pedals will result in intermediate degrees of movement of the elevator and rudder.

The second bank of mixers also includes the compensating yaw and the compensating roll mixers. As the wing is tilted, however, the amounts of roll and yaw compensation required to produce pure or uncoupled yaw and roll vary in opposite directions. When the wing is fully lowered or at a small tilt angle little or no compensating roll is required to produce pure helicopter yaw movement in response to operation of the rudder pedals, whereas with the wing fully raised a maximum amount of compensating roll must accompany the yaw control movements to produce pure yaw movements. On the other hand, a maximum amount of compensating yaw must accompany the wheel movements to produce pure roll movements of the aircraft when the wing is fully lowered, whereas no such compensation is required when the wing is fully raised. Therefore, the compensating yaw mixer in the second bank is arranged to have full output when the wing is fully lowered and zero output when the wing is fully raised. On the other hand, the compensating roll mixer is arranged to have zero output when the wing is fully lowered and maximum output when the wing is fully raised.

*Detailed Description of the Control System—FIG. 12*

The arrangement of the banks of mixers and the arrangement of the differential motion transmitting devices in the control apparatus to achieve the desired results can be more fully described with reference to FIG. 12 wherein both banks of mixers are shown to be adjusted by the wing tilt, and wherein all parts of the system are shown in positions corresponding to a lowered position of the wing. The second bank of mixers containing the airplane control mixers will be described first. This bank is connected with the wing 22 by the push-pull rod 63 described above in connection with FIG. 8. The rod 63 is in its forward position when the wing is in its raised position and is in its rearward position when the wing is in its lowered position.

The mixers in the second bank are all similar to the exemplary mixer 66 described above and shown in FIGS. 9, 10 and 11, and are indicated generally by the reference numbers 89, 90, 92 and 94. They are arranged in a bank by having their tubes 67, 67 received on a transverse rod 96, similar to the exemplary rod 71 of FIG. 9, extending therethrough, which rod also extends through the tube 72 on the rear end of the push-pull rod 63 so that the latter rod is pivotally connected to said rod 96. Thus, when the push-pull rod 63 is shifted longitudinally, all of the mixers making up the bank are similarly shifted by having their tubes 67, 67 swung through an arc. In FIG. 12 the rod 63 and rod 96 are shown in their rearward positions with the axis of the rod 96 coincident with the line marked "Add." This is the condition when the wing 22 is in its lowered position, as for airplane flight, and in this condition the two mixers 89 and 90, which control the movements of the rudder and elevators respectively, are adjusted to provide maximum output movement to the rudder and elevators in response to movement of the rudder pedals and the stick by the pilot. Thus, in the illustrated positions of the rods 63 and 96 airplane control is "added." When the wing 22 is fully raised the rods 63 and 96 are moved forwardly to a position at which the axis of the rod 96 is coincident with the line marked "Remove." With the rod 96 in this forward position, the two mixers 89 and 90 are adjusted to provide a zero output so that no movement of the rudder and elevators will be obtained regardless of the amount of movent of the rudder pedals and stick. Thus, in this position airplane control is "removed."

The mixer 92 in the second bank is the compensating yaw mixer which serves to provide a varying amount of helicopter compensating yaw in accompaniment to movement of the pilot operable roll control device, or wheel. This mixer is arranged on the rod 96 in a fashion similar to that of the mixers 89 and 90 so as to have full output when the rod 96 is in the "Add" position, corresponding to the lowered position of the wing, and zero output when the rod 96 is in the "Remove" position, corresponding to the raised position of the wing.

The mixer 94 is the compensating roll mixer which provides for a varying amount of compensating helicopter roll in response to movement of the pilot operable yaw control device or rudder pedals. The mixer 94, however, is positioned on the rod 96 in a reverse relationship to the other three mixers so that when the rod 96 is in the "Add" position, corresponding to the lowered position of the wing, this mixer will have zero output and when the rod 96 is in the "Remove" position, corresponding to the raised position of the wing, it will have full output.

The first bank of mixers includes three mixers which are also similar to the exemplary mixer 66, these being indicated by the reference numbers 98, 100 and 102. They are arranged as a bank for common operation by having their tubes 67, 67 received on a rod 104. These mixers are adjusted to vary their output by the push-pull rod 65 having a tube 107 on its rearward end which is also received by the rod 104 so as to pivotally connect the rod 65 thereto. The push-pull rod 65 is operated by the wing through the mechanism shown in FIG. 8. When the wing is raised the rod 65 is in its rearward position and when the wing is lowered the rod 65 is in its forward position. Thus, the rod 65 serves to position the mixers 98, 100 and 102 in keeping with the angle of wing tilt. The mixers 98, 100 and 102 serve respectively to control in general the degree of helicopter pitch, yaw and roll movement produced by given movements of the stick, rudder pedals and wheel. In FIG. 12 the rod 65 and the rod 104 are shown in their forward positions with the axis of the rod 104 coincident with the line marked "Remove." This corresponds to a lowered position of the wing, and in this condition the three mixers are adjusted to provide zero output movement to the rotor blade pitch changing means in response to movement of the pilot operable control devices. Thus, in the illustrated position of the rods 65 and 104 helicopter control is "removed." When the wing is fully raised the rods 65 and 104 are moved rearwardly to a position at which the axis of the rod 104 coincides with the line marked "Add." With the rod 104 in this rearward position the three mixers 98, 100 and 102 are adjusted to provide a maximum output. Thus, in this position helicopter control is "added."

As shown in FIG. 12, the mixers of this invention are connected with pilot operable roll, pitch and yaw control devices in the form of a wheel 108, a stick 110 and rudder pedals 112, 112, respectively, which are similar to conventional devices of this kind used in airplanes to control the movement of control surfaces such as ailerons or spoilers, elevators and a rudder, respectively. These pilot operable devices are connected to the mixers by suitable means such as connecting rods and bell cranks which, for convenience, have been shown somewhat schematically in FIG. 12. The effect of movements of the wheel, stick and ruder pedals on the control system will be discussed in detail below by considering separately the roll, pitch and yaw control of the aircraft.

*Roll Control of Aircraft*

Referring first to roll control of the aircraft by manipulation of the wheel 108, it will be seen that the wheel 108 is connected to a push-roll rod 114 by means of a bell crank 116, a rod 117, a three-armed lever 118 and a cable 119 in such a manner that clockwise movement of the wheel 108, looking forwardly toward the wheel as seen by the pilot and as shown by the arrow, will cause forward longitudinal displacement of the rod 114 while movement of the wheel counterclockwise will cause rearward longitudinal displacement of the rod 114. The rear end of the rod 114 is pivotally connected with an arm 120 of a crank 122. The said crank includes two additional arms 124 and 126 connected to rods 128 and 130, respectively, whereby the input movement applied to the crank 122 by the wheel 108 through the connecting rod 114 and the arm 120 is divided into two outputs transmitted to the connecting rods 128 and 130 by the arms 124 and 126. Therefore, the crank 122 and all generally similar multi-arm cranks will be referred to hereinafter as divider cranks. The output movement from the divider crank 122 transmitted to the connecting rod 128 by the arm 124 is applied to the airplane spoilers 23, 23 to provide airplane control of the aircraft roll by moving the spoilers on one side or the other of the wing to various deflected positions relative to the wing. This may be done by providing a suitable mechanical linkage for directly connecting the rod 128 with the spoilers so that turning of the wheel 108, causing generally longitudinal movement of the connecting rods 114 and 128, will properly deflect the spoilers for clockwise or counterclockwise roll of the aircraft, depending upon the direction of wheel turn.

The structure of the means for connecting the rod 128 to the spoilers for the purpose of controlling the deflection of the latter may take various forms, and one exemplary means is shown in FIG. 18 and described hereinafter. The invention, however, is not limited to the motion transmitting means of FIG. 18, and hydraulic, electrical, or other such means could be employed in place of the direct mechanical linkage shown. Also other control surfaces such as ailerons could be used in place of the spoilers. At this time it should also be noted that in the illustrated aircraft the spoilers will be adjusted as a result of any movement of the wheel 108 and in any position of the wing 22 because no mixer linkage is connected between the wheel and the spoilers. When the aircraft is operating as a helicopter with the wing tilted fully upwardly, the spoilers are located in the rotor slipstream and are effective to produce some control moment even though the aircraft is moving forward at a relatively low or zero rate of speed. Operation of the spoilers during helicopter flight is not however entirely essential, and the invention contemplates that a mixer could be employed, if desired, to render the spoilers inoperative along with the rudder and elevator during helicopter flight.

The other output arm 126 of the divider crank 122 is connected by the rod 130 to the input arm of the mixer 102 in the first bank which is shown as positioned to remove helicopter control. Thus, the mixer 102 will provide no output movement of the output rod 132 regardless of the amount of movement of the input rod 130. It will be seen, however, that if the wing were positioned in its raised position the mixer would be adjusted by the push-pull rod 65 to provide full output movement of the output rod 132 for given movement of the input rod 130. If the mixer 102 is placed in an intermediate position, corresponding to an intermediate position of the wing, between no output and maximum output, helicopter roll control will be applied with intermediate effect.

The output rod 132 is connected to the input arm of a second divider crank 134 which is similar to the first divider crank 122. The output arms of the crank 134 are respectively connected by rods 136 and 138 to a first differential motion transmitting device 140 and to the before mentioned compensating yaw mixer 92. The output rod 136 of the crank 134 is pivotally connected to one end of a crossbar 142 of the differential motion transmitting device 140, the device 140 being generally in the form of a whiffletree. The crossbar 142 is pivotally supported intermediate its ends on one end of a lever 144 which at its other end pivots on a fixed axis indicated at 146. As hereinafter described, the other end of the crossbar 142 has an input movement applied thereto by a rod 182 to provide a compensating roll moment when the yaw controls are operated. The device 140 thus is adapted to receive two input movements which may be identified respectively as a basic yaw input, supplied by the rod 136 to one end of the crossbar 140, and a compensating yaw input supplied to the other end of the crossbar 140 by said rod 182. The device 140 serves to combine these two input movements in an additive manner, but in differing proportions, to produce a single resultant output movement which is transmitted by a rod 148 from the pivot support point of the crossbar 140 to another device 150, which will be referred to herein as a "pitch changer" and will be described hereinafter as controlling the pitches of the blades of the respective rotors 30, 30 in a differential collective manner in response to movement of the rod 148, so that one of the said rotors will be operated to provide more thrust or lift than the other to impart a rolling moment on the aircraft. The function of the device 140 is such that a given amount of basic yaw input provided by the rod 136 will produce a substantially proportionate output movement of the rod 148 and a given amount of compensating yaw input provided by the rod 182 will also produce a substantially proportionate output movement of the rod 148. However, the ratio of the basic yaw input movement to the output movement resulting therefrom will be substantially greater than the ratio of the compensating yaw input movement to its resulting output movement. If both inputs are applied at the same time, the output movement will be substantially equal to the sum of the individual outputs which would have been obtained by each input acting alone.

The output rod 138 of the crank 134, which rod transmits motion to the input arm of the compensating yaw mixer 92 causes a full output movement from the mixer 92 when the rod 96 of the second bank of mixers is in the position shown in FIG. 12. However, in FIG. 12, the rod 104 of the first bank of mixers is shown as set to provide zero helicopter control, corresponding to the wing being fully lowered. Therefore, no input motion is applied to the mixer 92 due to the ineffectiveness of the mixer 102. If the wing were fully tilted, the rod 96 would be moved to the "Remove" position and the rod 104 to the "Add" position. With this disposition of the rods 96 and 104 the mixer 102 would be effective to transmit motion to the compensating mixer 92, but the latter mixer would be ineffective to produce any output motion as a result of the input motion thereto. This lack of output from the mixer 92 when the wing is fully tilted is desirable since because of the action of the wing flaps 34, 34 no compensating yaw is required to produce pure rolling movements about the fuselage roll axis in response to operation of the wheel when the wing is fully tilted. At intermediate positions of the wing 22, both mixers 92 and 102 are adjusted to provide intermediate degrees of motion transmitting effectiveness so that an input motion to the roll mixer 102 will produce some output motion of the compensating yaw mixer 92. Actually, the magnitude of output movement from the mixer 92 per given amount of input movement to the mixer 102 is zero when the wing is lowered, rises to a maximum as the wing is raised to about the midpoint of its tilting movement, and then falls to zero as the wing is moved from the midpoint of its tilting movement to its fully raised position. The important consideration, however, is the ratio of the compensating yaw input, provided by the output of the mixer 92, to the basic roll input, provided by the output of the mixer 102, and this it will be noted decreases as the wing is raised and finally becomes zero when the wing reaches its fully raised position.

The output of the mixer 92 is transmitted by a rod 152 to one end of a crossbar 154 of a second differential motion transmitting device 156 which includes a lever 158 pivotally supporting the said crossbar 154 between its arms at one end and supported at its other end for pivoting movement about a fixed axis indicated at 160. The input for the device 156 consists of the compensating yaw input introduced at one end of the crossbar 154 by the rod 152 and a basic yaw input introduced at the other end of the crossbar 154 by a rod 178 as hereinafter described. The resultant output of the device 156 is taken from the pivot support point of the crossbar 154 and is transmitted by a rod 161, bell crank 162, rod 163, bell crank 164 and rod 165 to another device 166. The device 166 similar to the device 150, will also be referred to herein as a "pitch changer" and will be described in more detail hereinafter as adapted to cary the pitches of the blades of the respective rotors in a lateral cyclic manner in response to movement of the rod 165 to impart a yawing moment on the aircraft. It should also be noted that during full or partial helicopter operation the divider crank 134 moves in proportion to the degree of basic helicopter roll input, or differential collective pitch change, induced by movement of the wheel 108 and that the crank 134 is connected to the compensating yaw mixer 92 so that the degree of lateral cyclic pitch change applied to produce a compensating yaw moment will be related to or dependent on the degree of differential collective pitch change induced by movement of the wheel 108.

Yaw Control of Aircraft

Turning now to yaw control as effected by manipulation of the rudder pedals 112, 112, it will be seen that the latter pedals are connected by means of a three-armed lever 167, a rod 168, a bell crank 169 and a rod 170 with the input arm of a third divider crank 171 which is generally similar to the first described divider crank 122. The crank 171 has two output arms which are respectively connected with rods 172 and 173 to transmit motion therefrom.

The rod 172 is connected to the input arm of the mixer 89 which has its output arm connected to a rod 174, the latter rod being in turn mechanically connected by suitable linkage with the aircraft rudder 19 or, alternatively, connected to a reversible servomotor which operates the rudder for right and left yaw movement responsive to push and pull movements of the rod 174. Therefore, it will be seen that full output movement for airplane control of yaw is achieved when the mixer 89 is positioned as shown in FIG. 12 in accordance with a lowered position of the wing. When the mixer 89 is positioned to deliver zero output with the wing fully tilted there will be no yaw movement of the aircraft by the rudder. At intermediate positions of the wing 22 and mixer 89, airplane yaw or rudder control will be in keeping with the wing angle and will decrease as the wing is raised.

The rod 173 from the crank 171 is connected to the input arm of the yaw mixer 100 which is shown in FIG. 12 to be positioned by the wing controlled rod 65 for zero output. When the wing is fully tilted, however, the mixer 100 is adjusted to provide maximum output. The output motion from the said mixer is transmitted by a rod 175 to the input of a fourth divider crank 176 which is similar to the first described crank 122. The output arms of this crank provide first for a basic yaw input to the before described differential motion transmitting device 156 and secondly for an input to the compensating roll mixer 94 during helicopter operation. Therefore, there is no basic helicopter yaw input to the device 156 or input to the compensating yaw mixer 94 when the mixer 100 is positioned for no output, as when the wing is lowered. At intermediate positions of the latter mixer, basic helicopter yaw input and input to the compensating roll mixer are provided in keeping with the position of the wing.

To apply the basic helicopter yaw input to the differential motion transmitting device 156, the before mentioned rod 178 is connected between one output arm of the crank 176 and an associated end of the crossbar 154 of the device 156. The movement of the rod 178 supplies the basic yaw input, and this is combined as noted above with the compensating yaw input supplied by the rod 152 to produce a resultant output movement of the rod 161. This output in turn is transmitted to the pitch changer 166 for the purpose of changing the pitches of the blades of the rotors in a lateral cyclic manner, as previously mentioned.

Another rod 180 extends between another output arm of the crank 176 and the input arm of the compensating roll mixer 94 to provide for input to the helicopter compensating roll mixer. It will be remembered that the mixer 94 is disposed in reverse of the others on the rod 96 so that in the position shown (wing lowered position) no output motion is derived from the said mixer and, accordingly, no helicopter compensating roll input to the device 140 is provided. In full wing up and intermediate positions, the mixer 94 will provide output motion in keeping with the wing angle, and this output motion is transmitted by the before-mentioned rod 182 to an end of the crossbar 142 of the differential motion transmitting device 140. This movement of the rod 182 provides the compensating roll input to the device 140, which input is combined with the basic roll input supplied by the rod 136 to produce an output movement of the rod 148. As previously mentioned, this output is transmitted to the pitch changer 150 for changing the pitches of the rotor blades in a differential collective manner. It will also be noted that the divider crank 176 is a member which moves in proportion to the degree of basic yaw input, or lateral cyclic pitch change, induced by movement of the rudder pedals and that this member is also connected to the compensating roll mixer 94. Thus, the amount of differential collective pitch control applied to produce a compensating roll moment will be related to or dependent on the degree of basic yaw input or lateral cyclic pitch change induced by movement of the pedals 112, 112.

Pitch Control of Aircraft

As with the wheel and rudder pedals, the rod 183 from the stick 110 is drivingly connected with the input arm of a fifth divider crank 184 which, like the other cranks, has two output arms respectively connected to rods 186 and 188. The driving connection between the rod 183 and the crank 184 is provided by suitable motion transmitting linkage such as the bell cranks 189 and 190 and the rods 191 and 192 shown in FIG. 12. The rod 186 is connected to the input link of the mixer 90 in the second bank. The output motion of the mixer 90 is transmitted by a rod 193 to the airplane elevators 20, 20, or to a suitable servomotor therefor. Thus, when the wing is lowered, the mixer 90 is adjusted as shown to provide maximum movements of the rod 193 and elevators 20, 20 for given movements of the stick 110 to effect full airplane pitch control. When the wing is fully raised, however, the mixer 90 is adjusted to provide no output motion and thus no airplane control of the pitch of the aircraft. At intermediate positions of the wing the mixer 90 will be adjusted to provide intermediate amounts of elevator control of the aircraft pitch.

The rod 188 from the crank 184 is connected with the helicopter pitch mixer 98 in the first bank. The latter mixer has an output rod 194 which transmits motion through the bell cranks 195 and 196 and rods 197 and 198, to the pitch changer 166 to provide longitudinal cyclic pitch control of the blades of the rotors 30, 30.

Thus, when the pitch mixer 98 is positioned to provide full output, as when the wing is fully tilted, helicopter pitch control is achieved by operation of the stick. When the mixer 98 is positioned, as shown in FIG. 12, for no output, no helicopter control of aircraft pitch is available. At intermediate positions of the said mixer, the effectiveness of the stick on helicopter pitch control varies between zero and the maximum. Also, as mentioned previously, no compensating roll or yaw moments are required to produce pure pitching movement of the aircraft about the fuselage pitch axis when the stick 110 is operated by the pilot during helicopter flight. Therefore, the output of the helicopter pitch mixer 98 is connected directly to the pitch changer 166, and is not connected with any compensating mixer.

FIG. 13 Modification of the Control System

As mentioned previously, all the mixers of the control system shown in FIG. 12 are adapted to be adjusted automatically in response to the tilt of the wing, as by the mechanism shown in FIG. 8, but this arrangement is not necessary to the broader aspects of the invention and some or all of the mixers could be adapted for adjustment by the pilot or other automatic means. FIG. 13, for example, shows a modification of the FIG. 12 system wherein the helicopter control mixers are adjustable by the pilot and the airplane control and compensating mixers are adjustable in accordance with the wing tilt. Although FIG. 13 shows only a portion of the control system, it is to be understood that the remainder of the system not shown in FIG. 13 is similar to that shown in FIG. 12. The difference between the FIG. 13 system and the FIG. 12 system is that in the FIG. 13 system the push-pull rod 65, which controls the adjustment of the helicopter control or first bank of mixers, is adapted to be shifted manually by suitable pilot operable means rather than by means connected with the wing. Various suitable motion transmitting means operable by the pilot could be employed for shifting the rod 65, but for purposes of illustration this means has been shown in FIG. 13 to comprise a lever 200. The lever 200 is pivotally connected at its lower end with the rod 65 and is pivotally supported in the cockpit of the aircraft for movement about a fixed axis located intermediate its ends so that forward movement of the upper end of the lever will cause rearward longitudinal movement of the associated rod 65.

Thus, by manipulation of the lever 200 the pilot can adjust the first bank of mixers to provide varying amounts of helicopter control for given movements of the wheel, stick and rudder pedals. As in the FIG. 12 system, however, the push-pull rod 63 is connected with the wing through the bell crank 62 and rod 60 so that the second bank of mixers, containing the airplane control and compensating mixers, is adjusted by the tilt of the wing. Thus, although the amount of helicopter control available is adjustable manually by the pilot, the compensating mixers 92 and 94 which cooperate with the basic helicopter control mixers 98, 100 and 102 will always be adjusted to provide the correct amount of compensation required for the particular setting of the wing.

Also, it is contemplated that instead of being mounted in banks, any or all of the mixers of the control system could be separately mounted and be adapted for manual adjustment of its tube 67 by a separate pilot operable motion transmitting means such as the lever 200. Thus, for example, the three helicopter control mixers 98, 100 and 102 could be mounted separately from the rod 104 and be provided respectively with three pilot operable motion transmitting means for manually adjusting the positions of their tubes 67, 67. With this arrangement the pilot could thereby independently adjust the effectiveness of the wheel in regard to producing helicopter roll, the effectiveness of the stick in regard to producing helicopter pitch, and the effectiveness of the rudder in regard to producing helicopter yaw. Likewise, the two airplane control mixers 89 and 90 of the first bank could be mounted separately from the rod 96 and be provided with individual pilot operable means for manual adjustment of their tubes 67, 67. The two compensating mixers 92 and 94 could also be made manually adjustable, but since the amount of compensation required is a function of the wing tilt angle it is preferred that these mixers always be controlled by the tilt of the wing regardless of the manner in which the other mixers are adjusted.

FIG. 14 Modification of the Control System

FIG. 14 shows a modification of the FIG. 12 control system wherein the degrees of both helicopter and airplane control may be varied manually by the pilot.

In the FIG. 14 system the helicopter control or first bank of mixers is controlled, as in FIG. 13, by a manually operated lever 200 pivotally connected with the push-pull rod 65. The second bank of mixers, however, is divided into two separate groups by providing two separate rods 96a and 96b in place of the single rod 96. The rod 96a receives the tubes 67, 67 of the compensating mixers 92 and 94 and is adjusted by the push-pull rod 63, which latter rod is connected to the wing through the bell crank 62 and the rod 60. The airplane control mixers 89 and 90 have their tubes 67, 67 received by the rod 96b which is adapted for manual adjustment by a push-pull rod 65a and a lever 202.

It will therefore be evident from FIG. 14 that the degrees of helicopter or airplane control afforded by movements of the pilot operable flight control devices may be manually adjusted by manipulation of the levers 200 and 202, respectively. Nevertheless, the degree of compensation provided during partial or full helicopter control is adjusted in keeping with the tilt of the wing by the connection between the wing and the two compensating mixers 92 and 94.

FIG. 15 Modification of the Control System

Instead of being operated manually or in response to the wing tilt angle the mixers of the control system may be operated in response to some other monitor of the flight condition. FIG. 15, for example, shows schematically a means for operating the mixers in accordance with the airspeed of the aircraft, and which means may be incorporated into the control systems of FIG. 12 or of FIG. 14.

Referring to FIG. 15, the means there illustrated include a Pitot tube 530 which provides an indication of the forward airspeed by measuring the static and dynamic pressure of the air flowing past the tube. These two pressures are in turn imposed, through suitable connecting lines 532 and 534, on a transducer device 536 for converting the differential pressure into a related electrical signal. The device 536 may be of various conventional constructions and may, for example, consist of a diaphragm or bellows on opposite sides of which the static and dynamic pressures are imposed, and a potentiometer or other electrical pickoff device for converting the movement of the diaphragm or bellows into an electrical signal.

The output signal from the device 536 is conducted by means of a line or lines 538 to a servomotor 540 having an output arm 542 which is movable in one direction or another about its axis, as shown by the arrows, in response to the received signals. When incorporated into the FIG. 12 control system, the free end of the arm 542 is in turn connected with the push-pull rod 65. That is, the FIG. 12 control system is modified so that the push-pull rod 65 is operated by the servomotor 540 rather than by the wing tilt responsive mechanism of FIG. 8. The push-pull rod 63 of the FIG. 12 control system is however unaffected and remains connected with the wing.

The operation of the modified system is such that as the aircraft slows down the Pitot tube 530 in cooperation with the transducer 536 sends an electrical signal of proper character to the servomotor to cause movement of the arm 542 in the counterclockwise sense as viewed in FIG. 15. This movement of the arm 542 moves the rod 65 rearwardly and shifts the transverse rod 104 toward the "add" position, thereby adding helicopter control by adjusting the helicopter mixers 98, 100 and 102. If the wing is then tilted to transfer from airplane to helicopter flight the second bank of mixers will be adjusted by the rod 63 in accordance with the wing tilt to remove airplane control, by adjustment of the mixers 89 and 90, and to provide the proper amount of compensation for the helicopter control, by adjustment of the mixers 92 and 94.

In going from slow speed flight to high speed flight the Pitot tube and transducer supply a signal to the servomotor causing the latter to rotate the arm 542 in the clockwise sense, thereby shifting the rod 65 in the direction to remove helicopter control. If the wing is then moved from its raised to its lowered position the rod 63 will be operated to add airplane control and to properly adjust the compensating mixers in keeping with the wing tilt.

It is contemplated that the nature of the control over the helicopter mixers afforded by the airspeed responsive means of FIG. 15 may be either that of a two-position or a proportional controller. That is, the means may operate to move the helicopter mixers from the fully removed position to the fully added position when the aircraft slows down to a predetermined speed and to move the same from the fully added position to the fully removed position when the airspeed increases to another predetermined value, or it could operate to provide intermediate degrees of helicopter control over a given range of airspeeds so that as the airspeed gradually decreases over the given range the helicopter control is gradually added and as the airspeed is gradually increased over the given range the helicopter control is gradually removed.

The airspeed responsive means of FIG. 15 may also be used with the control systems of FIG. 14 to control both the helicopter and airplane mixers in accordance with the airspeed by adding a second servomotor 544 as indicated by the broken lines. That is, the FIG. 14 system is modified by connecting the push-pull rod 65 with the servomotor 540, in place of the lever 200, and by connecting the servomotor 542 with the push-pull rod 65a, in place of the lever 202. The servomotor 544 receives signals from the transducer 536 through the line or lines 538 and the line or lines 546, but acts in the reverse manner to the servomotor 540. That is, as the arm 542 of the servomotor 540 moves counterclockwise the arm 548 of the servomotor 54 moves clockwise so that as the rod 65 is moved to add helicopter control the rod 65a is moved to remove airplane control, and vice versa. The rod 63 is, however, unaffected and remains connected with the wing through the bell crank 62 and rod 60 so that the compensating mixers are adjusted in accordance with the wing tilt.

*FIG. 16 Modification of the Control System*

As previously mentioned, the degree of helicopter and/or airplane control afforded by the control system may also be varied in accordance with the position of the wing flaps, and FIG. 16 shows an exemplary means which may be incorporated into the FIG. 12 or FIG. 14 system for transforming the movement of one of the wing flaps into an adjustment of the helicopter and/or airplane control mixers.

In the lower right-hand portion of FIG. 16 is shown a wing flap 34 and the positioning mechanism associated therewith. This structure is similar to that shown by and described in connection with FIGS. 4, 5 and 6, except that in this case the upper bar 35 includes an upwardly extending ear 550 fixed to its forward end for movement therewith. Connected to the ear 550 is a forwardly extending bar 552 having a row of gear teeth which mesh with the larger one of the two gears 554 and 556, which gears are fixed together for rotation in unison about a common axis. The bar is held in place against the gear 554 by a back-up roll 558. The smaller gear in turn meshes with a gear segment forming a part of a two-armed lever 560 supported for movement about an axis 562.

Movement of the two-armed lever 560 in the wing is transferred to a three-armed lever 564 in the fuselage by means of two flexible cables 566 and 568. The cables as shown are connected respectively to the two arms of the lever 560 and to two corresponding arms of the lever 564, and are trained over the pulleys 570, 572, 574 and 576, the two pulleys 574 and 576 being supported on the pivot axis 54 of the wing and being of relatively small diameter so that tilting movement of the wing will have little shortening or lengthening effect on the cables. The lever 564 is fixed to a shaft 578, which is supported for rotation about its longitudinal axis.

If the motion transmitting means of FIG. 16 is incorporated into the control system of FIG. 12 the third arm of the lever 564 is connected to the push-pull rod 65, as shown, and the latter push-pull rod is disconnected from the wing tilt responsive mechanism of FIG. 8. The push-pull rod 63, however, is unaffected and remains connected to the wing through the bell crank 62 and the rod 60 so that the degree of airplane control and the degree of helicopter control compensation is adjusted in accordance with the wing tilt.

By transferring to the arrows in FIG. 16, which indicate the direction of movement of the various parts, it will be noted that as the wing flap moves forwardly from an extended to a retracted position, the push-pull rod 65 is moved forwardly to move the transverse rod 104 from the "Add" to the "Remove" position, thereby removing helicopter control. Likewise, if the wing flap were to be moved from the retracted to the extended position the rod 65 would be moved rearwardly to add helicopter control.

The motion transmitting means of FIG. 16 may also be incorporated into the control system of FIG. 14 by adding a lever arm 580, as shown by the broken lines, to the shaft 578. The latter arm is fixed to the shaft at approximately a 180° angular position with respect to the third arm of the lever 564 and at its outer end is connected with the rod 65a. That is, the third arm of the lever 564 is connected with the rod 65, in place of the lever 200, and the lever 580 is connected to the rod 65a, in place of the lever 202. The rod 65 is thus moved in the opposite direction to the rod 65a in accordance with the wing flap position so that as helicopter control is added, airplane control is removed, and vice versa. The rod 63 controlling the compensating mixers 92 and 94 is unaffected and remains connected with the wing through the bell crank 62 and the rod 60 so that the amount of compensation provided is adjusted in accordance with the wing tilt.

*Rotor Structure—FIG. 17*

Before considering the operation of the pitch changers 150 and 166 in controlling the blade pitches of the rotors 30, 30 for the purpose of maneuvering the aircraft as a helicopter and for varying the thrusts of the rotors, the structure of the rotors and of the rotor blade pitch control means associated therewith will be described. FIG. 17 shows schematically the presently preferred form of rotor assembly and pitch control means, and, although only one rotor and pitch control means is shown, it is to be understood that both of the rotors 30, 30, and both of the pitch control means associated therewith, are of identical construction except for a reversal of parts and shapes to provide for rotation of the rotors in opposite directions. In most of its aspects, however, the invention is not limited to the construction of the rotor and pitch control means shown, and other suitable constructions may be employed without departing from the invention. More particularly, it is to be understood that although the rotor is shown and described below as a three-bladed rotor, other numbers of blades may be provided in keeping with the broader aspects of the invention. It should also be noted that the pitch changers 150 and 166 and the two pitch control means associated with the two rotors collectively comprise the complete pitch changing means associated with the two rotors. That is, the devices 150 and 166, although referred to as pitch changers, do not act directly on the rotor blades, but instead act on the blades through the intermediary of the pitch control means associated with each rotor.

Referring to FIG. 17 the illustrated rotor 30 includes a hollow shaft 210 which is drivingly connected with the associated engine 26 so as to be rotated thereby about its longitudinal axis. The direction of rotation is indicated by the arrow in FIG. 17, and from this it will be understood that the illustrated rotor corresponds to the left or port rotor of FIG. 2, the rotor blades traveling upwardly as they pass in closest proximity to the fuselage. A hub assembly is provided on the free end of the shaft 210 and is of a clockcase construction, including two generally similar hub members 212, 212 which are fixed to the shaft at longitudinally spaced positions and between which other parts of the assembly are carried. Each hub member 212 has three radial arms 214, 214 which are equally angularly spaced, and the arms of each hub member are angularly aligned with corresponding arms of the other hub member so as to provide three pairs of spaced arms. Associated respectively with the three pairs of arms are three rotor blades indicated generally at 32, 32. Preferably, and as shown, the connections between the blades and the hub members are such that each blade is free to pivot or oscillate about a lead-lag axis extending generally parallel to the shaft 210 and also to pivot or oscillate about a flapping axis disposed in a plane generally normal to the axis of the shaft 210.

As shown in FIG. 17, the connection between each blade 32 and its associated pair of hub arms 214, 214 includes a generally cross-shaped pivot member 218 having one pair of arms pivotally connected to the arms 214, 214 for rotation about an axis, as indicated at 220, disposed parallel to the shaft 210; the axis 220 being the lead-lag axis about which the blade 32 may oscillate in a plane normal to shaft 210. When power is applied to rotate the shaft 210 and the blades 32, 32, the air resistance upon the blades causes them to lag or drag by swinging rearwardly about the lead-lag axes 220, 220. This tendency to drag is offset by centrifugal force and for any given set of flight conditions the blades assume relative positions representing a balance between the air resistance and the centrifugal force. In addition, by reason of cyclic pitch changes during helicopter operation, as hereinafter described, each blade tends to relatively lag when at its maximum cyclic pitch and to relatively advance or lead when at its minimum cyclic pitch. The pivotal connections of the blades to the hub members about the axes 220, 220 permit the blades to so oscillate with respect to the hub members in the plane of rotation.

Pivotally connected to the other pair of arms of the cross-shaped pivot member 218 associated with each blade 32, is a yoke 222. The connection between the yoke 222 and the member 218 permits the associated blade to pivot about an axis 224 disposed in a plane generally normal to the shaft 210. This is the flapping axis of the blade. Oscillatory or flapping movement of the blade about the axis 224 results from various factors, one of which is that during helicopter operation each blade has an increased lift as it moves relatively forward in the direction of flight and in opposition to air flow, and has a decreased lift as it moves relatively rearward in unison with the air flow. The lifting force imposed on the blade will be offset by a component of force derived from the centrifugal force and the angular position of the blade relative to the axis 224 will represent a balance between the lifting force and the centrifugally derived component. Changes in the lifting force will thus cause oscillation about the flapping axis 224. Although not shown in FIG. 17, it is advisable in most instances to provide suitable stops for limiting the movement of the blades about the lead-lag axes 220, 220 and about the flapping axis 224, 224.

In keeping with the invention, the blades 32, 32 of the rotor assembly 30 preferably include aerodynamic reaction parts which are adjustable in various different manners to provide: (1) for changing the pitches or incidence of the blades in a collective manner for varying the basic thrust of the rotor both during helicopter flight and during airplane flight, (2) for changing the lift characteristics of the blades in a cyclic manner producing control moments on the aircraft during helicopter flight, and (3) for varying the camber of the blades to enable the selection of the most efficient blade shape for each flight regime.

This aim may be achieved by constructing each blade of two separate parts which aerodynamically react with the air through which the blade passes to produce the desired lifting or thrust forces. One of these aerodynamic reaction parts is movable relatively to the hub about a radial or spanwise axis to change its pitch or incidence. The other aerodynamic reaction part is so positioned relative to the first part that the two parts in effect form a single blade and is adjustable relative to the first part about a generally radial or spanwise axis, independently of the movement of the first part relatively to the hub, to vary the camber of the blade. The first parts may be adjusted collectively to vary the basic thrust of the rotor and, although not shown in the present case, could also be adjusted cyclically to provide for cyclic pitch control. The second parts may be adjusted collectively to simultaneously change to the same extents the camber of the blades, and may also be adjusted cyclically to provide for cyclic pitch control. Actually, as will hereinafter be apparent, the cyclic adjustment of the second parts is more accurately described as a cylic camber adjustment, but for clarity and in keeping with conventional terminology as applied to helicopter control will be generally referred to herein as a cyclic pitch adjustment. That is, the term "cyclic pitch adjustment" as used herein is intended to cover any cyclic adjustment of the blade whereby its lift characteristic is varied cyclically at the frequency of the rotor rotation.

Since both collective and cyclic pitch control of the rotor blades are employed during helicopter operation and only collective control is employed during airplane operation, the first blade parts are preferably controlled collectively and the second parts cyclically. Thus, during airplane operation the cyclic control may be removed by eliminating the cyclical adjustment movements of the second set of the rotor blade reaction parts while retaining the ability to adjust the first set in a collective manner for propulsive thrust control.

An example of a rotor blade construction having two separate aerodynamic reaction parts, as set forth above, is shown by the blades 32, 32 of the rotor 30 of FIG. 17. In FIG. 17 only one of the blades is shown in detail, and it is to be understood that the other two blades of the rotor are similar to this one. Fixed to each yoke 222 is a hollow shaft 226 which supports a rotor blade body portion 228 for rotation about a radial or spanwise axis. The body portion 228 rotates with the hub members 214, 214 when the shaft 210 is rotated and is provided with an aerofoil cross section so as to react with the air through which it is moved to produce a component of thrust or lift which is transmitted to the hub members. By means of the pivotal connection between the body portion 228 and its supporting shaft 226 the body portion may be rotated about its longitudinal axis to change its pitch or incidence to the air to modify the resultant thrust reaction. This pitch changing movement of the blade body portion is effected by suitable means such as an arm 230 fixedly secured to the root thereof, the movement of the arm 230 being in turn controlled by other suitable means such as the collective pitch control means hereinafter described. The three blade body portions 228, 228 comprise the set of first aerodynamic reaction parts referred to in the discussion above.

The second aerodynamic reaction part of each blade in the illustrated rotor consists of a flap 232 which is movable relatively to the associated blade body portion and which in the present case is located adjacent the outer trailing edge of the body portion which is notched as shown to receive the flap. The flap 232 is provided with an aerofoil cross section for thrust producing reaction with the air and is pivotally connected to the blade body portion 228 for adjustable movement relative to the body portion about a radial or spanwise axis 234. Each flap 232 and its associated body portion 228 in effect form a single rotor blade and adjustment of the flap about the axis 234 relative to the body portion will effectively change the camber of the blade and modify its aerodynamic characteristics by changing the cross-sectional or aerofoil shape of the blade in the longitudinal region of the flap. Adjustment of the flap 232 is performed independently of the movement of the body portion relative to the hub members and is effected by movement imparted thereto by a linkage arrangement comprising a rod 236 connected to a horn 237 on the flap, a bell crank 238 pivotally connected to the blade body portion 228, and a rod 240 which extends through the body portion 228, the hollow shaft 226, and an opening in the center of the member 218. The movements of the three rods 240, 240 associated with each rotor 30 control the positions of the three flaps in both a collective and a cyclic manner as hereinafter described.

As mentioned, previously, the three arms 230, 230 of each rotor assembly are connected with a means for controlling the pitch or incidence of the blades in a collective manner. This means includes a control rod 242 positioned within the shaft 210 and supported for longitudinal sliding movement relative thereto. At its upper end, as viewed in FIG. 17, the control rod extends beyond the upper hub member 212 and has fixed thereto a three-armed spider 244. Each arm of the spider is in turn pivotally connected to one end of a respective rocker 246 supported intermediate its ends by a bifurcated arm 248 provided on the upper hub member. The other end of each rocker 246 is connected by a rod 250 to an associated arm 230. From FIG. 17, it will therefore be apparent that sliding the control rod 242 in one direction or the other relative to the shaft 210 will simultaneously and to the same extent change the pitches of the three blades 32, 32 by rotating the blade body portions 228, 228 about the axes of the shafts 226, 226, the movement of the control rod 242 being transmitted simultaneously to the three blades through the rockers 246, 246, the rods 250, 250 and the arms 230, 230. Movement of the control rod 242 thus changes the pitches of the rotor blades in a collective manner and controls the basic thrust or lift provided by the rotor. As indicated by the arrows in FIG. 17, movement of the control rod upwardly will increase the pitches of the blades while movement downwardly will decrease the pitches of the blades.

Cyclic pitch or camber changes of the rotor blades 32, 32 of the rotor 30 shown in FIG. 17 are produced by an azimuth mechanism 251 associated with the shaft 210. The azimuth mechanism is of generally conventional construction and comprises an annular swash plate 252 which engages and is supported on the shaft 210 by a ball member 254 having a spherical outer surface. The swash plate rotates with the shaft 210 and swivably engages the ball member so as to be generally restrained against axial movement relative thereto but free to pivot or wobble in any direction about the center of the ball member. Surrounding the swash plate is a ring member 256 which is rotatably connected with the outer margin of the swash plate. The swash plate is therefore free to rotate relative to the ring member but is positioned thereby so that its axis of rotation coincides with the axis of the ring member. That is, although the swash plate may rotate relative to the ring member, it is restrained thereby to lie in the plane of the ring member and any change in the inclination of the ring member relative to the axis of the shaft 210 will cause a corresponding change in the inclination of the swash plate. Adjustment of the ring member 256 to change the inclination of the swash plate is effected by three azimuth control rods 258, 260 and 262, pivotally connected to the ring member as shown. The two rods 258 and 260 are located diametrically opposite from each other and work in opposition to tilt the ring member and swash plate about an axis passing through the point at which the rod 262 is connected to the ring member. The rod 262 is located midway between the rods 258 and 260, and functions by itself to tilt the same parts about an axis passing through the points at which the rods 258 and 260 are connected to the ring 256.

Three other rods 264, 264 are pivotally connected at their lower ends to the swash plate 252, and extend from the swash plate toward the lower hub member 212 and through openings in the same, as viewed in FIG. 17, one of the rods 264 being behind and hidden by the shaft 210 in the latter figure. The upper ends of these rods are connected respectively to corresponding arms of three bell cranks 266, 266 pivotally mounted on the lower hub member 212. The other arms of these bell cranks are respectively connected with the three rods 240, 240 controlling the movement of the blade flaps 232, 232. Referring to FIG. 17, it will be observed that upward movement of any one of the rods 264, 264 will cause the trailing edge of the associated flap 232 to be pivoted downwardly with respect to its body portion 228, thereby increasing the effective camber of the blade 32, while downward movement of the same rod will pivot the flap in the opposite direction to decrease the effective camber of the blade.

In FIG. 17, the swash plate 252 and the ring member 256 of the azimuth mechanism 251 are shown in their neutral positions at which both parts are disposed with their common axis coincident with the axis of the shaft 210. In this position, rotation of the shaft and swash plate relative to the ring 256 will cause no movement of the rods 264, 264 and consequently no movements of the flaps 232, 232. Assume now, however, that the axis of the ring member and swash plate is tilted or inclined relative to the axis of the shaft by a combined movement of the control rods 258, 260 and 262. Each point on the periphery of the swash plate will then oscillate axially relative to the shaft 210 as the latter rotates due to a wobbling motion of the plate with respect to the shaft, and during each revolution of the shaft each point on the swash plate will move between a lowermost axial position and an uppermost axial position. In like fashion, each of the three rods 264, 264 attached to the swash plate 252 will be oscillated longitudinally as the shaft 210 rotates, and for each revolution of the shaft will be moved through one cycle of oscillation between an uppermost and a lowermost position with each rod attaining such uppermost and lowermost positions as they pass diametrically opposite points on the ring 256. As a result of this, the camber of the blades 32, 32 is changed by movement of the flaps 232, 232 as the rotor rotates. This change in camber is of a cyclic nature with the flaps repeatedly reaching their lowermost positions when at one angular position relative to the ring member 256 and repeatedly reaching their uppermost positions when at the diametrically opposite position. The amplitude of the cyclic flap movement can be varied by changing the degree of inclination of the azimuth ring member relative to the axis of the shaft 210.

The effect of the cyclic adjustment of each flap is to cause a cyclic variation in the lift of the blade of which it forms a part. That is, the cyclic adjustment of the flap causes the blade to have a maximum lift at one point in its path, a minimum lift at a diametrically opposite point, and intermediate degrees of lift at other points.

The effect, in fact, is substantially the same as that obtained by the cyclic pitch adjustment of a conventional helicopter rotor, and therefore, as mentioned previously, the cyclic adjustment of each flap may be considered, and is hereinafter sometimes referred to, as a cyclic pitch adjustment. The net effect of the cyclic pitch adjustment of the three blades is equivalent to tilting the axis of rotor rotation and consequently the thrust vector, in a direction related to the direction of inclination of the ring member 256. Therefore, the direction of the thrust vector associated with the rotor may likewise be changed by changing the direction of inclination of the ring member 256 relative to the axis of the shaft 210. As described in more detail below in connection with FIG. 22, however, the direction of inclination of the thrust vector relative to the shaft 210 is in general different from the direction of inclination of the ring member and swash plate and is displaced therefrom by a phase angle which varies somewhat depending on the flight conditions.

As suggested previously the basic camber of the blades is also adjustable to enable the selection of the most efficient blade shape for the particular flight regime of the aircraft. To achieve this, the ball member 254 of the azimuth mechanism 251 is slidably received on the shaft 210 so that the entire azimuth mechanism may be shifted axially of the shaft by a simultaneous upward or downward displacement of the three control rods 258, 260 and 262. This shifting of the azimuth mechanism in turn causes a simultaneous and equal upward or downward displacement of the rods 264, 264 and consequently a collective movement of the three blade flaps 232, 232. Movement of the azimuth mechanism upwardly or toward the hub members 212, 212 will cause the flaps to be moved simultaneously and to the same extents in such a direction as to increase the basic camber or curvature of each blade, while movement in the opposite direction or away from the hub member 212, 212 has the opposite effect of moving the flaps collectively in such a direction as to decrease the basic camber of each blade. Therefore the blade flaps in addition to being adjustable in a cyclic manner by the azimuth mechanism are also capable of being adjusted in a collective manner. For each setting of the collective adjustment each blade flap will have a corresponding neutral position with respect to its blade body portion and about which neutral position the flap moves in its cyclic motion. Although the camber of the blade changes as the flap partakes of cyclic motion the basic camber of the blade will be that of the flap in its neutral position.

As will be apparent from FIG. 17, the ring member 256 may be inclined in any direction. Thus, the line of the thrust provided by the rotor can be inclined in any direction relative to the shaft 210. These changes in the direction of the thrust are used to maneuver the aircraft during helicopter flight. To produce yawing moments, the pitch or camber of the blades of both of the rotors 30, 30 are so cyclically changed that the thrust lines of action or vectors of the two rotors are inclined to the axes of the shafts 210, 210 and disposed in plane generally parallel to the surface of the wing 22. This is the equivalent of tilting each rotor shaft 210 to bring one side of the blade tip path closer to the leading edge of the wing and the opposite side further away from the leading edge. This type of cyclic pitch change is referred to as lateral cyclic control, and in employing it to produce yawing movements of the aircraft the blades of both rotors are so controlled that both rotors are in effect tilted in the same direction. The effective tilting of each rotor shaft 210 produces a thrust component perpendicular to the shaft, and the perpendicular component of the two rotors act in the same direction about the center of gravity of the aircraft to produce a yawing moment.

Pitching movements of the aircraft during helicopter flight are obtained by controlling the pitch or camber of the rotor blades in such a cyclic manner that the thrust lines of action or vectors of the two rotors are inclined from the axes of the shafts 210, 210 and disposed in planes extending normal to the wing 22 and longitudinally of the fuselage. This is equivalent to tilting the rotors to swing the blade tip paths about a line parallel to the leading edge of the wing. The cyclic pitch changes are so controlled that the blade tip paths of both rotors are in effect swung in the same direction and this type of pitch change is referred to herein as longitudinal cyclic control.

In addition to lateral and longitudinal cyclic pitch control of the rotor blades to provides for yawing and pitching movement of the aircraft, the rotor blades may also be changed in a differential collective manner to produce rolling movement. During differential collective control the pitches of the blades of both rotors are all changed to the same extent, but with the blades of one rotor being changed in a sense opposite to those of the other rotor by movements of the control rods 242, 242. That is, the pitches of all three blades of one rotor are changed to the same extent to increase the thrust of the rotor, while the three blades of the other rotor are changed to the same extent but in the opposite direction to decrease the thrust. Thus, one side of the wing will have more thrust imposed on it than the other side and the difference in thrust will produce rolling movement of the aircraft when the wing is raised.

*Rotor Blade Pitch Changing Means—FIGS. 12 and 17*

Reference is now made to FIGS. 12 and 17 for a description of the blade pitch changers 150 and 166, and of their cooperation with the other parts of the control system and with the pitch control means associated with the two rotors 30, 30. As used herein, and in the claims, the term "rotor blade pitch changing means" includes the pitch changers 150 and 166 and all of the motion transmitting parts connected between the pitch changers and the blade body portions and the blade flaps, including the azimuth mechanisms and the collective pitch control rods 242, 242. This means serves to receive input movements from the control system corresponding respectively to desired changes in the lateral cyclic, longitudinal cyclic, differential collective, and normal collective pitches of the rotor blades, and to convert these input movements into the proper adjustments of the blade parts necessary to achieve the desired pitch changes. It is to be understood that the invention is not necessarily limited to the rotor blade pitch changing means shown and that various other alternative means performing the same function may be employed. Since the structure and operation of the azimuth mechanisms and other pitch control parts associated with the rotors have been described above, this section will deal primarily with the pitch changers 150 and 166. The means for transmitting the output movements of the pitch changers to the pitch control means of the two rotors will be described in following sections.

It should also be noted that the pitch changer 166 is associated with the rotor blade flaps 232 and therefore might more accurately be described in this case as a camber changer. However, since the cyclic movement of the flaps has the same effect as a cyclic pitch adjustment of the blades, and since it is contemplated that the device 166 could also be used with other rotors to actually cause a true pitch adjustment, the term "pitch changer" will be used herein to refer to this device.

The pitch changers 150 and 166 are in effect differential motion transmitting means and serve to mix with or add to the movements of the rods 148, 165 and 198, which respectively control the differential collective, the lateral cyclic, and the longitudinal cyclic pitches of the rotor blades, movements from other rods for controlling the collective pitch and basic camber of the blades. The pitch changer 150 is, for example, associated with the blade body portions 228, 228 of both rotors and is operable in response to movement of the rod 148 to cause a differential collective pitch change, or operable in responsе to movements of another rod to cause a normal collective pitch change. The pitch mixer 166 on the other hand is associated with the blade flaps 232, 232 of both rotors and is operable either by the rod 165 or the rod 198 to cause a cyclic pitch change or by another rod to cause a change in the basic camber of the blades.

Considering first the structure of the blade body portion pitch changer 150, it will be observed that this device includes a three-armed lever 270 pivotally connected at its center between and at one end of the spaced arms of a bell crank 272, the ball crank being supported for rotation about a fixed axis indicated at 274. Connected to the depending arm of the lever 270 is the helicoptor roll control (or differential collective) rod 148. Longitudinal movement of the latter rod in one direction or the other will swing the lever 270 about its pivot axis to raise one and lower the other of its other two arms which are connected respectively to two rods 276 and 278. The rod 276 is in turn connected by suitable mechanical linkage, or alternatively by a suitable electrical or hydraulic device, with the collective pitch control rod 242 of the right-hand or starboard rotor 30. The rod 278 is in turn connected by similar means with the collective pitch control rod 242 of the left-hand or port rotor 30. The means for transmitting the movements of the rods 276 and 278 to the associated pitch control rods may as mentioned take various forms, but for the purpose of illustration one suitable form is shown in FIG. 19, and described in more detail hereinafter. At this point it should be noted, however, that movement of the rod 148 in one direction or the other moves the rods 276 and 278 to the same extents but in opposite directions; and that this accordingly causes movement of the two collective pitch control rods 242, 242 to the same extents but in opposite directions so that the blade pitches are changed in a differential collective manner to provide a rolling moment on the aircraft when the wing is raised.

Because of the conditions under which the aircraft is operated, it may at times be found during airplane flight with the wing lowered that a constant force on the rudder pedals 112, 112 is required to keep the aircraft in trim or to maintain its heading in a given direction. If the given direction is to be maintained for a relatively long distance, it is desirable that a trim mechanism be provided whereby the pilot may adjust the control system to provide the required amount of yaw moment necessary to maintain a trim condition without the need for exerting any force on the rudder pedals. In the present instance such a trim mechanism is provided, and includes a means for connecting the rod 148 to the lever 270 whereby the effective length of the rod may be selectively varied by the pilot. This means comprises a housing 280 which is pivotally connected to the depending arm of the lever 270 and which receives the rearward end of the rod 148. Extending from the rear end of the housing is a shaft 282 which is connected by suitable means (not shown) with pilot operable mechanism in the cockpit and is adapted to be rotated in one direction or the other about its longitudinal axis by pilot operation of said latter mechanism. Rotation of the shaft 282 in one direction causes the housing 280 to take up or shorten the rod 148, by means of threaded parts in the housing, while rotation of the shaft 282 in the opposite direction causes the housing to let out or lengthen the rod 148. It will be obvious from FIG. 12 that the lengthening or shortening of the rod 148 will pivotally adjust the lever 270 to provide a differential change in the collective pitches of the two rotors. When the wing is lowered, as in airplane flight, this differential collective pitch change will impart a yaw moment on the aircraft. Thus, by rotating the shaft 282 to the proper position the pilot may change the pitch of the rotors to produce a yaw trim moment of the proper magnitude and direction whereby the aircraft will maintain a given heading with the rudder pedals in their neutral position.

In addition to providing for differential changes in the collective pitches of the rotors 30, 30, the pitch changer 150 also is operable to change the collective pitches thereof in a normal manner, that is, uniformly and in the same sense, so as to control the propulsive thrusts of the rotors during airplane flight or the lifting forces produced thereby during helicopter flight. This is accomplished by a primary thrust control (or normal collective) rod 284 connected at one end to the other arm of the bell crank 272 as shown in FIG. 12. The other end of the rod 284 is connected with a pilot operable device, such as a stick 285 similar to the collective control stick of a helicopter, located in the cockpit whereby the pilot may selectively adjust the rod to different longitudinal positions. The stick 285 is pivotally connected at its lower end to the fuselage or other stationary structure of the aircraft and the rod 284 is pivotally connected thereto intermediate its ends so that a generally rearward or raising movement of the stick results in rearward movement of the rod and a generally downward or lowering movement of the stick results in forward movement of the rod. Such adjustment of the rod 284 swings the spaced arms of the lever 272 in a generally vertical direction and accordingly raises or lowers the lever 270 depending on the direction of movement of the rod 284. As the lever 270 is raised or lowered, the two rods 276 and 278 attached thereto are simultaneously moved in the same direction and consequently act to move the two collective pitch control rods 242, 242 of the two rotors in the same direction to collectively change the pitches of the blades thereof, thereby simultaneously increasing or decreasing the rotor thrusts.

The blade flap pitch changer 166 functions in part as a means for controlling the cyclic pitch changes of the blades of the two rotors 30, 30 for effecting yaw and pitch movement of the aircraft during helicopter flight. This device in the illustrated case comprises a bell crank 286 and a three-armed lever 288 pivotally connected between and at the outer ends of the three spaced arms of another bell crank lever 290 as shown in FIG. 12. The lever 290 is supported for pivoting movement about a fixed axis indicated at 292. The helicopter pitch control (or longitudinal cyclic) rod 198 is pivotally connected to the depending arm of the bell crank 286, while the other arm of the latter bell crank is pivotally connected to a rod 294. By suitable linkage or other mechanism the latter rod 294 is connected with both of the azimuth control rods 262, 262 of the two rotors 30, 30 with the result that movement of the rod 294 produces corresponding movements of the two rods 262, 262. These two rods in turn act to tilt the ring members 256, 256 of the azimuth mechanisms in such similar directions as to vary the pitches of the rotor blades in a longitudinal cyclic manner. In other words, movement of the rods 262, 262 by the rod 294 will change the cyclic pitch of the rotor blades in a manner which is essentially the equivalent of swinging the blade tip paths in the same direction about an axis parallel to the leading edge of the wing, and such pitch change will change the pitching moment applied to the aircraft. The pitching moment may be either negative or positive depending on the direction in which the stick 110 is moved. Moving the stick 110 forwardly changes the cyclic pitch to produce a positive pitching moment tending to move the aircraft nose down, while moving the stick aft produces a negative pitching moment tending to move the aircraft nose up.

Although it is contemplated that various different means could be employed for transmitting the movements of the rod 294 to the azimuth control rods 262, 262, a suitable means is shown by way of example in FIG. 20 and will be described in more detail hereinafter.

The depending arm of the other lever 288 of the pitch changer 166 is pivotally connected to the yaw control (or lateral cyclic) rod 165 for movement thereby, while the other two arms thereof, as shown in FIG. 12, are connected respectively to two other rods 296 and 298. The latter two rods are in turn connected by suitable linkage or other mechanism to the azimuth control rods 258, 258 and 260, 260 of the two rotors so that movement of the rods 296 and 298 will result in an adjustment of the azimuth ring members 256, 256 about axes perpendicular to the axes of movement associated with the rods 262, 262. The two ring members are moved in unison and in the same direction with the result that the cyclic pitches of the blades of the two rotors are changed in a lateral manner and in the same direction, thereby producing a yawing moment on the aircraft. That is, the tilting of the two ring members varies the cyclic pitches of the rotor blades in a manner which is essentially the equivalent of swinging the blade tip paths about axes generally normal to the wing with each rotor having its blade tip path swung in the same direction.

A suitable means for transmitting the movements of the rods 296 and 298 to the azimuth control rods is shown by way of example in FIG. 21 and described in more detail hereinafter. It will be understood, however, that means other than that shown may also be used to fulfill this function if desired and without departing from the invention.

As previously mentioned, the pitch changer 166 is associated with the blade flaps and serves in part as a means for controlling, by means of the flaps, the cyclic pitch (or camber) changes of the rotor blades. In addition, it also serves to provide for collectively changing the blade flaps of the two rotors to change the basic camber of the blades, thereby allowing the camber to be adjusted to the optimum value for any given flight condition. In the illustrated case the means for accomplishing this collective control of the blade flaps includes a camber control rod 300 pivotally connected to the free end of the bell crank lever 290 as shown in FIG. 12. The rod 300 is adjustable longitudinally by means of suitable pilot operable mechanism, such as a stick 301, located in the cockpit and mechanically connected therewith. From FIG. 12, it will be apparent that forward movement of the rod 300 as a result of a generally rearward displacement of the stick 301 will swing the bell crank lever 290 in a counterclockwise sense to simultaneously raise the three rods 294, 296, and 298. This will cause a corresponding movement of the three azimuth control rods 258, 260 and 262 associated with each rotor, with each of the three rods being moved in the same direction, and accordingly will cause both azimuth mechanisms to be moved axially of their associated shafts 210, 210, the ball members 254, 254, as previously mentioned, being slidably received on their respective shafts 210, 210 to permit such movement. Such axial shifting of the azimuth mechanisms in turn imparts uniform movements to the three rods 264, 264 of each rotor with the result that the three associated flaps 232, 232 are adjusted uniformly in the same direction relative to their blade body portions. Movement of the thrust control rod 300 rearward by a forward displacement of the stick 301 adjusts the flaps in the opposite direction. It will therefore be understood that by adjusting the stick 301 the neutral positions of the flaps 232, 232 relative to their blade body portions may be varied to provide for controlling the basic camber of the blades. Generally the stick 301 is set to provide a relatively high degree of blade camber during low speed airplane or helicopter flight and to provide a relatively low degree of blade camber during high speed flight.

At this point it should also be noted, as mentioned previously, that the direction of inclination of the ring member and swash plate of each azimuth mechanism in general differs from the direction of inclination of the associated thrust vector. This difference in inclination is due, among other things, to the flapping and/or lead-lag motion of the rotor blades and is such that the direction of the thrust vector is displaced forwardly in the direction of rotation from the direction of the inclination of the ring member and swash plate. That is, the pitch variations of the rotor blades may be said to lead the input movements to the azimuth mechanism causing the pitch variations. Here the direction of inclination of the thrust vector is considered to be represented by the projection of the thrust vector on a plane normal to the shaft 210 and the direction of inclination of the ring member and swash plate to be represented by the projection on the same plane of a line drawn normal to the plane of the ring member and swash plate. The phase angle between these two directions varies slightly with the flight conditions but in the illustrated aircraft has been found to average about 69°.

The consequences of this phase angle are shown schematically in FIG. 22 which is a view looking aft toward the two rotors. Considering first the left-hand rotor, the axes indicated at $x$ and $y$ represent the axes about which the swash plate and ring member are moved by operation of the azimuth control rods, operation of the rod 262 causing movement of the swash plate and ring member about the $x$ axis and operation of the two rods 258 and 260 causing movement of the same about the $y$ axis. The axes indicated at $x'$ and $y'$ represent corresponding axes about which the blade tip path plane or thrust vector is rotated as a result of movement of the ring member and swash plate. That is, movement of the ring member and swash plate about the $x$ axis causes a related movement of the thrust vector about the $x'$ axis, and movement of the ring member and swash plate about the $y$ axis causes a related movement of the thrust vector about the $y'$ axis. The displacement between the two sets of axes is the phase angle referred to above and is approximately 69°, the $x'$, $y'$ set being reached by rotating the $x$, $y$ set forwardly 69° in the direction of rotor rotation as indicated by the arrow. The position of the azimuth or $x$, $y$ axes is fixed by the location of the control rods 258, 260 and 262 and in the present instance is such that the $y$ axis is located 69° from a plane passing through the rotor axis and normal to the wing. Therefore, when the phase angle is exactly 69° the $y'$ axis will be generally normal to the wing and the $x'$ axis generally parallel to the wing. Thus, movement of the control rod 262 results in the blade tip plane being moved about an axis parallel to the wing to provide longitudinal cyclic pitch control and movement of the control rods 260 and 258 results in the blade tip plane being moved about an axis normal to the wing to provide lateral cyclic control.

The consequences of the phase angle are the same with respect to the right-hand rotor as they are for the left-hand rotor. That is, in the right-hand rotor the control rods 258, 260 and 262 are so located that the azimuth or $x$, $y$ axes defined thereby are displaced 69° from a pair of axes respectively parallel and normal to the wing, thereby making the $x'$ and $y'$ axes respectively parallel and normal to the wing when the phase angle is 69°. In both cases the $x'$, $y'$ axes are displaced forwardly 69° in the direction of blade rotation from the $x$, $y$ axes, but due to the difference in the direction of blade rotation in the case of the left-hand rotor the $x'$, $y'$ axes are rotated clockwise, and in the case of the right-hand rotor the $x'$, $y'$ axes are rotated counterclockwise, from the $x$, $y$ axes as viewed in FIG. 22.

*Linkage System for Transmitting Output Movements of the Control System to the Spoilers—FIG. 18*

Reference is now made to FIG. 18 for a detail description of the means employed in the aircraft of FIGS. 1, 2, and 3 for transmitting the output movements of the control system of FIG. 12 to the spoilers 23, 23 located on the wing 22.

From FIG. 12 it will be recalled that the rod 128 is connected at one end to the divider crank 122 and is moved longitudinally thereby in response to movements of the wheel 108. No mixer is included in the linkage mechanism between the rod 128 and the wheel 108 and therefore the rod is at all times responsive to the turning movements of the wheel. As shown in FIG. 18 the other end of the rod 128 is connected to the depending arm of a three-armed lever 310 which is supported for movement about an axis indicated at 312. Swinging movement of the lever 310, caused by longitudinal movement of the rod 128, is in turn transmitted to two lost-motion cam devices 314, 314 by means of two cables 316 and 318 which are connected respectively to the ends of the two other arms of the lever 310 and which pass upwardly and over pulleys 320 and 322, which are supported for rotation about the hinge axis 54 of the wing, to the two cam devices 314, 314 which are suitably mounted within the wing and disposed one on either side of the fuselage.

The two cam devices 314, 314 are so constructed and arranged as to be operable in response to the movement of the cables 316 and 318 to deflect the spoilers on one side of the wing while maintaining the spoilers on the other side of the wing in undeflected positions. From FIG. 3 it will be observed that there are two spoilers on each side of the wing 22. FIG. 18 for convenience shows only one spoiler for each side of the wing; however, it is to be understood that the other spoilers omitted from FIG. 18 may be connected with the illustrated spoilers by suitable conventional means for movement in unison therewith.

In order to produce the desired spoiler movement each of the cam devices 314, 314 includes a cam member 324 supported for pivotal movement about an axis 326 and a bifurcated lever 328 supported for movement about an axis 330 located at a distance from the axis 326. Each cam member 324 has a portion which fits between the arms of the associated lever 328 and which portion is provided with a cam slot that receives a pin 332 fixed to the arms of the lever. For approximately one half of its length, which half is indicated at 334, the slot is concentric with the axis 326, while the other half of the slot, indicated at 336, is off-center with respect to the axis 326. Therefore, it will be obvious that movement of the cam member 324 while the pin 332 is located in the concentric portion 334 of the slot will result in no movement of the lever 328, but that on the other hand movement of the cam member 324 while the pin 332 is located in the off-center portion 336 of the slot will result in pivotal movement of the lever 328. This movement of the lever 328 is in turn transmitted to the associated spoiler or set of spoilers by means of a rod 338 pivotally connected at one end to the lever 328 and pivotally connected at the other end to a horn 340 fixed to the spoiler 23, the spoiler 23 being supported for pivotal movement relative to the wing about an axis 342.

As mentioned, movement of the cam members 324, 324 of the cam devices 314, 314 is effected by the cables 316 and 318. As viewed in FIG. 18, the cable 318 after passing over the pulley 320 passes over two other pulleys 344 and 346 and has its other end connected to the right side of the right cam member 324 so that a pull on the cable 318 is operable to rotate the cam member in a counterclockwise sense looking down from above the aircraft. The cable 316 after passing over the pulley 322 passes over two other pulleys 348 and 350 and has its other end connected to the left-hand side of the left cam member 324 so that a pull on the cable 316 results in a clockwise movement of the cam member looking down from above the aircraft. The two cam members 324, 324 are also interconnected by a third cable 352 which passes over two pulleys 354 and 356 and has its opposite ends respectively connected to the right side of the left-hand member and the left side of the right-hand member, so that a movement of one of the cam members 324, 324 by a pull on either of the cables 316 or 318 is transmitted by the cable 352 to the other cam member.

It is believed that the operation of the linkage system of FIG. 18 for moving the spoilers should now be clear. In this figure the various parts of the system are shown in the positions assumed when the spoilers on both sides of the wings are in undeflected positions corresponding to a neutral position of the wheel 108. It will be noted that under this condition the two pins 332, 332 of the two cam devices 314, 314 are each located at a midposition in the associated cam slot between the concentric portion 334 and the off-center portion 336. Assume now that the rod 128 is displaced longitudinally forwardly in response to a clockwise movement of the wheel 108. As viewed from the left in FIG. 18 this forward displacement of the rod 128 swings the lever 310 in a clockwise sense and imposes a pulling or tension force on the cable 318, and by reason of the connection of the cable 318 with the right-hand cam member 324 causes the latter member to be moved in a counterclockwise sense bringing the off-center portion 336 of the associated cam slot into alignment with the associated pin 332. The movement of the pin 332 relative to the off-center portion 336 of the cam slot in turn causes the lever 328 to be moved counterclockwise, thereby causing the right-hand spoiler 23 to be moved by the rod 338 and horn 342 to a deflected position relative to the wing. At the same time the counterclockwise movement of the right-hand cam member 324 causes the transmission of motion through the cable 352 to the left-hand cam member 324 to rotate the latter member in a counterclockwise sense. This counterclockwise movement of the left-hand member 324 brings the associated pin 332 into alignment with the concentric portion 334 of the cam slot and therefore results in no motion of the associated lever 328. Consequently, the left-hand spoiler 23 remains in its undeflected position while the right-hand spoiler is deflected.

Alternatively, if the rod 128 is displaced longitudinally rearwardly in accordance with a counterclockwise turning movement of the wheel 108 the left-hand cam member 324 will be moved clockwise by the cable 316, bringing the associated pin 332 into the off-center portion 336 of its cam slot with the result that the left-hand spoiler 23 is moved to a deflected position. At the same time motion will be transmitted to the right-hand cam member 324 by the cable 352 but the resulting movement of the latter member will be ineffective to cause any deflection of the right-hand spoiler 23 due to the movement of the associated pin 332 in the concentric portion 334 of the associated cam slot. Thus, the right-hand spoiler remains undeflected while the left-hand spoiler is deflected.

*Linkage System for Transmitting Output Movements of the Blade Body Pitch Changer to the Collective Pitch Control Rods—FIG. 19*

Attention is now directed to FIG. 19 for a detail description of the linkage arrangement used for transmitting the movements of the output links 276 and 278 of the blade body pitch changer 150 to the collective pitch control rods 242, 242 of the two rotors.

As mentioned previously the three-armed lever 270 of the pitch changer 150 is adapted to be moved about its pivot axis by the helicopter roll control rod 148 so as to cause alternate raising and lowering motions of the rods 276 and 278. Also, the lever 270 is adapted to be moved bodily upwardly or bodily downwardly so that the rods 276 and 278 are moved in unison and in the same direction. This latter bodily movement of the lever 270 is provided by pivotal movement of the supporting lever 272 in response to longitudinal movement of the primary thrust control rod 284.

Referring to FIG. 19, it will be noted that movement of the rod 276 is adapted to cause movement of a three-armed lever 360 supported for pivotal movement about an axis 362. In this case the rod 276 is connected with the depending arm of the lever 360 by means of two bell cranks 364 and 366, and two rods 368 and 370. The other rod 278 is in turn connected with another three-armed lever 372, supported for movement about an axis 374, by means of two bell cranks 376 and 378, and two rods 380 and 382. The arrangement of these bell cranks and rods is such that forward longitudinal displacement of the rod 148 will result in counterclockwise movement of both the three-armed levers 360 and 372, as viewed in FIG. 19, while rearward longitudinal displacement of the rod 148 will cause both of the levers to be rotated in a clockwise sense.

Referring now particularly to the right-hand three-armed lever 360 it will be noted that this lever has associated therewith another similar three-armed lever 384 which is located within the wing 22 and supported thereby for movement about an axis 386. Motion is transmitted from the lever 360 to the lever 382 by means of two cables 388 and 390 which are passed respectively over pulleys 392 and 394 supported for rotation about a pivot axis 54 of the wing. The pulleys 392 and 394, as are all other pulleys located on the pivot axis 54, are of a relatively small diameter so that the tilting movement of the wing relative to the fuselage will have an insignificant shortening or lengthening effect on the cables passing thereover. The third arm of the lever 384 has a rod 396 connected thereto, and the latter rod is in turn connected with the collective pitch control rod 242 of the right-hand rotor by means of two bell cranks 398 and 400 and a rod 402, as shown in FIG. 19, so that pivotal movement of the lever 384 results in longitudinal movement of the pitch control rod 242.

The motion transmitting parts associated with the left-hand lever 372 for transmitting movements of the latter lever to the collective pitch control rod 242 of the left mary thrust control rod 284 so that the two rods 276 and 278 are accordingly both moved upwardly by the same amounts. The upward movement of the rod 276 rotates the associated lever 360 in the counterclockwise sense while the upward movement of the rod 278 will be effective to cause movement of the associated lever 376 in the clockwise sense. The counterclockwise movement of the lever 360 in turn causes the collective pitch control rod 242 of the right-hand rotor to be moved rearwardly to decrease the pitches of the associated rotor blades. Furthermore, the clockwise movement of the lever 372 is also effective to move the collective pitch control rod 242 of the left-hand rotor in a rearward direction to decrease the pitches of the associated blades. Therefore, the pitches of all the rotor blades will be decreased to the same extents to effect a uniform reduction in the thrusts produced by both of the rotors. Similarly a rearward displacement of the primary thrust control rod 284 will be effective, through the mechanism shown in FIG. 19, to cause both of the collective pitch control rods 242, 242 to be moved forwardly to increase the pitches of all the rotor blades and to thereby uniformly increase the thrusts of both of the rotors.

*Linkage System for Transmitting Output Movements of the Blade Flap Pitch Changer to the Azimuth Mechanisms—FIG. 20*

The mechanism for transmitting the output movements of the blade flap pitch changer 166 to the azimuth mechanisms 251, 251 of the two rotors for the purpose of effecting cyclic and collective adjustments of the rotor blade flaps is shown in detail in FIGS. 20 and 21. FIG. 20 shows the mechanism employed for transmitting movements of the pitch changer lever 286 to the azimuth mechanism. FIG. 21, on the other hand, shows the motion transmitting mechanism associated with the pitch changer lever 288. This section will deal with the mech- 414. Both of the rods 426, 426 are accordingly moved to the left by the rotation of the lever 414. This leftward movement of the rods 426, 426 is in turn transmitted through the bell cranks 428, 428 and 432, 432 and the rods 430, 430 and causes a forward longitudinal displacement of the azimuth control rods 262, 262. Movement of the rod 294 in a downward direction will have the opposite effect of causing both of the azimuth control rods 262, 262 to be displaced rearwardly.

If the movement of the rod 294 is caused by a movement of the helicopter pitch control rod 158 the resulting movement of the azimuth control rods 262, 262 will be effective to effect a longitudinal cyclic pitch change of the rotor blades. However, if the movement of the rod 294 is caused by rotation of the supporting lever 290 by the camber control rod 300 the azimuth control rods 262, 262 will be moved in unison and in the same direction as the other azimuth control rods 258, 258 and 260, 260 so as to effect a collective change of the rotor blade flaps. The means for moving the other azimuth control rods 258, 258 and 260, 260 are described in more detail below in connection with FIG. 21

*Linkage System For Transmitting Output Movements of the Blade Flap Pitch Changer to the Azimuth Mechanisms—FIG. 21*

Reference is now made to FIG. 21 for a detailed description of a means for transmitting the movements of the pitch changer lever 288 shown in FIG. 12 to the lateral cyclic control rods 258, 258 and 260, 260 of the two azimuth mechanisms 251, 251.

As previously described, the two rods 296 and 298 are respectively connected to the opposite ends of the three-armed lever 288 pivotally carried by the lever 290 of the pitch changer 166. The rods 296 and 298 may be moved simultaneously in opposite directions by rotation of the lever 288 in response to longitudinal movement of the helicopter yaw control rod 165, or may be moved simultaneously in the same direction as a result of rotation of the supporting lever 290 by the secondary thrust control rod 300.

In the mechanism illustrated in FIG. 21, movements of the rod 296 are transmitted to a three-armed lever 434, supported for movement about an axis 436, by two bell cranks 438 and 440 and two rods 442 and 444, as shown. Movements of the lever 434 are in turn transmitted to another three-armed lever 446, located within the wing and supported for movement about an axis 448 by two cables 450 and 452 which pass respectively over two pulleys 454 and 456 supported for rotation about the hinge axis 54 of the wing. Pivotally connected with the free arm of the lever 448 are two rods 458 and 460 which extend in opposite directions through opposite sides of the wing. The rod 460 extends to the right of the lever 446 and is connected with the azimuth control rod 260 of the right-hand azimuth mechanism 251 by a lever 462, a rod 464 and a bell crank 466. The rod 458 extends to the left of the lever 446 and is connected with the azimuth control rod 258 of the left-hand azimuth mechanism by a bell crank 468, a rod 470 and another bell crank 472. By tracing through the movements of the various parts associated with the lever 446, it will be noted that counterclockwise movement of the lever, as viewed from above the aircraft, is effective to cause a forward displacement of the azimuth control rod 260 of the right-hand azimuth mechanism and to also cause a similar forward displacement of the azimuth control rod 258 of the left-hand azimuth mechanism. On the other hand, movement of the lever 446 in the opposite or clockwise sense will have the effect of moving both of the associated azimuth control rods 260 and 258 in a rearward direction.

The mechanism associated with the rod 298 is substantially similar, but somewhat reversed in arrangement, from that associated with the rod 296. Therefore, it will be observed that movements of the rod 298 are transmitted to a three-armed lever 474 supported for movement about an axis 476, by two bell cranks 478 and 480 and by two rods 482 and 484. The movements of the lever 474 are in turn transmitted to another three-armed lever 486, located in the wing and supported for movement about an axis 488, by two cables 490 and 492 which respectively pass over pulleys 494 and 496 supported for rotation about the tilt axis 54 of the wing. Attached to the free arm of the lever 486 are two rods 498 and 500 which extend respectively in opposite directions through opposite sides of the wing. Movement of the rod 500 is transmitted by a bell crank 502, a rod 504 and a bell crank 506 to the azimuth control rod 258 of the right-hand azimuth mechanism 251. Movement of the rod 498 is transmitted by a lever 508, a rod 510 and a bell crank 512 to the azimuth control rod 260 of the left-hand azimuth mechanism. Tracing through the movements of the parts associated with the lever 486 it will be understood that counterclockwise movement of the lever, as viewed from above the aircraft, results in rearward displacement of the rod 258 of the right-hand azimuth mechanism and in corresponding rearward displacement of the rod 260 of the left-hand azimuth mechanism. Likewise, movement of the lever 486 in a clockwise sense will cause a forward displacement of the right rod 258 and of the left rod 260. In considering the overall operation of the mechanism illustrated in FIG. 21, assume first that the lever 288 is pivoted about its axis by a forward displacement of the rod 165. This raises the rod 296 and lowers the rod 298 with the result that both of the wing supported levers 446 and 486 are rotated in the same counterclockwise sense. Accordingly all four rods, 458, 460, 498 and 500, extending lengthwise through the wing will be moved toward the left. Considering now the right-hand azimuth mechanism 251 it will be observed that this leftward movement of the two rods 460 and 500 will cause the right azimuth control rod 260 to be displaced forwardly and the right azimuth control rod 258 to be displaced rearwardly, thereby tilting the ring member and swash plate of the azimuth mechanism about the *y* axis of the azimuth mechanism as shown by and discussed above in connection with FIG. 22, the upper portion of the ring member and swash plate being tilted in a generally forward direction. Considering the left-hand azimuth mechanism 251 it will be observed that the leftward movement of the rods 458 and 498 will result in a rearward displacement of the left azimuth control rod 260 and in a forward displacement of the left azimuth control rod 258, thereby swinging the ring member and swash plate of the left-hand azimuth mechanism about its *y* axis with the upper portion of the ring member and swash plate being tilted in a generally forward direction. With this in mind, it should be noted that as a result of the pivotal movement of the lever 288 the ring members and swash plates of the two azimuth mechanisms are tilted in the same direction.

Similarly, pivotal movement of the lever 288 in the opposite direction by a rearward displacement of the rod 165 will have an opposite effect of moving the four rods 458, 460, 498 and 500 to the right and will cause the ring members and the swash plates of the two azimuth mechanisms to be rotated in the opposite directions about their *y* axes.

Assume now, however, that the two rods 296 and 298 are both moved upwardly by a forward movement of the camber control rod 300. The upward movement of the rod 296 will cause the associated wing supported lever 446 to be rotated in the counterclockwise sense so as to move the two associated rods 458 and 460 to the left. On the other hand, the upward movement of the rod 298 will move the associated wing supported lever 486 in a clockwise sense so as to move the rods 498 and 500 to the right. Considering now the right-hand azimuth mechanism 251 it will be further noted that the leftward movement of the rod 460 and the rightward movement of the rod 500 will cause both the rods 258 and 260 to be moved forwardly.

This together with a forward movement of the third azimuth control rod 262, also caused as explained above by the forward movement of the rod 300, will cause the whole azimuth mechanism 251 to be shifted forwardly on the rotor shaft 210 to collectively change the neutral position of the rotor blade flaps associated therewith.

Considering now the left azimuth mechanism 251 it will be observed that the leftward movement of the rod 458 and the rightward movement of the rod 298 will result in the two associated control rods 258 and 260 to be shifted forwardly similarly to the corresponding rods of the right azimuth mechanism. Therefore, it should be obvious that the net effect of the forward movement of the camber control rod 300 is to shift both of the azimuth mechanisms 251, 251 forwardly to the same extents to increase the camber of the blades of both rotors. Likewise, a rearward displacement of the secondary thrust control rod 300 will have the opposite effect of shifting both of the azimuth mechanisms 251, 251 rearwardly to the same extents to decrease the camber of the blades.

Summary of Operation

Having now described in detail the structure of the preferred embodiments of the present invention, its general operation may briefly be summarized as follows:

During high speed flight the wing 22 is maintained in its lowered position as shown by the solid lines of FIG. 1, and the aircraft functions in a manner substantially similar to that of an ordinary airplane. If the control system of FIG. 12 is employed, the lowered position of the wing holds the push-pull rod 63 in the position shown in FIG. 12 so that the airplane control mixers 89 and 90 are adjusted to provide a full or maximum output motion for a given input motion. At the same time, the lowered wing positions the rod 65 as shown so that the three helicopter control mixers, 98, 100 and 102 are adjusted to provide no output motion regardless of the input motion received. If any of the other control systems of FIGS. 13, 14, 15 or 16 are employed, the mixers will be similarly adjusted either by manual means or means responsive to the airspeed or the wing flap position. Due to this adjustment of the mixers, movements of the wheel 108 are transmitted through the mixer 90 to adjust the elevators 20, 20, movements of the rudder pedals 112, 112 are transmitted through the mixer 89 to adjust the rudder 19, the movements of the stick 110 are transmitted directly to the spoilers 23, 23, to respectively control the pitch, yaw and roll of the aircraft. No movement of the wheel, stick or rudder pedals is, however, transmitted through the mixers 98, 100 and 102, and thus no cyclic or differential collective pitch control of the rotor blades is possible. Helicopter control is thus effectively locked out or removed and the aircraft is maneuvered entirely by the airplane control surfaces. With the mixers set as described, it is still possible, however, to change the pitches of the rotor blades in a collective manner and in the same direction to increase or decrease the propulsive thrust of the two rotors. This is accomplished by adjustment of the thrust control rod 284. Movement of the rod 284 in one direction or the other changes the pitch of the blades 32, 32 by rotating all of the blade body portions 228, 228 to the same extent about the associated shafts 226, 226. Likewise, it is also possible to change the camber of the rotor blades to provide for the optimum blade efficiency at the particular speed of the aircraft. This is accomplished by adjustment of the camber control rod 300 which collectively adjusts the neutral position of the flaps 232, 232 relative to the blade body portion 228, 228. Once set to a given camber, however, the rotor flaps 232, 232 are held stationary in this neutral position and produce no cyclic pitch changes in the rotor blades during airplane flight, and thus the rotors function generally similarly to ordinary airplane propellers.

During hovering and vertical and/or short take-off and landing operations, the wing 22 is raised to the position shown in FIG. 2 and the flaps 24, 24 are lowered. With the wing in this position, the push-pull rod 63 is positioned, as by the wing in the case of the FIG. 12 system, to hold the shaft 96 in the "Remove" position, whereat the airplane control mixers 89 and 90 are adjusted to provide zero output motion. Due to the adjustment of these mixers, therefore, airplane control is effectively removed since no movements of the stick 110 or rudder pedals 112, 112 will be transmitted to the elevators or rudder through the mixers 89 and 90. Movement of the wheel is however transmitted to the spoilers and due to their location in the rotor slipstream the spoiler will produce some control moment on the aircraft. Due to the tilted position of the wing the control moment produced by the spoilers in response to movement of the wheel will not be a pure roll moment about the fuselage roll axis, and will include a component of moment about the fuselage yaw axis. Nevertheless, the spoiler moment with the wing raised has been found to be generally beneficial and added to the moment produced by the rotors in response to operation of the wheel tends to result in a larger and more nearly pure or uncoupled roll moment about the fuselage than would be the case without the spoiler operation.

With the wing raised, the rod 65 will also be positioned, as by the wing in the case of the FIG. 12 system, so that the pushpull rod 65 holds the rod 104 in the "Add" position. In this position, the three helicopter control mixers 98, 100 and 102 are adjusted to provide for maximum output movements for given input movements. At the same time, the compensating yaw mixer 92 is adjusted for zero output, and the compensating roll mixer 94 for maximum output, by the shaft 96. Thus, with the mixers adjusted as described, movement of the stick 110 is transmitted through the pitch mixer 98 and other linkage to the helicopter pitch control (or longitudinal cyclic) rod 198 and from there to the rotor blade pitch changing means including the pitch changer 166 and the two azimuth mechanisms 251, 251. Movement of the helicopter pitch control rod 198 causes the latter means to change the pitches of the rotor blades in a longitudinal cyclic manner and thus causes a pitching moment to be exerted on the aircraft. As mentioned previously, with the wing tilted the fuselage pitch axis remains coincident with or parallel to the wing pitch axis and therefore the longitudinal cyclic pitch change will result in a pure pitching moment about the fuselage pitch axis regardless of the wing position without any accompanying yaw or roll components. Thus, no compensation is required in connection with the longitudinal cyclic pitch control and the mixer 98 accordingly has no compensating mixer associated therewith.

With the same adjustment of the mixers as above described and corresponding to a full helicopter control of the aircraft, movement of the wheel is transmitted to the roll mixer 102 and produces an output which is imparted to both the differential motion transmitting device 140 and the compensating yaw mixer 92. The motion imparted to the device 140 produces a relatively large output motion of the helicopter roll control (or differential collective) rod 148 and this output motion is in turn transmitted to the pitch changing means including the pitch changer 150 and the two collective control rods 242, 242 of the rotors to change the collective pitches of the two rotors in a differential manner and to produce roll of the aircraft. The motion imparted to the compensating yaw mixer 92 is at this time ineffective to produce any output movement thereof, since the latter mixer is adjusted for zero output by the shaft 96. It should be noted, however, that if the shaft 96 were to be positioned at some intermediate position between the "Remove" and "Add" positions, the mixer 92 would produce some output. This output would in turn be transmitted to the differential motion transmitting device 156 and would cause a relatively small motion to be imparted to the rod 161 and consequently to the helicopter yaw control (or lateral cyclic) rod 165. The movement of the rod 165 in turn would adjust the pitch changing means, including the pitch changer and the two azimuth mechanisms 251, 251, to add a small amount of lateral cyclic pitch change to the rotors and thereby produce a compensating yaw moment on the aircraft which counteracts the yaw moment component induced about the fuselage yaw axis by the differential collective pitch change when the wing is not fully raised.

Operation of the rudder pedals, when the mixers are in the above described condition of adjustment corresponding to a full helicopter control, imparts a movement on the yaw mixer 100 which is transmitted through the latter and imposed on both the differential motion transmitting device 156 and the compensating roll mixer 94. The motion imposed on the device 156 results in a relatively large output movement of the rod 161 and the helicopter yaw control (or lateral cyclic) rod 165 and causes operation of the pitch changing means including the pitch changer 166 and the azimuth mechanisms 251, 251 to produce a lateral cyclic pitch change of the rotor blades. The motion imposed on the compensating roll mixer 94 is transmitted therethrough and imparted to the differential motion transmitting device 140. This input to the device 140 causes a relatively small output movement of the helicopter roll control (or differential collective) rod 148 which adjusts the pitch changing means to produce some differential collective pitch change in addition to the lateral cyclic pitch change produced by movement of the roll control rod 148. This differential collective pitch change produces a component of roll moment about the fuselage roll axis which cancels or compensates for the component of roll moment produced by the lateral cyclic pitch change so that the resultant moment is a pure or substantially pure moment about the fuselage yaw axis.

Thus due to the action of the various mixers, the movements of the wheel, stick and rudder pedals when the wing is fully raised produce changes in the pitches of the rotor blades which result respectively in pure or uncoupled rolling, pitching, and yawing movements of the aircraft. Accordingly operation of these pilot operable devices during helicopter operation with the wing raised will have substantially the same effect on the movements of the aircraft as it does during airplane operation with the wing lowered, thereby greatly simplifying the control of the aircraft by the pilot.

As the wing 22 is raised or lowered, the push-pull rod 63, in the FIG. 12 system, automatically positions the shaft 96 at intermediate positions between the "Add" and "Remove" positions. At these intermediate positions, the airplane mixers 89 and 90 are adjusted to provide intermediate output and therefore the stick and rudder pedals will have only an intermediate effect on the elevators and rudder, and thus the degree of airplane control is effectively reduced. At the same time, the rod 65 positions the shaft 104 at intermediate positions and accordingly positions the helicopter control mixers 98, 100 and 102 to provide intermediate outputs which result in an intermediate degree of helicopter control of the aircraft. Different degrees of airplane and helicopter control are thus mixed together as the wing is tilted between its raised and lowered positions to maintain full pilot control and stability of the aircraft during the tilting operation. The same general type of control mixing is or may be provided by the control systems of FIGS. 13, 14, 15 and 16 wherein provision is made for adjusting some or all of the airplane and helicopter control mixers either manually or automatically in response to airspeed or wing flap position. In each system, however, the helicopter compensating mixers 92 and 94 are adjusted by the wing since the amount of yaw and roll compensation required during partial or full helicopter operation to maintain the desired response from the movements of the pilot operable control devices varies with the degree of wing tilt. Thus, the wing automatically sets the compensating mixers to provide the correct amount of compensation for whatever position the wing may be in.

The invention claimed is:

1. In an aircraft, the combination comprising a wing having a wing flap movable between an extended position and a retracted position relative to said wing, a rotor having a plurality of adjustable pitch blades, a pilot operable flight control member, means connected between said rotor and said flight control member for adjusting the pitches of said rotor blades in a cyclic manner in response to movement of said flight control member and which means is adjustable to vary the effectiveness of said flight control member in causing said cyclic pitch adjustment, and means for adjusting said latter means in accordance with the position of said wing flap relative to said wing so that the effectiveness of said flight control member in causing said cyclic pitch adjustment is dependent on said wing flap position.

2. In an aircraft, the combination comprising a wing having a wing flap movable between an extended position and a retracted position relative to said wing, a rotor having a plurality of adjustable pitch blades, a pilot operable flight control member, means connected between said rotor and said flight control member for adjusting the pitches of said rotor blades in a cyclic manner in response to movement of said flight control member, and means connected with said wing flap for rendering said last-mentioned means inoperative to cause cyclic pitch adjustment of said rotor blades in response to movement of said flight control member when said wing flap is in its retracted position.

3. In an aircraft, the combination comprising a wing having a wing flap movable between an extended position and a retracted position relative to said wing, two rotors each having a plurality of adjustable pitch blades, a pilot operable flight control member, means connected between said rotors and said flight control member for adjusting the pitches of said rotor blades in a differential collective manner in response to movement of said flight control member and which means is adjustable to vary the effectiveness of said flight control member in causing said differential collective pitch adjustment, and means for adjusting said latter means in accordance with the position of said wing flap relative to said wing with the result that the effectiveness of said flight control member in causing said differential collective pitch adjustment is dependent on said wing flap position.

4. In an aircraft, the combination comprising a wing having a flap movable between an extended position and a retracted position relative to said wing, two rotors each having a plurality of adjustable pitch blades, a pilot operable flight control member, means connected between said rotors and said flight control member for adjusting the pitches of said rotor blades in a differential collective manner in response to movement of said flight control member, and means connected with said wing flap for rendering said last-mentioned means inoperative to cause differential collective pitch adjustment of said rotor blades in response to movement of said flight control member when said wing flap is in its retracted position.

5. In an aircraft, the combination comprising two rotors each having a plurality of adjustable pitch blades, a pilot operable flight control member, means connected between said rotors and said flight control member for adjusting the pitches of said rotor blades in a differential collective manner in response to movement of said flight control member and which means is adjustable to vary the effectiveness of said flight control member in causing said differential collective pitch adjustment, and airspeed responsive means for adjusting said latter means in accordance with the relative airspeed of said aircraft so that the effectiveness of said flight control member in causing said differential collective pitch adjustment is dependent on said relative airspeed.

6. In an aircraft, the combination comprising two rotors each having a plurality of adjustable pitch blades, a pilot operable flight control member, means connected between said rotors and said flight control member for adjusting the pitches of said rotor blades in a differential collective manner in response to movement of said flight control member, and airspeed responsive means for rendering said last-mentioned means inoperative to cause differential collective pitch adjustment of said rotor blades in response to movement of said flight control member when the relative airspeed of the aircraft exceeds a predetermined value.

7. In an aircraft, the combination comprising a fuselage, two rotors located respectively on opposite sides of said fuselage and each having a plurality of adjustable pitch blades and a drive shaft rotatable about its central axis, a pilot operable flight control member, means connected between said rotors and said flight control member for adjusting the pitches of said rotor blades in a differential collective manner in response to movement of said flight control member and which means is adjustable while said axes of said rotor drive shafts remain fixed relative to said fuselage to vary the effectiveness of said flight control member in causing said differential collective pitch adjustment, and pilot operable means for adjusting said latter means so that the effectiveness of said flight control member in causing said differential collective pitch adjustment may be varied by the pilot.

8. In an aircraft, the combination comprising a fuselage, two rotors located respectively on opposite sides of said fuselage and each having a plurality of adjustable pitch blades and a drive shaft rotatable about its central axis, a pilot operable flight control member, means connected between said rotors and said flight control member for adjusting the pitches of said rotor blades in a differential collective manner in response to movement of said flight control member, and pilot operable means for selectively rendering said last-mentioned means operative or inoperative to cause differential collective pitch adjustment of said rotor blades in response to movement of said flight control member while said axes of said rotor drive shafts remain fixed relative to said fuselage.

9. In an aircraft, the combination comprising a fuselage, a wing tiltable about a transverse axis relatively to said fuselage between a lowered position and a raised position, a rotor having a plurality of adjustable pitch blades, a pilot operable flight control member, means connected between said rotor and said flight control member for adjusting the pitches of said rotor blades in a cyclic manner in response to movement of said flight control member and which means is adjustable to vary the effectiveness of said flight control member in causing said cyclic pitch adjustment, and means for adjusting said latter means in accordance with the position of said wing relative to said fuselage so that the effectiveness of said flight control member in causing cyclic pitch adjustment of said rotor blades is dependent on said wing position.

10. In an aircraft, the combination comprising a fuselage, a wing tiltable about a transverse axis relatively to said fuselage between a lowered position and a raised position, a rotor having a plurality of adjustable pitch blades, a pilot operable flight control member, means connected between said rotor and said flight control member for adjusting the pitches of said rotor blades in a cyclic manner in response to movement of said flight control member, and means connected with said king for rendering said last-mentioned means inoperative to cause cyclic pitch adjustment of said rotor blades when said wing is in said lowered position.

11. In an aircraft, the combination of a wing, a wing flap carried by said wing and movable relative thereto between a retracted and an extended position, a plurality of control surfaces operable to maneuver said aircraft during relatively high speed flight, at least one rotor with adjustable pitch blades operable to maneuver said aircraft during relatively low speed flight, pilot operable flight control means, means for operating said control surfaces in response to movement of said flight control means, means for adjusting the pitches of the blades of said at least one rotor to maneuver said aircraft in response to movement of said flight control means, and means connected with said wing flap for varying the effectiveness of said flight control means on the adjustment of said blade pitches in accordance with the position of said flap relative to said wing so that the amount of blade pitch adjustment effected by a given amount of flight control movement is varied as said wing flap is moved between said retracted and extended positions.

12. In an aircraft, the combination of a plurality of control surfaces operable to maneuver said aircraft during relatively high speed flight, at least one rotor with adjustable pitch blades operable to maneuver said aircraft during relatively low speed flight, said control surfaces being separate from said blades, pilot operable flight control means, means for operating said control surfaces in response to movement of said flight control means, means for adjusting the pitches of the blades of said at least one rotor to maneuver said aircraft in response to movement of said flight control means, and airspeed responsive means for varying the effectiveness of said flight control means on the adjustment of said blade pitches in accordance with the airspeed of said aircraft so that the amount of blade pitch adjustment effected by a given amount of flight control movement is dependent on the airspeed.

13. In an aircraft, the combination of a fuselage, a plurality of control surfaces operable to maneuver said aircraft during relatively high speed flight, at least one rotor with a drive shaft rotatable about its central axis and with adjustable pitch blades operable to maneuver said aircraft during relatively low speed flight, said control surfaces being separate from said blades, pilot operable flight control means, means for operating said control surfaces in response to movement of said flight control means, means for adjusting the pitches of the blades of said at least one rotor to maneuver said aircraft in response to movement of said flight control means, and pilot operable means for varying to various different degrees of effectiveness throughout a given range of effectiveness, the effectiveness of said flight control means on the adjustment of said blade pitches so that the amount of blade pitch adjustment effected by a given amount of flight control movement may be selectively varied by the pilot while said drive shaft axis remains fixed relative to said fuselage.

14. In an aircraft, the combination of a horizontal stabilizer, an elevator movable relative to said stabilizer for imparting pitching moments on said aircraft during relatively high speed flight, a rotor having a plurality of adjustable pitch blades, a pilot operable aircraft pitch control device movable in predetermined opposite directions for controlling the pitching movement of said aircraft, means for moving said elevator in response to movement of said pitch control device in said predetermined opposite directions, means for adjusting the pitches of the blades of said rotor in a longitudinal cyclic manner to impose a pitching moment on said aircraft in response to movement of said pitch control device in said predetermined opposite directions, and means for varying in an infinitely variable manner the degree of longitudinal cyclic blade pitch adjustment provided by a given movement of said pitch control in said predetermined opposite directions.

15. In an aircraft, the combination of a fuselage, a vertical stabilizer, a rudder movable relative to said stabilizer for imparting yaw moments on said aircraft during relatively high speed flight, two rotors located respectively on opposite sides of said fuselage and each of which rotors includes a plurality of adjustable pitch blades, a pilot operable aircraft yaw control device movable in predetermined opposite directions for controlling the yawing movement of said aircraft, means for moving said rudder in response to movement of said yaw control device in said predetermined opposite directions, means for adjusting the pitches of the blades of said rotors in a lateral cyclic manner in response to movement of said yaw control device in said predetermined opposite directions, and means for varying the degree of lateral cyclic blade pitch adjustment provided by a given movement of said yaw control device in said predetermined opposite directions.

16. The combination defined in claim 15 further characterized by means for varying the degree of rudder movement provided by movement of said yaw control device in said predetermined opposite directions.

17. The combination as defined in claim 15, further characterized by said rotors being adapted for rotation about axes inclined relative to said fuselage, and means for adjusting the pitches of the blades of said rotors in a differential collective manner in response to movement of said yaw control device in said predetermined opposite directions to provide a compensating roll moment which counteracts the roll moment produced as a result of the accompanying lateral cyclic pitch adjustment and inclination of the rotor axes.

18. The combination as defined in claim 17 further characterized by means for varying the inclination of the axes of said rotors relative to said fuselage, and means for adjusting the degree of differential collective pitch adjustment provided by a given movement of said yaw control device in accordance with the inclination of said rotor axes.

19. In an aircraft, the combination of a fuselage, wing means extending laterally outwardly from opposite sides of said fuselage, two rotors carried by said wing means and disposed respectively on opposite sides of said fuselage, each of said rotors comprising a plurality of aerofoil blades independently adjustable to change the pitches thereof, means for tilting said rotors about a transverse axis relatively to said fuselage between a lowered position and a raised position, means associated with said rotors for cyclically and collectively changing the pitches of said blades for maneuvering said aircraft as a helicopter during relatively low speed flight of said aircraft with said rotors in raised position, adjustable control surface means separate from the rotors for maneuvering said aircraft as an airplane during relatively high speed flight thereof with said rotors in lowered position, pilot operable mechanism, mechanism connected with said pilot operable mechanism and operable to effect adjustment of said control surface means so as to change the movement of said aircraft in a predetermined manner in response to predetermined movements of said pilot operable mechanism when said rotors are in lowered position, and mechanism connected with said pilot operable mechanism and operable to effect cyclical and collective adjustment of said blade pitches so as to change the movement of said aircraft in the same predetermined manner in response to the same predetermined movements of said pilot operable mechanism when said rotors are in raised position.

20. In an aircraft, the combination of a fuselage, wing means extending laterally outwardly from opposite sides of said fuselage tiltable about a transverse axis relatively to said fuselage between a lowered position and a raised position, two rotors carried by said wing means and disposed respectively on opposites sides of said fuselage, each of said rotors comprising a plurality of aerofoil blades independently adjustable to change the pitches thereof, means associated with said rotors for cyclically and collectively changing the pitches of said blades for maneuvering said aircraft as a helicopter during relatively low speed flight of said aircraft with said wing means and rotors in raised position, adjustable control surface means separate from the rotors for maneuvering said aircraft as an airplane during relatively high speed flight thereof with said wing means and rotors in lowered position, pilot operable mechanism, mechanism connected with said pilot operable mechanism and operable to effect adjustment of said control surface means so as to change the movement of said aircraft in a predetermined manner in response to predetermined movements of said pilot operable mechanism when said wing means is in lowered position, and mechanism connected with said pilot operable mechanism and operable to effect cyclical and collective adjustment of said blade pitches so as to change the movement of said aircraft in the same predetermined manner in response to the same predetermined movements of said pilot operable mechanism when said wing means is in the raised position.

21. In a control system for an aircraft including control surface means for maneuvering the same as an airplane at relatively high speeds and including two rotors each having a plurality of blades independently adjustable to change the pitches thereof for maneuvering the aircraft as a helicopter at relatively low speeds, the combination of pilot operable mechanism movable in various predetermined directions corresponding to desired changes in the movement of the aircraft, first means connected between said pilot operable mechanism and said control surface means for adjusting said control surface means in response to movements of said pilot operable mechanism in said various predetermined directions, and second means separate from said first means and connected between said pilot operable mechanism and said rotor blades for adjusting the pitches thereof in response to movements of said pilot operable mechanism in said various predetermined directions, said first and second means each having parts which are independently adjustable to vary the effectiveness of the movements of said pilot operable mechanism on the adjustment of said control surface means and on the pitch adjustment of said rotor blades respectively whereby the degrees of airplane control and of helicopter control afforded by the movements of said pilot operable mechanism may be varied independently to provide different mixtures of airplane and helicopter control.

22. In an aircraft, the combination of a fuselage, control surface means for maneuvering said aircraft as an airplane at relatively high speeds, two rotors tiltable relatively to said fuselage about a transverse axis and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surface means in response to movements of said pilot operable mechanism in said various predetermined directions, and second means connected between said pilot operable mechanism and said rotor blades for adjusting the pitches thereof in response to movement of said pilot operable mechanism in said various predetermined directions, said first and second means each having parts which are adjustable independently of the other said parts to separately vary the effectiveness of the movements of said pilot operable mechanism on the adjustment of said control surface means and on the pitch adjustment of said rotor blades, respectively.

23. In an aircraft, the combination of a fuselage, wing means extending laterally outwardly from either side of said fuselage and tiltable relatively thereto, control surface means for maneuvering said aircraft as an airplane at relatively high speeds, two rotors tiltable with said wing means and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surfaces in response to movements of said pilot operable mechanism in said various predetermined directions, and second means connected between said pilot operable mechanism and said rotor blades for adjusting the pitches thereof in response to movement of said pilot operable mechanism in said various predetermined directions, said first and second means each having parts which are adjustable independently of the other said parts to separately vary the effectiveness of the movements of said pilot operable mechanism on the adjustment of said control surfaces and on the pitch adjustment of said rotor blades, respectively.

24. The combination as defined in claim 23 further characterized by pilot operable means for adjusting the said parts of at least one of said first and second means.

25. The combination as defined in claim 23 further characterized by pilot operable means for independently adjusting the said parts of both said first and second means with the result that the effectiveness of either of said first and second means may be manually varied independently of the other.

26. In an aircraft, the combination of a fuselage, two rotors located on opposite sides of said fuselage and rotatable about substantially parallel axes, said rotors being tiltable in unison relatively to said fuselage about an axis extending transversely thereof, each of said rotors comprising a plurality of aerofoil blades adjustable to change the pitches thereof, a plurality of pitch changing means associated respectively with said two rotors for cyclically and collectively changing the pitches of the blades thereof to maneuver said aircraft as a helicopter, control surfaces for maneuvering said aircraft as an airplane, pilot operable mechanism movable in various predetermined directions corresponding to desired changes in the movement of the aircraft, and mixing means connected with said pilot operable mechanism and with said control surfaces and said pitch changing means which mixing means is operable to convert movements of said pilot operable mechanism into adjustments of said control surfaces to provide airplane control of said aircraft and into adjustments of said pitch changing means to provide helicopter control of said aircraft, said mixing means including means for independently varying the degree of control surface adjustment and the degree of pitch adjustment provided by given movements of said pilot operable mechanism.

27. In an aircraft, the combination of a fuselage, two rotors disposed respectively on opposite sides of said fuselage and adapted for rotation about axes which are inclined forwardly with respect to the vertical when said fuselage is in a substantially horizontal position, said rotors each comprising a plurality of aerofoil blades independently adjustable to change the pitches thereof, a pilot operable device carried by said fuselage for controlling changes in the yaw of said aircraft, and means responsive to movements of said pilot operable device for simultaneously changing the pitches of the blades of said rotors in both a lateral cyclic manner and a differential collective manner to produce a substantially pure yaw moment about the fuselage yaw axis despite said forward inclination of said rotor axes.

28. In an aircraft, the combination of a fuselage, two rotors disposed respectively on opposite sides of said fuselage and adapted for rotation about axes which are inclined forwardly with respect to the vertical when said fuselage is in a substantially horizontal position, said rotors each comprising a plurality of aerofoil blades independently adjustable to change the pitches thereof, a pilot operable device carried by said fuselage for controlling changes in the yaw of said aircraft, means responsive to movements of said pilot operable yaw control device for changing the pitches of said blades of said rotors in a lateral cyclic manner, and means associated with said latter means for changing the pitches of the blades of said rotors in a differential collective manner and by amounts which are related to the amounts of lateral cyclic pitch change effected by said latter means so as to produce compensating roll moments about the fuselage roll axis which moments counteract the roll moments about the same axis produced by the lateral cyclic pitch changes as a result of said forward inclination of said rotor axes.

29. The combination as defined in claim 28 further characterized by means for varying the amount of lateral cyclic pitch change produced by a given movement of said pilot operable yaw control device.

30. The combination as defined in claim 28 further characterized by means for varying the amount of differential collective pitch change produced as a result of a given amount of lateral cyclic pitch change.

31. In an aircraft, the combination of a fuselage, two rotors disposed respectively on opposite sides of said fuselage and adapted for rotation about axes which are inclined forwardly with respect to the vertical when said fuselage is in a substantially horizontal position, each of said rotors comprising a plurality of aerofoil blades independently adjustable to change the pitches thereof, means associated with said rotors for changing the pitches of said blades of said rotors in a collective manner, other means associated with said rotors for changing the pitches of said blades of said rotors in a cyclic manner, a pilot operable device for controlling changes in the yaw of said aircraft, motion transmitting means interposed between said pilot operable yaw control device and said cyclic pitch changing means of said two rotors, said motion transmitting means being operable to effect adjustment of said cyclic pitch changing means to change the pitches of said blades of said rotors in a lateral cyclic manner in response to movement of said yaw control device so as to induce changes in the yawing and rolling moments about the fuselage yaw and roll axes respectively when said rotors are rotated about said forwardly inclined axes, said motion transmitting means including an output member which is movable in proportion to the degree of lateral cyclic pitch change produced by movement of said yaw control device, and other means connected between said output member and said collective pitch changing means of said two rotors for differentially changing the collective pitches of said blades of said rotors in response to the movement of said output member to produce a compensating rolling moment about the fuselage roll axis which opposes the change in rolling moment induced by the lateral cyclic pitch change.

32. The combination as defined in claim 31 further characterized by wing means extending laterally outwardly from either side of said fuselage and which means are tiltable about a transverse axis relatively to said fuselage between a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage.

33. The combination as defined in claim 31 further characterized by said motion transmitting means including parts which are adjustable to vary the output motion thereof produced as a result of a given input motion to thereby vary the degree of lateral cyclic pitch change produced by a given movement of said yaw control device.

34. The combination as defined in claim 33 further characterized by pilot operable means connected with said motion transmitting means for manually adjusting said parts thereof to vary the amount of output motion from said motion transmitting means produced by a given input motion.

35. The combination as defined in claim 33 further characterized by wing means extending laterally outwardly from either side of said fuselage and which means are tiltable about a transverse axis relatively to said fuselage between a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage, and means connected with said wing means for adjusting said parts of said motion transmitting means in accordance with the degree of wing tilt and in such a manner that the lateral cyclic pitch change produced by a given movement of said yaw control device increases as the wing means is tilted away from said lowered position.

36. The combination defined in claim 33 further characterized by a wing, a wing flap carried by said wing and movable relative thereto between a retracted position and an extended position, and means connected with said wing flap for adjusting said parts of said motion transmitting means in accordance with the position of said wing flap relative to said wing and in such a manner that the lateral cyclic pitch change produced by a given movement of said yaw control device increases as said wing flap is moved from its retracted to its extended position.

37. The combination defined in claim 33 further characterized by airspeed responsive means for adjusting said parts of said motion transmitting means in accordance with the airspeed of said aircraft and in such a manner that the lateral cyclic pitch change produced by a given movement of said yaw control device increases as the airspeed is decreased from one predetermined value to a lower predetermined value.

38. The combination as defined in claim 33 further characterized by said means connected between said output member and said collective pitch changing means including a second motion transmitting means having parts which are adjustable to vary the output motion thereof produced as a result of a given movement of said output member so as to vary the magnitude of the compensating rolling moment produced by a given lateral cyclic pitch change.

39. The combination as defined in claim 38 further characterized by wing means extending laterally outwardly from either side of said fuselage and which means are tiltable about a transverse axis relatively to said fuselage between a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage, and means connected with said wing means for adjusting said parts of said second motion transmitting means in accordance with the degree of wing tilt and in such a manner that the magnitude of the compensating rolling movement produced by a given lateral cyclic pitch change increases as the wing means is tilted away from said lowered position.

40. In an aircraft, the combination of a fuselage, two rotors disposed respectively on opposite sides of said fuselage and adapted for rotation about axes which are inclined forwardly with respect to the vertical when said fuselage is in a substantially horizontal position, said rotors each comprising a plurality of aerofoil blades independently adjustable to change the pitches thereof, a pilot operable device carried by said fuselage for controlling changes in the roll of said aircraft, and means responsive to movements of said pilot operable device for simultaneously changing the pitches of the blades of said rotors in both a lateral cyclic manner and a differential collective manner to produce a substantially pure roll moment about the fuselage roll axis despite said forward inclination of said rotor axes.

41. In an aircraft, the combination of a fuselage, two rotors disposed respectively on opposite sides of said fuselage and adapted for rotation about axes which are inclined forwardly with respect to the vertical when said fuselage is in a substantially horizontal position, said rotors each comprising a plurality of aerofoil blades independently adjustable to change the pitches thereof, a pilot operable device carried by said fuselage for controlling changes in the roll of said aircraft, means responsive to movements of said pilot operable roll control device for changing the pitches of said blades of said rotors in a differential collective manner, and means associated with said latter means for changing the pitches of the blades of said rotors in a lateral cyclic manner and by amounts which are related to the amounts of differential collective pitch change effected by said latter means so as to produce compensating yaw moments about the fuselage yaw axis which moments counteract the yaw moments about the same axis produced by the differential collective pitch changes as a result of said forward inclination of said rotor axes.

42. The combination as defined in claim 41 further characterized by means for varying the amount of differential collective pitch change produced by a given movement of said pilot operable roll control device.

43. The combination as defined in claim 41 further characterized by means for varying the amount of lateral cyclic pitch change produced as a result of a given amount of differential collective pitch change.

44. In an aircraft, the combination of a fuselage, two rotors disposed respectively on opposite sides of said fuselage and adapted for rotation about axes which are inclined forwardly with respect to the vertical when said fuselage is in a substantially horizontal position, each of said rotors comprising a plurality of aerofoil blades independently adjustable to change the pitches thereof, means associated with said rotors for changing the pitches of said blades of said rotors in a collective manner, other means associated with said rotors for changing the pitches of said blades of said rotors in a cyclic manner, a pilot operable device for controlling changes in the roll of said aircraft, motion transmitting means interposed between said pilot operable roll control device and said collective pitch changing means of said two rotors, said motion transmitting means being operable to effect adjustment of said collective pitch changing means to change the pitches of said blades of said rotors in a differential collective manner in response to movement of said roll control device so as to produce changes in the rolling and yawing moments about the fuselage roll and yaw axes respectively when said rotors are rotated about said forwardly inclined axes, said motion transmitting means including an output member which is movable in proportion to the degree of differential collective pitch change induced by movement of said roll control device, and other means connected between said output member and the cyclic pitch changing means of said two rotors for changing the pitches of said blades of said rotors in a lateral cyclic manner in response to the movement of said output member to produce a compensating yawing moment about the fuselage yaw axis which opposes the change in yawing moment induced by said differential collective pitch change.

45. The combination as defined in claim 44 further characterized by wing means extending laterally outwardly from either side of said fuselage and which means are tiltable about a transverse axis relatively to said fuselage between a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage.

46. The combination as defined in claim 44 further characterized by said motion transmitting means including parts which are adjustable to vary the output motion thereof produced as a result of a given input motion to thereby vary the degree of differential collective pitch change induced by a given movement of said roll control device.

47. The combination as defined in claim 46 further characterized by pilot operable means connected with said motion transmitting means for manually adjusting said parts thereof to vary the amount of output motion from said motion transmitting means produced by a given input motion.

48. The combination as defined in claim 46 further characterized by wing means extending laterally outwardly from either side of said fuselage and which means are tiltable about a transverse axis relatively to said fuselage betwen a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage, and means connected with said wing means for adjusting said parts of said motion transmitting means in accordance with the degree of wing tilt and in such a manner that the differential collective pitch change produced by a given movement of said roll control device increases as the wing means is tilted away from said lowered position.

49. The combination defined in claim 46 further characterized by a wing, a wing flap carried by said wing and movable relative thereto betwen a retracted position and an extended position, and means connected with said wing flap for adjusting said parts of said motion transmitting means in accordance with the position of said wing flap relative to said wing and in such a manner that the lateral cyclic pitch change produced by a given movement of said yaw control device increases as said wing flap is moved from its retracted to its extended position.

50. The combination defined in claim 46 further characterized by airspeed responsive means for adjusting said parts of said motion transmitting means in accordance with the airspeed of said aircraft and in such a manner that the lateral cyclic pitch change produced by a given movement of said yaw control device increases as the airspeed is decreased from one predetermined value to a lower predetermined value.

51. The combination as defined in claim 46 further characterized by said means connected between said output member and said cyclic pitch changing means including a second motion transmitting means having parts which are adjustable to vary the output motion thereoff produced as a result of a given movement of said output member so as to vary the magnitude of the compensating yawing moment produced by a given differential collective pitch change.

52. The combination as defined in claim 51 further characterized by wing means extending laterally outwardly from either side of said fuselage and which means are tiltable about a transverse axis relatively to said fuselage between a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage, and means connected with said wing means for adjusting said parts of said second motion transmitting means in accordance with the degree of wing tilt and in such a manner that the magnitude of the compensating yawing moment produced by a given differential collective pitch change decreases as the wing means is tilted away from said lowered position.

53. In an aircraft, the combination of a fuselage, two rotors disposed respectively on opposite sides of said fuselage and adapted for rotation about axes which are inclined forwardly with respect to the vertical when said fuselage is in a substantially horizontal position, said rotors each comprising a plurality of aerofoil blades independently adjustable to change the pitches thereof, means associated with said rotors for changing the pitches of the blades thereof in a collective manner, other means associated respectively with said rotors for changing the pitches of the blades thereof in a cyclic manner, a plurality of pilot operable devices carried by said fuselage for respectively controlling changes in the roll, pitch and yaw of said aircraft, a first motion transmitting means connected between said roll control device and said collective pitch changing means and operable on said latter means to differentially change the collective pitches of the blades of said rotors in response to movement of said roll control device, a second motion transmitting means connected between said pitch control device and said cyclic pitch changing means and operable on said latter means to change the pitches of the blades of said rotors in a longitudinal cyclic manner in response to movement of said pitch control device, a third motion transmitting means connected between said yaw control device and said cyclic pitch changing means and operable on said latter means to change the pitches of the blades of said rotors in a lateral cyclic manner in response to movement of said yaw control device, said first motion transmitting means including a first output member which is movable in proportion to the degree of differential collective pitch change induced by movement of said roll control device and said third motion transmitting means including a second output member which is movable in proportion to the degree of lateral cyclic pitch change induced by movement of said yaw control device, means connected between said first output member and said cyclic pitch changing means and operable on said latter means to change the pitches of the blades of said rotors in a lateral cyclic manner in response to the movement of said first output member to produce a compensating yawing moment about the fuselage yaw axis which opposes the change in yawing moment about the latter axis induced by the differential collective pitch change when said rotors are rotated about said inclined axes, and means connected between said second output member and said collective pitch changing means and operable on said latter means to change the pitches of the blades of said rotors in a differential collective manner in response to the movement of said second output member to produce a compensating rolling moment about the fuselage roll axis which opposes the change in rolling moment about the latter axis induced by the lateral cyclic pitch change when said rotors are rotated about said forwardly inclined axes.

54. The combination defined in claim 53 further characterized by wing means extending laterally outwardly from either side of said fuselage and which means are tiltable about a transverse axis relatively to said fuselage between a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage.

55. The combination as defined in claim 53 further characterized by said first, second and third motion transmitting means each having parts which are adjustable to vary the motion transmitting effectiveness thereof and to thus vary the effectiveness of said roll, pitch and yaw control devices respectively to produce changes in the pitches of said rotor blades.

56. The combination as defined in claim 55 further characterized by means for simultaneously and uniformly adjusting the said parts of said first, second and third motion transmitting means in unison so as to vary the effectiveness of said three motion transmitting means simultaneously and uniformly and in the same direction.

57. The combination as defined in claim 56 further characterized by said means connected between said first output member and said cyclic pitch changing means including another motion transmitting means having parts adjustable to vary the effectiveness thereof and said means connected between said second output member and said collective pitch changing means including still another motion transmitting means having parts adjustable to vary the effectiveness thereof, and means for simultaneously adjusting the said parts of said latter two motion transmitting means uniformly but in opposite directons so that the effectiveness of one of said latter means in increased as the effectiveness of the other is decreased.

58. The combination as defined in claim 57 further characterized by wing means extending laterally outwardly from either side of said fuselage and which means are tiltable about a transverse axis relatively to said fuselage between a lowered position at which said wing means is substantially horizontal with respect to a horizontal fuselage and various tilted positions at which said wing means is inclined to the horizontal with respect to a horizontal fuselage, said two rotors being mounted on said wing means and being tiltable therewith relative to said fuselage, and said means for simultaneously adjusting said parts of said latter two motion transmitting means including means connected with said wing means and operable thereby to cause adjustment of said latter parts in accordance with the tilt of said wing means.

59. In an aircraft, the combination of a fuselage, wing means extending laterally outwardly from opposite sides of said fuselage and tiltable about a transverse axis relatively to said fuselage between a lowered position and a raised position at which latter position said wing means is inclined from the vertical with respect to a horizontal fuselage, two rotors carried by said wing means and tiltable therewith, each of said rotors comprising a plurality of aerofoil blades independently adjustable to change the pitches thereof, pitch changing means associated with said rotors for cyclically and collectively changing the pitches of said blades for maneuvering said aircraft as a helicopter during relatively low speed flight of said aircraft with said wing means and rotors in raised position, said pitch changing means being operable to effect adjustment of said blade pitches in a differential collective manner in response to a roll input control motion and to effect adjustment of said blade pitches in a lateral cyclic manner in response to a yaw input control motion, flaps associated with said wing means and movable relatively thereto between a normal position and a dropped position at which dropped position said rotors, wing means and flaps in combination serve to produce substantially vertically acting resultant forces when said wing means is in raised position and said rotors operated without any cyclic change in the pitches of the blades thereof, pilot operable roll and yaw control devices movable in various predetermined directions corresponding to desired changes in the movement of said aircraft, mechanism connected with said roll control device and said yaw control device which mechanism is operable to supply a basic roll input control motion to said pitch changing means in response to movement of said roll control device and to supply a basic yaw input control motion to said pitch changing means in response to movement of said yaw control device, said mechanism including parts which are adjustable to vary the amount of basic roll input control motion and basic yaw input control motion produced by given movements of said roll and yaw control devices respectively, other mechanism connected with said last-mentioned mechanism which other mechanism is operable to supply a compensating yaw input control motion to said pitch changing means in response to said basic roll input motion, and means operable to render said other mechanism ineffective to produce a compensating yaw input motion when said wing means is fully tilted and said flaps are in dropped position.

60. In an aircraft, the combination of a fuselage, wing means extending laterally outwardly from opposite sides of said fuselage and tiltable about a transverse axis relatively to said fuselage between a lowered position and a raised position at which latter position said wing means is inclined from the vertical with respect to a horizontal fuselage, two rotors carried by said wing means and tiltable therewith, each of said rotors comprising a plurality of aerofoil blades independently adjustable to change the pitches thereof, pitch changing means associated with said rotors for cyclically and collectively changing the pitches of said blades for maneuvering said aircraft as a helicopter during relatively low speed flight of said aircraft with said wing means and rotors in raised position, said pitch changing means being operable to effect adjustment of said blade pitches in a differential collective manner in response to a roll input control motion and to effect adjustment of said blade pitches in a lateral cyclic manner in response to a yaw input control motion, flaps associated with said wing means and movable relatively thereto between a normal position and a dropped position at which dropped position said rotors, wing means and flaps in combination serve to produce substantially vertically acting resultant forces when said wing means is in raised position and said rotors operated without any cyclic change in the pitches of the blades thereof, pilot operable roll and yaw control devices movable in various predetermined directions corresponding to desired changes in the movement of said aircraft, mechanism connected with said roll control device and said yaw control device which mechanism is operable to supply a basic roll input control motion to said pitch changing means in response to movement of said roll control device and to supply a basic yaw input control motion to said pitch changing means in response to movement of said yaw control device, said mechanism including parts which are adjustable to vary the amount of basic roll input control motion and basic yaw input control motion produced by given movements of said roll and yaw control devices respectively, and other mechanism connected with said last-mentioned mechanism which other mechanism is operable to supply a compensating yaw input control motion to said pitch changing means in response to said basic roll input motion and to supply a compensating roll input control motion to said pitch changing means in response to said basic yaw input motion, said other mechanism including parts which are adjustable to vary the amount of compensating yaw input control motion and compensating roll input control motion produced by giving amounts of basic roll input control motion and basic yaw input control motion respectively.

61. In an aircraft, the combination of a fuselage, wing means extending laterally outwardly from opposite sides of said fuselage and tiltable about a transverse axis relatively to said fuselage between a lowered position and a raised position at which latter position said wing means is inclined from the vertical with respect to a horizontal fuselage, two rotors carried by said wing means and tiltable therewith, each of said rotors comprising a plurality of aerofoil blades independently adjustable to change the pitches thereof, pitch changing means associated with said rotors for cyclically and collectively changing the pitches of said blades for maneuvering said aircraft as a helicopter during relatively low speed flight of said aircraft with said wing means and rotors in raised position, flaps associated with said wing means and movable relatively thereto between a normal position and a dropped position at which dropped position said rotors, wing means and flaps in combination serve to produce substantially vertically acting resultant forces with respect to a horizontal fuselage when said wing means is in raised position and said rotors operated without any cyclic change in the pitches of the blades thereof, a pilot operable roll control device, mechanism connected with said roll control device and said pitch changing means and operable to effect adjustment of said blade pitches in a differential collective manner in response to movement of said roll control device when said wing means is in raised position and said flaps in dropped position, a pilot operable yaw control device, and mechanism connected with said yaw control device and said pitch changing means and operable to effect a basic adjustment of said blade pitches in a lateral cyclic manner and to simultaneously effect a compensating adjustment of said blade pitches in a differential collective manner in response to movement of said yaw control device when said wing means is in raised position and said flaps in dropped position, said compensating adjustment of said blade pitches in a differential collective manner serving to produce a rolling moment about the roll axis of said fuselage which opposes the rolling moment about the same axis produced by the lateral cyclic pitch change due to said wing means and said rotors being inclined from the vertical.

62. In an aircraft, the combination of a fuselage, wing means extending laterally outwardly from opposite sides of said fuselage, control surfaces carried by said wing means and movable relative thereto to impart rolling moments on said aircraft during relatively high speed flight, two rotors located respectively on opposite sides of said fuselage and each of which rotors includes a plurality of adjustable pitch blades, a pilot operable aircraft roll control device movable in predetermined opposite directions for controlling the rolling movement of said aircraft, means for moving said control surfaces in response to movement of said roll control device in said predetermined opposite directions, means for adjusting the pitches of the blades of said rotors in a differential collective manner in response to movement of said roll control device in said predetermined opposite directions, means for varying the degree of differential collective blade pitch adjustment provided by a given movement of said roll control device in said predetermined opposite directions, said rotors being adapted for rotation about axes inclined relative to said fuselage, and means for adjusting the pitches of the blades of said rotors in a lateral cyclic manner in response to movement of said roll control device in said predetermined opposite directions to provide a compensating yaw moment which counteracts the yaw moment produced as a result of the accompanying differential collective pitch adjustment and inclination of the rotor axes.

63. The combination as defined in claim 62 further characterized by means for varying the inclination of the axes of said rotors relative to said fuselage, and means for adjusting the degree of lateral cyclic pitch adjustment provided by a given movement of said roll control device in accordance with the inclination of said rotor axes.

64. In an aircraft, the combination of a fuselage, wing means extending laterally outwardly from either side of said fuselage and tiltable relatively thereto, control surface means for maneuvering said aircraft as an airplane at relatively high speeds, two rotors tiltable with said wing means and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surfaces in response to movements of said pilot operable mechanism in said various predetermined directions, second means connected between said pilot operable mechanism and said rotor blades for adjusting the pitches thereof in response to movement of said pilot operable mechanism in said various predetermined directions, said first and second means each having parts which are adjustable independently of the other said parts to separately vary the effectiveness of the movements of said pilot operable mechanism on the adjustment of said control surfaces and on the pitch adjustment of said rotor blades, respectively, and means connected with said wing means for adjusting the said parts of at least one of said first and second means in accordance with the degree of wing tilt.

65. In an aircraft, the combination of a fuselage, wing means extending laterally outwardly from either side of said fuselage and tiltable relatively thereto, control surface means for maneuvering said aircraft as an airplane at relatively high speeds, two rotors tiltable with said wing means and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surfaces in response to movements of said pilot operable mechanism in said various predetermined directions, second means connected between said pilot operable mechanism and said rotor blades for adjusting the pitches thereof in response to movement of said pilot operable mechanism in said various predetermined directions, said first and second means each having parts which are adjustable independently of the other said parts to separately vary the effectiveness of the movements of said pilot operable mechanism on the adjustment of said control surfaces and on the pitch adjustment of said rotor blades, respectively, and means connected with said wing means for adjusting the said parts of both said first and second means in accordance with the degree of wing tilt and in such a manner that the effectiveness of one of said means is increased as the effectiveness of the other is decreased.

66. In an aircraft, the combination of a fuselage, wing means extending laterally outwardly from either side of said fuselage and tiltable relatively thereto, control surface means for maneuvering said aircraft as an airplane at relatively high speeds, two rotors tiltable with said wing means and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surfaces in response to movements of said pilot operable mechanism in said various predetermined directions, second means connected between said pilot operable mechanism and said rotor blades for adjusting the pitches thereof in response to movement of said pilot operable mechanism in said various predetermined directions, said first and second means each having parts which are adjustable independently of the other said parts to separately vary the effectiveness of the movements of said pilot operable mechanism on the adjustment of said control surfaces and on the pitch adjustment of said rotor blades, respectively, and a wing flap carried by said wing means and movable relatively to said wing means between a retracted position and an extended position, and means connected with said wing flap for adjusting the said parts of at least one of said first and second means in accordance with the position of said wing flap relative to said wing means.

67. In an aircraft, the combination of a fuselage, wing means extending laterally outwardly from either side of said fuselage and tiltable relatively thereto, control surface means for maneuvering said aircraft as an airplane at relatively high speeds, two rotors tiltable with said wing means and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surfaces in response to movements of said pilot operable mechanism in said various predetermined directions, second means connected between said pilot operable mechanism and said rotor blades for adjusting the pitches thereof in response to movement of said pilot operable mechanism in said various predetermined directions, said first and second means each having parts which are adjustable independently of the other said parts to separately vary the effectiveness of the movements of said pilot operable mechanism on the adjustment of said control surfaces and on the pitch adjustment of said rotor blades, respectively, and a wing flap carried by said wing means and movable relative to said wing means between a retracted position and an extended position, and means connected with said wing flap for adjusting the said parts of both said first and second means in accordance with the position of said wing flap relative to said wing means and in such a manner that the effectiveness of one of said means is increased as the effectiveness of the other is decreased.

68. In an aircraft, the combination of a fuselage, wing means extending laterally outwardly from either side of said fuselage and tiltable relatively thereto, control surface means for maneuvering said aircraft as an airplane at relatively high speeds, two rotors tiltable with said wing means and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surfaces in response to movements of said pilot operable mechanism in said various predetermined directions, second means connected between said pilot operable mechanism and said rotor blades for adjusting the pitches thereof in response to movement of said pilot operable mechanism in said various predetermined directions, said first and second means having parts which are adjustable independently of the other said parts to separately vary the effectiveness of the movements of said pilot operable mechanism on the adjustment of said control surfaces and on the pitch adjustment of said rotor blades, respectively, and airspeed responsive means for adjusting the parts of at least one of said first and second means in accordance with the airspeed of said aircraft.

69. In an aircraft, the combination of a fuselage, wing means extending laterally outwardly from either side of said fuselage and tiltable relatively thereto, control surface means for maneuvering said aircraft as an airplane at relatively high speeds, two rotors tiltable with said wing means and each having a plurality of blades adjustable to change the pitches thereof for maneuvering the aircraft as a helicopter at relatively low speeds, pilot operable mechanism movable in various predetermined directions corresponding to desired changes in the movement of the aircraft, first means connected between said pilot operable mechanism and said control surface means for adjusting said control surfaces in response to movements of said pilot operable mechanism in said various predetermined directions, second means connected between said pilot operable mechanism and said rotor blades for adjusting the pitches thereof in response to movement of said pilot operable mechanism in said various predetermined directions, said first and second means each having parts which are adjustable independently of the other said parts to separately vary the effectiveness of the movements of said pilot operable mechanism on the adjustment of said control surfaces and on the pitch adjustment of said rotor blades, respectively, and airspeed responsive means for adjusting the parts of both of said first and second means in accordance with the airspeed of said aircraft and in such a manner that the effectiveness of one of said means is increased as the effectiveness of the other is decreased.

70. In an aircraft, the combination of a horizontal stabilizer, an elevator movable relative to said stabilizer for imparting pitching moments on said aircraft during relatively high speed flight, a rotor having a plurality of adjustable pitch blades, a pilot operable aircraft pitch control device movable in predetermined opposite directions for controlling the pitching movement of said aircraft, means for moving said elevator in response to movement of said pitch control device in said predetermined opposite directions, means for adjusting the pitches of the blades of said rotor in a longitudinal cyclic manner to impose a pitching moment on said aircraft in response to movement of said pitch control device in said predetermined opposite directions, means for varying the degree of movement of said elevator provided by a given moment of said pitch control device in said predetermined opposite directions, and means for varying the degree of longitudinal cyclic blade pitch adjustment provided by a given movement of said pitch control in said predetermined opposite directions.

References Cited in the file of this patent
UNITED STATES PATENTS

| | | |
|---|---|---|
| 2,478,847 | Stuart | Aug. 9, 1949 |
| 2,680,579 | Hohenemser | June 8, 1954 |
| 2,702,168 | Platt | Feb. 15, 1955 |
| 2,748,876 | Daland et al. | June 5, 1956 |
| 2,936,967 | Dancik | May 17, 1960 |
| 2,936,968 | Mazzitelli | May 17, 1960 |
| 2,954,943 | Lagabbe | Oct. 4, 1960 |
| 2,994,492 | Dobson et al. | Aug. 1, 1961 |